US012147180B2

(12) United States Patent
Furuichi et al.

(10) Patent No.: US 12,147,180 B2
(45) Date of Patent: Nov. 19, 2024

(54) HEATING DEVICE, FIXING DEVICE, AND IMAGE FORMING APPARATUS INCLUDING CONDUCTOR SUPPORT

(71) Applicants: Yuusuke Furuichi, Kanagawa (JP); Yukimichi Someya, Saitama (JP); Shigeo Nanno, Kanagawa (JP)

(72) Inventors: Yuusuke Furuichi, Kanagawa (JP); Yukimichi Someya, Saitama (JP); Shigeo Nanno, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/304,850

(22) Filed: Apr. 21, 2023

(65) Prior Publication Data

US 2023/0367246 A1 Nov. 16, 2023

(30) Foreign Application Priority Data

May 11, 2022 (JP) ................................ 2022-078180
May 26, 2022 (JP) ................................ 2022-086031

(51) Int. Cl.
*G03G 15/20* (2006.01)
*G03G 15/00* (2006.01)

(52) U.S. Cl.
CPC ......... *G03G 15/2053* (2013.01); *G03G 15/80* (2013.01); *G03G 15/2039* (2013.01)

(58) Field of Classification Search
USPC ........................................................ 399/320
See application file for complete search history.

(56) References Cited

U.S. PATENT DOCUMENTS

2016/0252856 A1 9/2016 Suzuki
2017/0371283 A1 12/2017 Fujita et al.
2022/0179338 A1 6/2022 Seshita et al.
2022/0283530 A1 9/2022 Adachi et al.
(Continued)

FOREIGN PATENT DOCUMENTS

JP 2011-118246 A 6/2011
JP 2016151756 A * 8/2016

OTHER PUBLICATIONS

Extended European Search Report dated Jul. 17, 2023 issued in corresponding European Appln. No. 23169809.3.
(Continued)

*Primary Examiner* — Quana Grainger
(74) *Attorney, Agent, or Firm* — Harness, Dickey & Pierce, P.L.C.

(57) ABSTRACT

A heating device includes a pair of rotators, a heater, a temperature sensor, a conductor, a conductor support, and a component supporting the conductor. The pair of rotators is in contact with each other to form a nip through which a sheet passes. The heater heats at least one of the pair of rotators. The temperature sensor detects a temperature of the heater. The conductor has flexibility and is coupled to the temperature sensor. The conductor support supports the conductor such that a distance from the conductor to at least one position of the heater outside a predetermined region of the heater in a width direction of the sheet is larger than a distance from the conductor to a position of the heater inside the predetermined region in the width direction. The component has a first side facing the heater and a second side opposite the first side.

20 Claims, 33 Drawing Sheets

(56) References Cited

U.S. PATENT DOCUMENTS

| | | | |
|---|---|---|---|
| 2022/0291610 A1 | 9/2022 | Seki et al. |
| 2022/0299919 A1 | 9/2022 | Inoue et al. |
| 2022/0299920 A1 | 9/2022 | Shimada et al. |
| 2022/0308511 A1 | 9/2022 | Someya et al. |
| 2022/0357697 A1 | 11/2022 | Furuichi |
| 2022/0382191 A1 | 12/2022 | Furuichi et al. |
| 2022/0382192 A1 | 12/2022 | Inoue et al. |
| 2022/0390894 A1 | 12/2022 | Saito et al. |
| 2023/0004108 A1 | 1/2023 | Furuichi et al. |
| 2023/0010218 A1 | 1/2023 | Shoji et al. |
| 2023/0063779 A1 | 3/2023 | Shimada et al. |
| 2023/0081075 A1 | 3/2023 | Someya et al. |
| 2023/0110956 A1 | 4/2023 | Furuichi |

OTHER PUBLICATIONS

U.S. Appl. No. 18/060,566, filed Nov. 30, 2022, Yuusuke Furuichi, et al.

* cited by examiner

HEATING DEVICE, FIXING DEVICE, AND IMAGE FORMING APPARATUS INCLUDING CONDUCTOR SUPPORT

CROSS-REFERENCE TO RELATED APPLICATIONS

This patent application is based on and claims priority pursuant to 35 U.S.C. § 119(a) to Japanese Patent Applications No. 2022-078180, filed on May 11, 2022, and No. 2022-086031, filed on May 26, 2022, in the Japan Patent Office, the entire disclosures of which are hereby incorporated by reference herein.

BACKGROUND

Technical Field

Embodiments of the present disclosure generally relate to a heating device, a fixing device, and an image forming apparatus.

Related Art

An image forming apparatus such as a copier or a printer includes a fixing device as an example of a heating device. The fixing device heats a sheet bearing an unfixed image to fix the unfixed image onto the sheet.

One type of fixing device includes a temperature sensor such as a thermistor or a thermostat disposed on a heater holder holding a heater. The temperature sensor is coupled to a controller via a conductor such as a lead wire. The controller controls heat generated by the heater based on temperatures detected by the temperature sensor to maintain the temperature of the heater to an appropriate temperature.

SUMMARY

This specification describes an improved fixing device that includes a pair of rotators, a heater, a temperature sensor, a conductor, a conductor support, and a component supporting the conductor. The pair of rotators is in contact with each other to form a nip through which a sheet passes. The heater heats at least one of the pair of rotators. The temperature sensor detects a temperature of the heater. The conductor has flexibility and is coupled to the temperature sensor. The conductor support supports the conductor such that a distance from the conductor to at least one position of the heater outside a predetermined region of the heater is larger than a distance from the conductor to a position of the heater inside the predetermined region. The component has a first side facing the heater and a second side opposite the first side.

This specification also describes a fixing device including the heating device.

This specification further describes an image forming apparatus including one of the fixing device and the heating device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
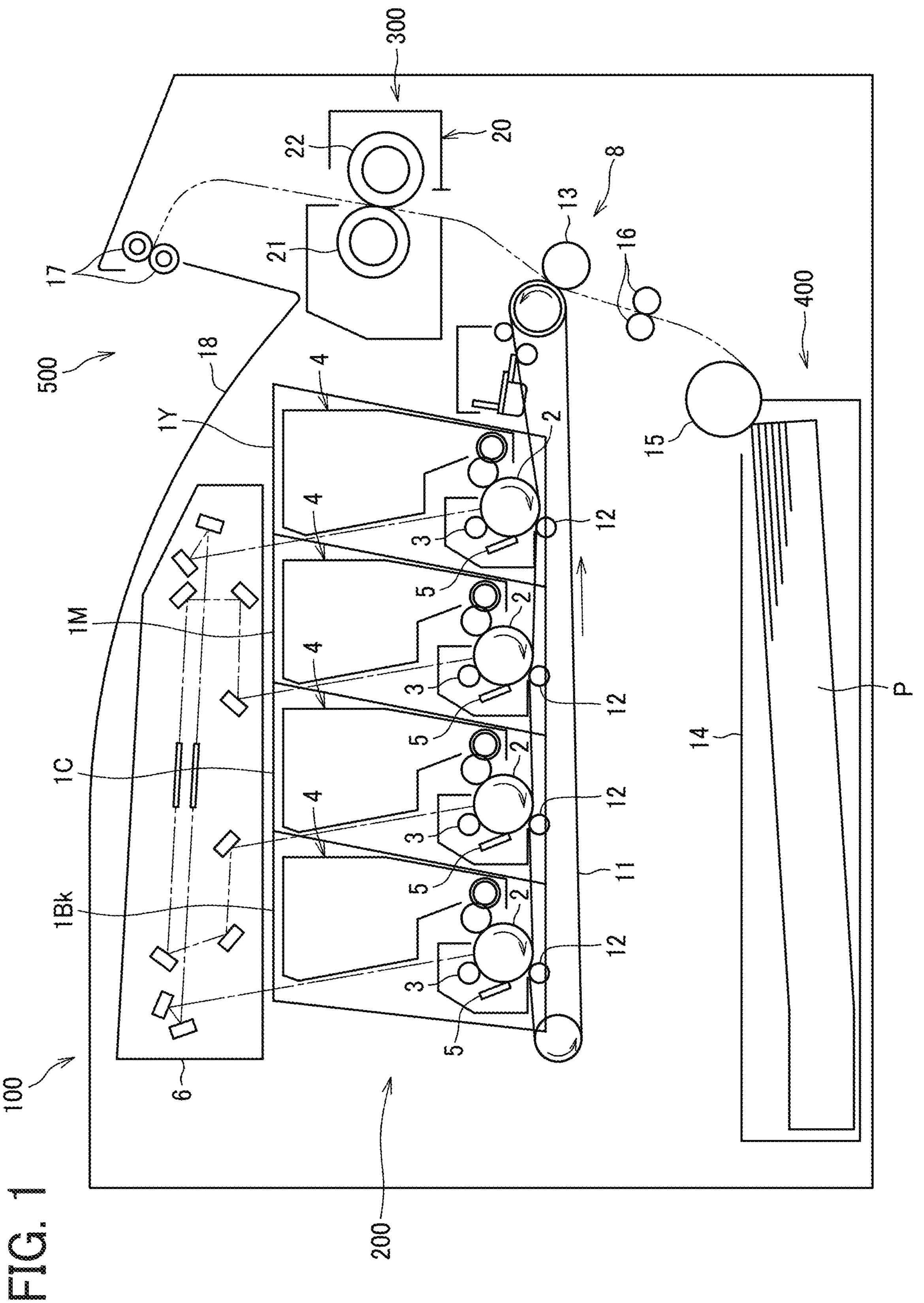
FIG. 1 is a schematic cross-sectional view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

With reference to drawings, descriptions are given below of embodiments of the present disclosure. In the drawings illustrating embodiments of the present disclosure, elements or components having identical or similar functions or shapes are given similar reference numerals as far as distinguishable, and redundant descriptions are omitted.

FIG. 1 is a schematic cross-sectional view of an image forming apparatus 100 according to an embodiment of the present disclosure. In the following description, the term “image forming apparatus” includes a printer, a copier, a scanner, a facsimile machine, or a multifunction peripheral having at least two of printing, copying, scanning, and facsimile functions. The term “image formation” indicates an action for providing (i.e., printing) not only an image having a meaning, such as texts and figures on a recording medium, but also an image having no meaning, such as patterns on the recording medium. Initially, with reference to FIG. 1, a description is given of an overall configuration and operation of the image forming apparatus 100 according to the present embodiment.

As illustrated in FIG. 1, the image forming apparatus 100 according to the present embodiment includes an image forming section 200 to form an image on a sheet-shaped recording medium such as a sheet, a fixing section 300 to fix the image onto the recording medium, a recording medium feeder 400 to feed the recording medium to the image forming section 200, and a recording medium ejection section 500 to eject the recording medium to an outside of the image forming apparatus 100.

The image forming section 200 includes four process units 1Y, 1M, 1C, and 1Bk as image forming units, an exposure device 6 to form an electrostatic latent image on a photoconductor 2 in each of the process units 1Y, 1M, 1C, and 1Bk, and a transfer device 8 to transfer an image onto the recording medium.

The process units 1Y, 1M, 1C, and 1Bk have the same configuration except for containing different color toners (developers), i.e., yellow (Y), magenta (M), cyan (C), and black (Bk) toners, respectively, corresponding to decomposed color separation components of full-color images. Specifically, each of the process units 1Y, 1M, 1C, and 1Bk includes a photoconductor 2 serving as an image bearer bearing the image on the surface thereof, a charger 3 to charge the surface of the photoconductor 2, a developing device 4 to supply the toner as the developer to the surface of the photoconductor 2 to form a toner image, and a cleaner 5 to clean the surface of the photoconductor 2.

The transfer device 8 includes an intermediate transfer belt 11, primary transfer rollers 12, and a secondary transfer roller 13. The intermediate transfer belt 11 is an endless belt stretched by a plurality of support rollers. Four primary transfer rollers 12 are disposed inside the loop of the intermediate transfer belt 11. Each of the primary transfer rollers 12 is in contact with the corresponding photoconductor 2 via the intermediate transfer belt 11 to form a primary transfer nip between the intermediate transfer belt 11 and each photoconductor 2. The secondary transfer roller 13 is in contact with the outer circumferential surface of the intermediate transfer belt 11 to form a secondary transfer nip.

The fixing section 300 includes a fixing device 20. The fixing device 20 includes a fixing belt 21 that is an endless belt and a pressure roller 22 as an opposed rotator opposite to the fixing belt 21. The fixing belt 21 and the pressure roller 22 are in contact with each other at their outer peripheral surfaces to form a nip (that is, a fixing nip).

The recording medium feeder 400 includes a sheet tray 14 to store sheets P as recording media and a feed roller 15 to feed the sheet P from the sheet tray 14. Although a “recording medium” is described as a “sheet of paper” (simply referred to as “sheet”) in the following embodiments, the “recording medium” is not limited to the sheet of paper. Examples of the “recording medium” include not only the sheet of paper but also an overhead projector (OHP) transparency sheet, a fabric, a metallic sheet, a plastic film, and a prepreg sheet including carbon fibers previously impregnated with resin. Examples of the “sheet” include thick paper, a postcard, an envelope, thin paper, coated paper (e.g., coat paper and art paper), and tracing paper, in addition to plain paper.

The recording medium ejection section 500 includes an output roller pair 17 to eject the sheet P to the outside of the image forming apparatus 100 and an output tray 18 to place the sheet P ejected by the output roller pair 17.

To provide a fuller understanding of the embodiments of the present disclosure, a description is now given of printing operations of the image forming apparatus 100 according to the present embodiment, with continued reference to FIG. 1.

When the image forming apparatus 100 starts the printing operations, the photoconductors 2 of the process units 1Y, 1M, 1C, and 1Bk and the intermediate transfer belt 11 of the transfer device 8 start rotating. The feed roller 15 starts rotating to feed the sheet P from the sheet tray 14. The sheet P fed from the sheet tray 14 is brought into contact with a timing roller pair 16 and temporarily stopped until the image forming section 200 forms the image to be transferred to the sheet P.

Firstly, in each of the process units 1Y, 1M, 1C, and 1Bk, the charger 3 uniformly charges the surface of the photoconductor 2 to a high potential. Next, the exposure device 6 exposes the surface (that is, the charged surface) of each photoconductor 2 based on image data of a document read by a document reading device or print image data sent from a terminal that sends a print instruction. As a result, the potential of the exposed portion on the surface of each photoconductor 2 decreases, and an electrostatic latent image is formed on the surface of each photoconductor 2. The developing device 4 supplies toner to the electrostatic latent image formed on the photoconductor 2, forming the toner image thereon. When the toner images formed on the photoconductors 2 reach the primary transfer nips defined by the primary transfer rollers 12 with the rotation of the photoconductors 2, the toner images formed on the photoconductors 2 are transferred onto the intermediate transfer belt 11 rotated counterclockwise in FIG. 1 successively such that the toner images are superimposed on the intermediate transfer belt 11, forming a full color toner image thereon. Thus, the full color toner image is formed on the intermediate transfer belt 11. The image forming apparatus 100 can form a monochrome toner image by using any one of the four process units 1Y, 1M, 1C, and 1Bk, or can form a bicolor toner image or a tricolor toner image by using two or three of the process units 1Y, 1M, 1C, and 1Bk. After the toner image is transferred from the photoconductor 2 onto the intermediate transfer belt 11, the cleaner 5 removes residual toner remained on the photoconductor 2 therefrom.

In accordance with rotation of the intermediate transfer belt 11, the toner image transferred onto the intermediate transfer belt 11 is conveyed to the secondary transfer nip (the position of the secondary transfer roller 13) and is transferred onto the sheet P conveyed by the timing roller pair 16. The sheet P bearing the full-color toner image is conveyed to the fixing device 20. In the fixing device 20, the fixing belt 21 and the pressure roller 22 apply heat and pressure to the toner image on the sheet P to fix the toner image onto the sheet P. Then, the sheet P bearing the fixed toner image is conveyed to the recording medium ejection section 500. In the recording medium ejection section 500, the output roller pair 17 ejects the sheet P onto the output tray 18. Thus, a series of printing operations is completed.

Figure 2:
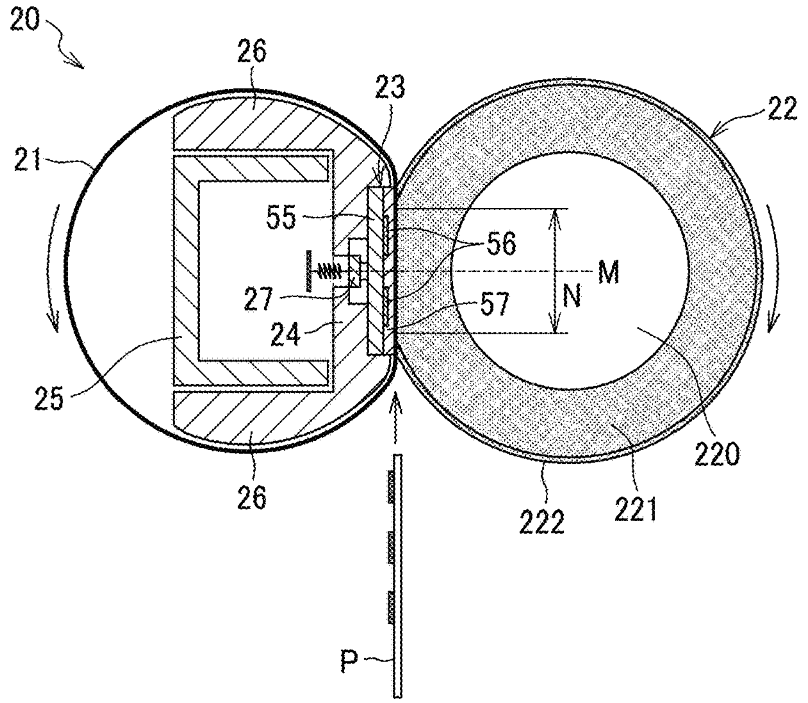
FIG. 2 is a schematic view of a fixing device incorporated in the image forming apparatus of FIG. 1.

Next, with reference to FIG. 2, a description is given of the configuration of the fixing device 20 according to the present embodiment.

As illustrated in FIG. 2, the fixing device 20 according to the present embodiment includes a heater 23, a heater holder 24, a stay 25, a guide 26, and temperature sensors 27 in addition to the fixing belt 21 and pressure roller 22.

The fixing belt 21 is a rotator as a first rotator or a fixing rotator to be in contact with a surface of the sheet P bearing an unfixed toner image and fix the unfixed toner image onto the sheet P. The fixing belt 21 is a flexible endless belt. A loop diameter of the fixing belt 21 is in a range of, for example, from 15 mm to 120 mm. In the present embodiment, the fixing belt 21 has an inner diameter of 25 mm.

Figure 3:
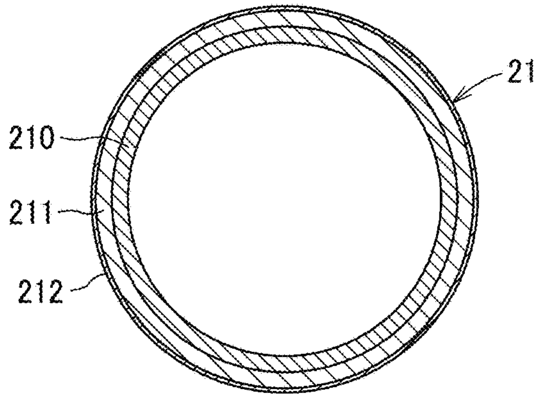
FIG. 3 is a cross-sectional view of a fixing belt according to the embodiment.

As illustrated in FIG. 3, the fixing belt 21 includes a base layer 210, an elastic layer 211, and a release layer 212 successively layered from the inner circumferential surface to the outer circumferential surface and has a total thickness set not greater than 1 mm. The base layer 210 has a thickness of from 30 μm to 50 μm and is made of metal, such as nickel or stainless steel, or resin such as polyimide. The elastic layer 211 has a thickness of 100 μm to 300 μm and is made of rubber such as silicone rubber, silicone rubber foam, or fluoro-rubber. The elastic layer 211 of the fixing belt 21 absorbs slight surface asperities of the fixing belt 21 at the fixing nip formed between the fixing belt 21 and the pressure roller 22, facilitating even heat conduction from the fixing belt 21 to the color toner image T on the sheet P. The release layer 212 of the fixing belt 21 has a thickness of from 10 μm to 50 μm and is made of material such as tetrafluoroethylene-perfluoroalkylvinylether copolymer (PFA), polytetrafluoroethylene (PTFE), polyimide, polyether imide, and polyether sulfone (PES). The release layer 212 of the fixing belt 21 facilitates the separation of toner contained in the toner image on the sheet P from the fixing belt 21. In other words, the release layer 212 of the fixing belt 21 facilitates the release of the toner from the fixing belt 21.

As illustrated in FIG. 2, the pressure roller 22 is a rotator as a second rotator or the opposed rotator and is disposed to face the outer circumferential surface of the fixing belt 21. The pressure roller 22 comes into contact with the fixing belt 21 on the heater 23 to form the fixing nip between the pressure roller 22 and the fixing belt 21.

The pressure roller 22 has, for example, an outer diameter of 25 mm and includes a hollow iron core 220, an elastic layer 221 on the outer circumferential surface of the core 220, and a release layer 222 on the outer circumferential surface of the elastic layer 221. The elastic layer 221 has, for example, a thickness of 3.5 mm and is made of silicone rubber or the like. The release layer 222 has, for example, a thickness of about 40 μm and is made of fluororesin or the like.

The heater 23 is a heat source to heat the inner circumferential surface of the fixing belt 21. The heater 23 is a planar heater extending in a longitudinal direction of the fixing belt 21 (that is, a width direction of the sheet intersecting a sheet conveyance direction). The heater 23 is disposed so as to be in contact with the inner circumferential surface of the fixing belt 21. The heater 23 according to the present embodiment includes a base 55, resistive heat generators 56 disposed on the base 55, and an insulation layer 57 covering the resistive heat generators 56.

Although the resistive heat generators 56 are disposed on the front side of the base 55 facing the pressure roller 22 (in other words, the front side facing the fixing nip N) in the present embodiment, alternatively, the resistive heat generators 56 may be disposed on the back side of the base 55. In this case, since the heat of the resistive heat generators 56 is transmitted to the fixing belt 21 through the base 55, it is preferable that the base 55 be made of a material with high thermal conductivity such as aluminum nitride.

The heater holder 24 is a heat source holder disposed inside the loop of the fixing belt 21 to hold the heater 23. Since the heater holder 24 is subject to temperature increase by heat from the heater 23, the heater holder 24 is preferably made of a heat-resistant material. For example, the heater holder 24 made of a heat-resistant resin having low heat conductivity, such as a liquid crystal polymer (LCP) or polyether ether ketone (PEEK), has a heat-resistant property and reduces heat transfer from the heater 23 to the heater holder 24. As a result, the heater 23 can efficiently heats the fixing belt 21.

The stay 25 supports the heater holder 24. The stay 25 supports a stay side face of the heater holder 24 extending in the longitudinal direction of the fixing belt 21. The stay side face is opposite a nip side face of the heater holder 24. The nip side face faces the pressure roller 22. Accordingly, the stay 25 prevents the heater holder 24 from being bended by a pressing force of the pressure roller 22. As a result, the fixing nip N having a uniform width is formed between the fixing belt 21 and the pressure roller 22.

The stay 25 is preferably made of an iron-based metal such as steel use stainless (SUS) or steel electrolytic cold commercial (SECC) that is electrogalvanized sheet steel to ensure rigidity.

The guide 26 guides the inner circumferential surface of the fixing belt 21. The guide 26 has a cross-sectional shape including an arc along the inner circumferential surface of the fixing belt 21. The guide 26 has an upstream portion upstream from the heater 23 in a rotation direction of the fixing belt 21 that is a direction indicated by an arrow in FIG. 2 and a downstream portion downstream from the heater 23 in the rotation direction. Instead of the upstream portion and the downstream portion, the fixing device may include an upstream guide and a downstream guide. In the present embodiment, the guide 26 is formed integrally with the heater holder 24 but may be formed separately.

The temperature sensor 27 is a temperature detector that detects the temperature of the heater 23. The temperature sensor 27 may be a known temperature sensor such as a thermopile, a thermostat, a thermistor, or a non-contact (NC) sensor. The temperature sensor 27 in the present embodiment is a contact type temperature sensor that is in contact with a stay side face of the heater 23 to detect the temperature of the heater 23. The stay side face of the heater 23 is opposite to a nip side face of the heater 23 facing pressure roller 22. The temperature sensor 27 is not limited to the contact type temperature sensor. The temperature sensor 27 may be a non-contact type temperature sensor that is disposed not to be in contact with the heater 23.

The fixing device 20 configured as described above operates as follows.

As illustrated in FIG. 2, as the driver drives and rotates the pressure roller 22, a driving force of the driver is transmitted from the pressure roller 22 to the fixing belt 21, thus rotating the fixing belt 21 in accordance with rotation of the pressure roller 22 by friction between the fixing belt 21 and the pressure roller 22. The heater 23 heats the fixing belt 21. The temperature sensor 27 detects the temperature of the heater 23 at this time, and a controller controls an amount of heat generated by the heater 23 based on the detected temperature. Thus, the controller maintains the temperature of the fixing belt 21 to be a fixing temperature in which the fixing belt 21 can fix the unfixed toner image onto the sheet. The sheet P bearing the unfixed toner image is conveyed to the fixing nip N between the fixing belt 21 and the pressure roller 22, and the fixing belt 21 and the pressure roller 22 apply heat and pressure to the sheet P to fix the unfixed toner image onto the sheet P.

Figure 4:
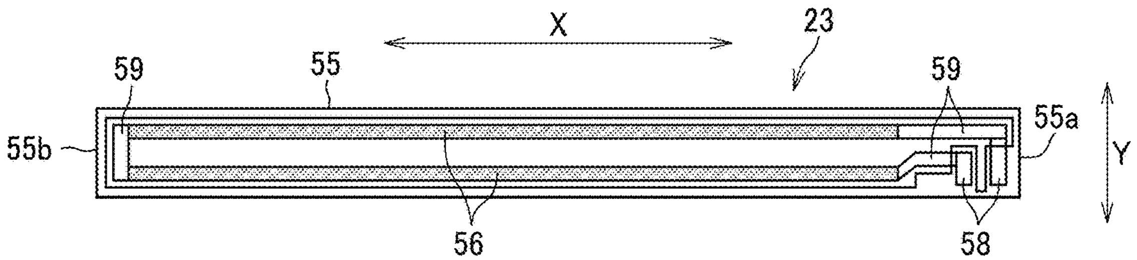
FIG. 4 is a plan view of a heater according to the embodiment.

FIG. 4 is a plan view of the heater according to the present embodiment.

As illustrated in FIG. 4, the heater 23 according to the present embodiment includes a base 55 having a planar shape extending in a direction indicated by an arrow X in FIG. 4. The base 55 is disposed so that a longitudinal direction X of the base 55 is in parallel with the longitudinal direction of the fixing belt 21 or an axial direction of the pressure roller 22. On the surface of the base 55, two resistive heat generators 56 extend in the longitudinal direction X of the base 55 and are arranged side by side in a short-side direction Y of the base 55. The "short-side direction" means a direction orthogonal to the longitudinal direction X along the surface of the base 55 on which the resistive heat generators 56 are disposed. The short-side direction is also the same direction as the sheet conveyance direction in which the sheet is conveyed.

As illustrated in FIG. 4, a pair of electrodes 58 are disposed on one end of the base 55 in the longitudinal direction X. Each electrode 58 is coupled to one end of each resistive heat generator 56 via a power supply line 59.

Each resistive heat generator 56 has the other end that is opposite to the one end coupling to each electrode 58. Another power supply line 59 couples the other ends of the two resistive heat generators 56. The insulation layer 57 covers the resistive heat generators 56 and power supply lines 59 to insulate the resistive heat generators 56 and power supply lines 59 from other parts. On the other hand, electrodes 58 are not covered with the insulation layer 57 and are exposed so that a connector as a power supply terminal to be described later can be coupled.

The base 55 is made of a material having excellent heat resistance and insulating properties, such as polyimide, glass, mica, or ceramic such as alumina or aluminum nitride. Alternatively, the base 55 may include a metal plate made of metal (that is a conductive material) such as SUS, iron, or aluminum and an insulation layer formed on the metal plate. In particular, the base 55 including the metal plate made of a high thermal conductive material such as aluminum, copper, silver, graphite, or graphene improves the thermal uniformity of the heater 23 and image quality. The insulation layer 57 is made of a material having excellent heat resistance and insulating properties, such as polyimide, glass, mica, or ceramic such as alumina or aluminum nitride. The resistive heat generator 56 is, for example, produced as below. Silver-palladium (AgPd), glass powder, and the like are mixed to make paste. The paste is screen-printed on the surface of the base 55. Thereafter, the base 55 is subject to firing. Thus, the resistive heat generator 56 is produced. The material of the resistive heat generator 56 may contain a resistance material, such as silver alloy (e.g., AgPt) or ruthenium oxide ($RuO_2$). The electrodes 58 and the power supply lines 59 are formed by screen-printing silver (Ag) or silver-palladium (AgPd).

Figure 5:
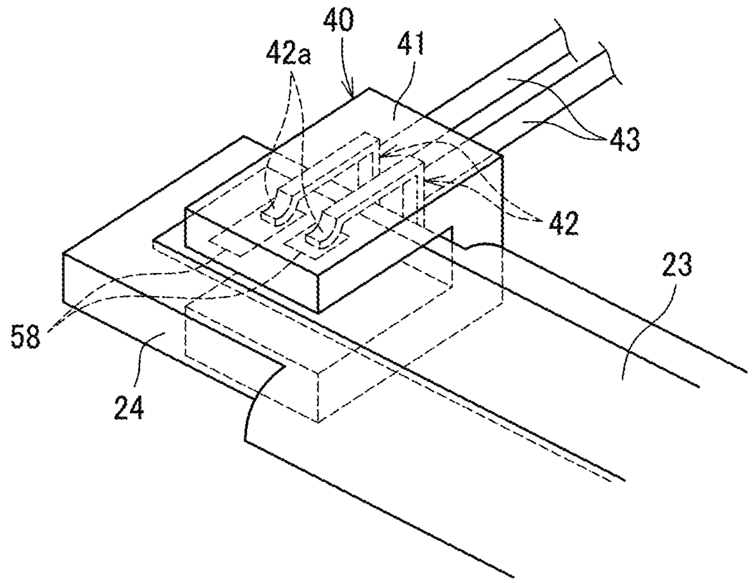
FIG. 5 is a perspective view of a connector coupled to the heater according to the embodiment.

FIG. 5 is a perspective view of a connector 40 as a power supply member coupled to the heater 23.

As illustrated in FIG. 5, the connector 40 includes a housing 41 made of resin, a plurality of contact terminals 42 disposed in the housing 41, and a harness 43 including wires each coupled each contact terminal 42 to supply power. Each contact terminal 42 is configured by an elastically deformable member such as a flat spring.

As illustrated in FIG. 5, the connector 40 is attached to the heater 23 and the heater holder 24 such that the connector 40 sandwiches the heater 23 and the heater holder 24 together. Thus, the connector 40 holds the heater 23 and the heater holder 24 together. In the above-described state, contact portions 42*a* disposed at ends of the contact terminals 42 in the connector 40 elastically contact and press against the electrodes 58 each corresponding to the contact terminals 42 to electrically couple to the electrodes 58 and contact terminals 42, respectively. The above-described configuration enables a power supply disposed in a body of the image forming apparatus to supply power to each of the resistive heat generators 56 in the heater 23 via the connector 40.

Figure 6:
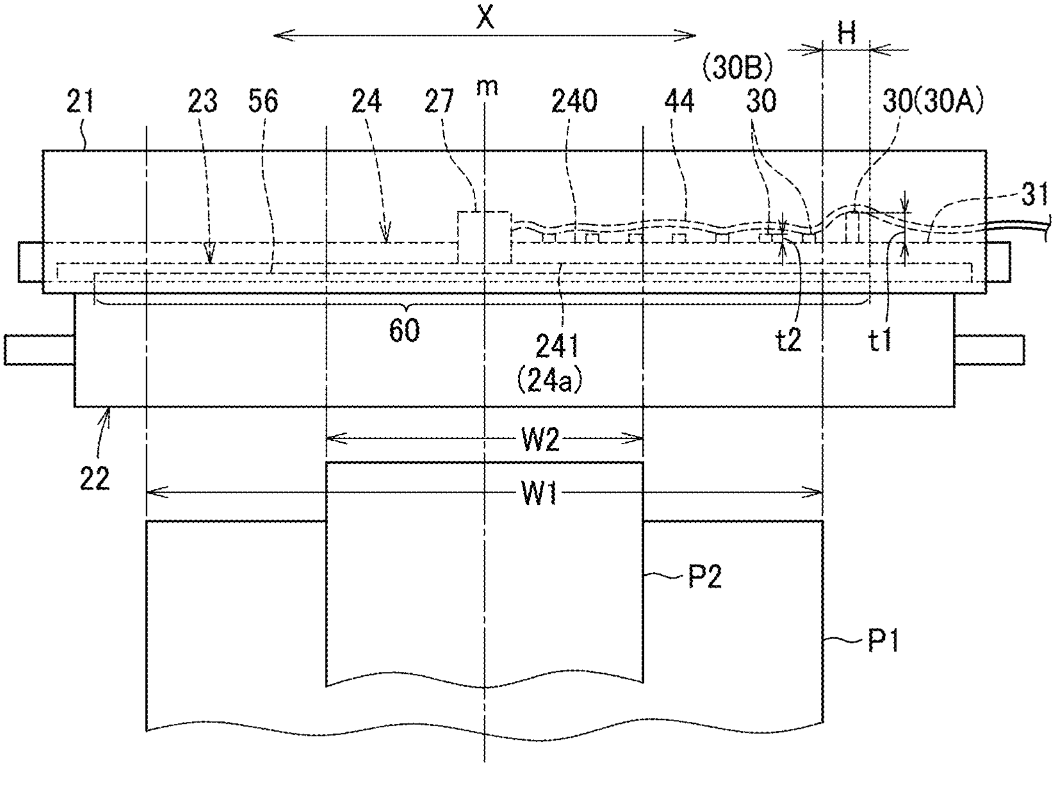
FIG. 6 is a schematic view of a support structure supporting a lead wire coupled to a temperature sensor in the fixing device according to the embodiment.

FIG. 6 is a schematic view of a support structure supporting a lead wire 44 coupled to the temperature sensor 27 in the fixing device according to the present embodiment.

As illustrated in FIG. 6, the temperature sensor 27 is coupled to one end of the lead wire 44 as a conductor having flexibility. The other end of the lead wire 44 is coupled to the controller disposed in the body of the image forming apparatus. The lead wire 44 includes a conductive wire and an insulator covering the conductive wire to ensure insulation and heat resistance. The lead wire 44 is disposed on the stay side face of the heater holder 24 to avoid direct influence of heat of the heater 23 facing the nip side face of the heater holder 24 that is opposite the stay side face. In other words, the lead wire 44 is routed on a first surface 240 (an upper surface of the heater holder 24 in FIG. 6) of the heater holder 24. The first surface 240 is opposite to a second surface 241 of the heater holder 24, the second surface 241 holding the heater 23. A plurality of projections 30 as conductor supports supporting the lead wire 44 is disposed on the first surface 240 of the heater holder 24, the first surface 240 facing the lead wire 44.

The plurality of projections 30 are arranged at intervals in the longitudinal direction of the heater holder 24 that is also the longitudinal direction X of the heater 23. A tip of each projection 30 supports the lead wire 44 so as to set a gap between the lead wire 44 and a planar base 31 of the heater holder 24 on which the projections 30 are disposed, and, as a result, the lead wire 44 is not in contact with the base 31. In other words, the heater holder 24 includes the planar base 31 having the first surface 240 and the second surface 241 opposite to the first surface 240. In the second surface 241, a recessed portion 24*a* is formed to hold the heater 23. On the first surface 240, a plurality of projections 30 is disposed. As described above, the plurality of projections 30 supporting the lead wire 44 avoids contact between the lead wire 44 and the base 31 and reduces the contact area of the lead wire 44 with respect to the heater holder 24. The lead wire 44 having lower rigidity than a sheet metal, a jumper wire, or the like needs a member supporting the lead wire 44 to hold the lead wire 44 at a position away from the heater holder 24. For this reason, the heater holder 24 in the present embodiment includes the plurality of projections 30 supporting the lead wire 44 to reduce the contact area of the lead wire 44 with respect to the heater holder 24, preventing heat transfer from the heater 23 and the heater holder 24 to the lead wire 44. In FIG. 6, the fixing device includes two lead wires 44 but may include one lead wire including two lead wires and an insulator covering the two lead wires.

The lead wire 44 may not be in contact with the tip of the projection 30. That is, the projections 30 supporting the lead wire 44 not to come into contact with the base 31 of the heater holder 24 includes the projection that is not always in contact with the lead wire 44 in addition to the projection 30 in contact with the lead wire 44. For example, a projection 30A2 illustrated in FIG. 8, which is described below, dose not actually come into contact with the lead wire 44. However, when the lead wire 44 approaches the base 31, the projection 30A2 supports the lead wire 44 not to come into contact with the base 31. In the present disclosure, the projections 30 supporting the lead wire 44 includes the projection 30A2.

In FIG. 6, a projection 30A that is the very end of the plurality of projections 30 in the longitudinal direction of the heater holder 24 (that is the right end in FIG. 6) is designed to be higher than the other projections 30B in a projecting direction from the heater holder 24 (that is, the base 31), which means t1>t2 in FIG. 6. The projection 30A higher than other projections 30B is disposed corresponding to a portion of the heater 23 in which the temperature of the heater 23 is higher than temperatures of other portions of the heater 23 to prevent the heat of the heater 23 from affecting the lead wire 44.

To be specific, the portion of the heater 23 in which the temperature of the heater 23 is higher than temperatures of other portions of the heater 23 in the present embodiment is the portion inside a heat generation area 60 in which the resistive heat generators 56 of the heater 23 are disposed and outside the maximum sheet passing region W1 facing the sheet P1 that has the maximum width W1 (the maximum sheet width) and passes through the fixing device, that is, a region indicated by H in FIG. 6. In addition, the "heat generation area" in the present specification means an area extending in the longitudinal direction X of the heater 23 and the area in which the resistive heat generator 56 is disposed. In the heater 23 including a plurality of resistive heat generators 56, which is described below (see FIG. 18), the heat generation area means from one end of an area in which all resistive heat generators are disposed to the other end of the area in the longitudinal direction X. The maximum sheet passing region W1 in the present specification means a preset region facing a region through which the sheet having the maximum width is assumed to pass regardless of whether or not the sheet having the maximum width actually passes. The sheet having the maximum width in the present specification is a sheet having the largest width among sheets described in a user's manual, a catalog, or the like of the image forming apparatus. Similarly, the sheet having the minimum width in the present specification is a sheet having the smallest width among sheets described in the user's manual, the catalog, or the like of the image forming apparatus. The image forming apparatus in the present embodiment is configured by a so-called center conveyance reference system in which the sheets having various sizes are conveyed so that the center positions of the various sizes of sheets in the width direction pass through a same position in the image forming apparatus. Therefore, the maximum sheet passing region is a region from the longitudinal center m of the heat generation area 60 of the heater 23 toward both ends of the heat generation area 60 in the longitudinal direction by a distance of half the maximum width of the sheet or a distance obtained by adding a 5 mm to the half the maximum width. For example, if the sheet having the maximum width is the A4 size sheet having the width of 210 mm, the maximum sheet passing region is a region from the longitudinal center m of the heat generation area 60 toward both ends of the heat generation area 60 by 105 mm, which is a distance of a half of the A4 size, or 110 mm, which is a distance obtained by adding the 5 mm to the half of the A4 size. In FIG. 6, a region indicated by a reference W2 is a minimum sheet passing region facing a region through which a sheet P2 having the minimum width passes. Similar to the maximum sheet passing region W1, the minimum sheet passing region W2 means a preset region facing the region through which the sheet having the minimum width is assumed to pass regardless of whether or not the sheet having the minimum width actually passes. That is, the minimum sheet passing region is a region from the longitudinal center m of the heat generation area 60 of the heater 23 toward both ends of the heat generation area 60 in the longitudinal direction by a distance of half the minimum width of the sheet or a distance obtained by adding the 5 mm to the half the minimum width.

A basic point to heat the sheet is maintaining the temperature of the fixing belt 21 facing the maximum sheet passing region W1 at a predetermined temperature. However, since the fixing belt 21 has a small heat storage amount immediately after the temperature of the fixing belt 21 rises to the predetermined temperature, the sheet passing on the fixing belt 21 tends to cause temperature drops of the fixing belt 21 on both ends of the heat generation area 60. For this reason, the heat generation area 60 of the heater 23 in the present embodiment is extended to the outside of the maximum sheet passing region W1 to prevent the temperature drops of the fixing belt 21 due to the sheet passing on the fixing belt 21. However, continuously passing many sheets through the fixing device that includes the heat generation area 60 extending to the outside of the maximum sheet passing region W1 causes accumulating heat in non-sheet passing regions of the fixing belt 21 and non-sheet passing regions of the heater 23. The non-sheet passing region faces the region through which the sheet P1 having the maximum width does not pass. Accumulating the heat in the non-sheet passing region may cause an excessive temperature rise.

The sheet that may cause the temperature rise in the non-sheet passing region is not limited to the sheet P1 having the maximum width. If the sheet has a width smaller than the heat generation area 60 of the heater 23 and passes through the fixing device, the temperature rise may occur. The image forming apparatus may generally adopt a countermeasure for small sheets that are rarely used. The countermeasure is reducing productivity (that is, a print speed) to reduce the temperature rise in the non-sheet passing region. By contrast, the image forming apparatus does not reduce the productivity for printing the sheet P1 having the maximum width and being frequently used. As a result, continuously printing the sheets P1 is likely to cause the temperature rise in the non-sheet passing region. Additionally, increasing the amount of heat generated by the heater to increase the print speed of the image forming apparatus in recent years highlights the above-described disadvantage caused by the excessive temperature rise outside the maximum sheet passing region W1.

To cope with the disadvantage, the fixing device 20 according to the embodiment of the present disclosure includes a projection 30A and projections 30B as illustrated in FIG. 6. The projection 30A is disposed on a region of the heater holder 24 facing a region H (hereinafter referred to as an "excessive temperature rise region" for convenience) inside the heat generation area 60 of the heater 23 in the width direction and outside the maximum sheet passing region W1 in the width direction. The projection 30A is higher than the projections 30B disposed on a region of the heater holder facing a region other than the region H, that is t1>t2 in FIG. 6. As a result, a distance from the lead wire 44 to the excessive temperature rise region H of the heater 23 is larger than a distance from the lead wire 44 to the region other than the region H. In FIG. 6, the distance from the lead wire 44 to the heater 23 is measured along the direction orthogonal to the width direction and the sheet conveyance direction.

In the above-described configuration, heat is hardly transferred from the heater 23 to the lead wire 44. Even if the sheets P1 each having the maximum width continuously pass through the fixing device and cause the excessive temperature rise in the excessive temperature rise region H of the heater 23, the above-described configuration can prevent temperature rise of the lead wire 44, which can prevent the deterioration and damage of the lead wire 44. The above-described configuration that can prevent the deterioration and damage of the lead wire 44 enables continuously printing the sheets P1 each having the maximum width, without reducing the productivity.

The position of the above-described projection 30A higher than the projections 30B is not limited to a position facing the excessive temperature rise region H illustrated in FIG. 6 and may be a position of the heater holder 24 facing the outside of the excessive temperature rise region H in the longitudinal direction X.

Figure 7:
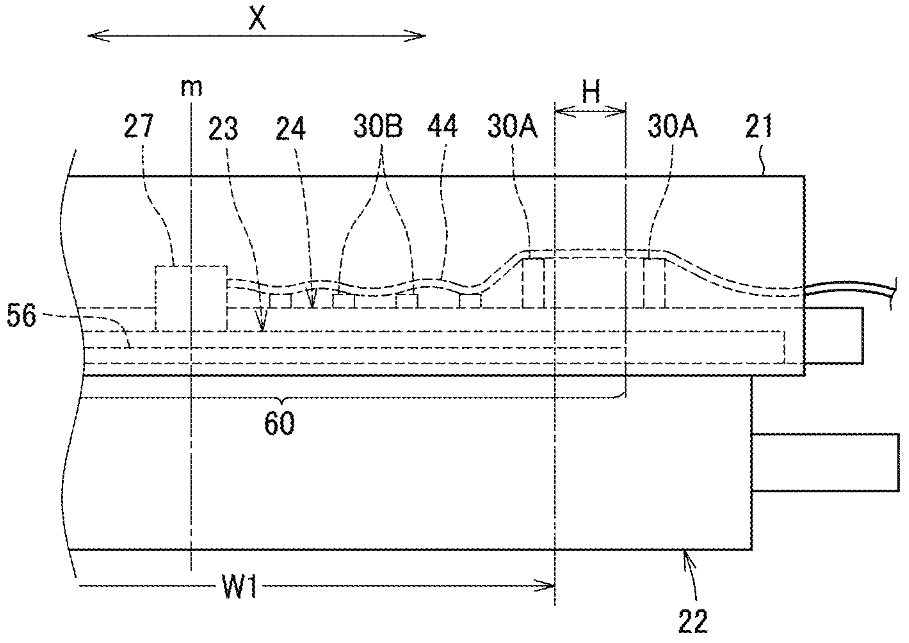
FIG. 7 is a schematic view of a support structure according to a variation of the embodiment.

For example, as illustrated in FIG. 7, the projections 30A higher than the projections 30B may be disposed on the heater holder 24 corresponding to both outer sides of the excessive temperature rise region H in the width direction. The configuration illustrated in FIG. 7 can ensure the larger distance from the lead wire 44 to the excessive temperature rise region H of the heater 23 than the distance from the lead wire 44 to the other region, which can prevent the temperature of the lead wire 44 from rising. In addition, since the projections 30A illustrated in FIG. 7 do not face the excessive temperature rise region H, the above-described configuration can prevent temperature of the projection 30A itself from rising. Preventing the temperature of the projection 30A itself from rising can reduce the amount of heat transmitted from the projection 30A to the lead wire 44. As a result, the above-described configuration can effectively reduce the temperature rise of the lead wire 44. Effectively reducing the temperature rise of the lead wire 44 enables selecting an inexpensive material (a material having heat resistance that is not so high) as the material of the lead wire 44 or the insulator covering the lead wire 44 to achieve cost reduction. On the other hand, since the fixing device 20 illustrated in FIG. 6 including the projection 30A facing the excessive temperature rise region H does not include the projection 30A on an end of the heater holder 24 facing the outside of the excessive temperature rise region H in the longitudinal direction of the heater holder 24, the configuration illustrated in FIG. 6 can omit a space to position the projection 30A in the end of the heater holder 24, which gives an advantage that the longitudinal size of the heater holder 24 can be reduced.

Figure 8:
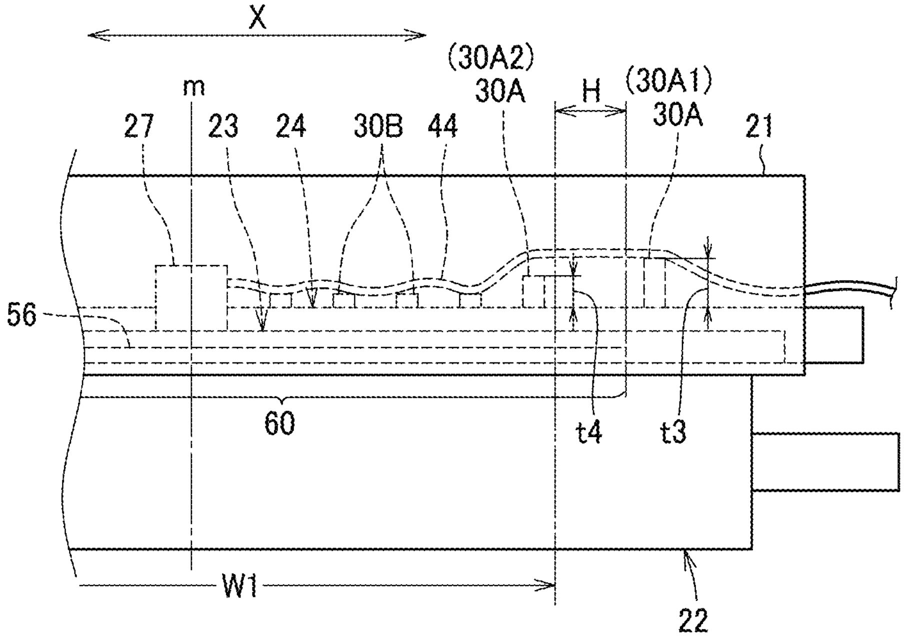
FIG. 8 is a schematic view of a support structure according to another variation of the embodiment.

In addition, as illustrated in FIG. 8, among the projections 30A higher than the projections 30B, a projection 30A1 facing an outside from the right side of the excessive temperature region H may be higher than the projection 30A2 facing an inside from the left side of the excessive temperature rise region H, that is, t3>t4 in FIG. 8. In this example, the lead wire 44 is mainly supported by the higher projection 30A1. The higher projection 30A1 facing the outside from the heat generation area 60 in the width direction is less affected by heat of the heater 23 than the projection 30A2 facing the heat generation area 60. Since the amount of heat transmitted from the higher projection 30A1 to the lead wire 44 is less than the amount of heat transmitted from the projection 30A2 to the lead wire 44, the above-described configuration can effectively reduce the temperature rise of the lead wire 44.

Figure 9:
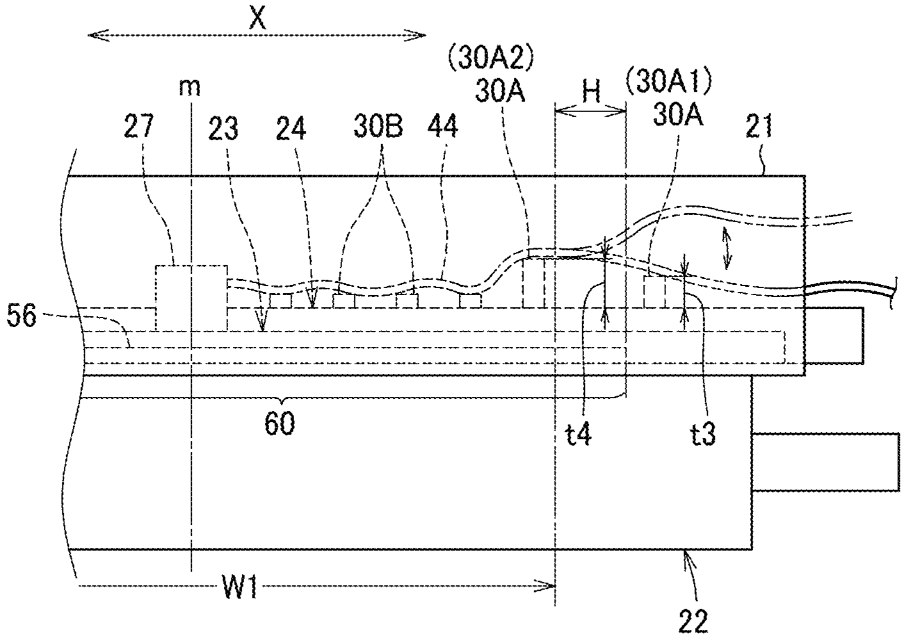
FIG. 9 is a schematic view of a support structure according to still another variation of the embodiment.

Conversely, as illustrated in FIG. 9, among the projections 30A higher than the projections 30B, the projection 30A2 facing the inside from the left side of the excessive temperature rise region H may be higher than the projection 30A1 facing the outside from the right side of the excessive temperature region H, that is, t3<t4 in FIG. 9. The configuration illustrated in FIG. 9 reduces the height of the projection 30A1 disposed on an end of the heater holder 24 in the longitudinal direction of the heater holder 24, which improves the degree of design freedom in routing the lead wire 44.

Figure 10:
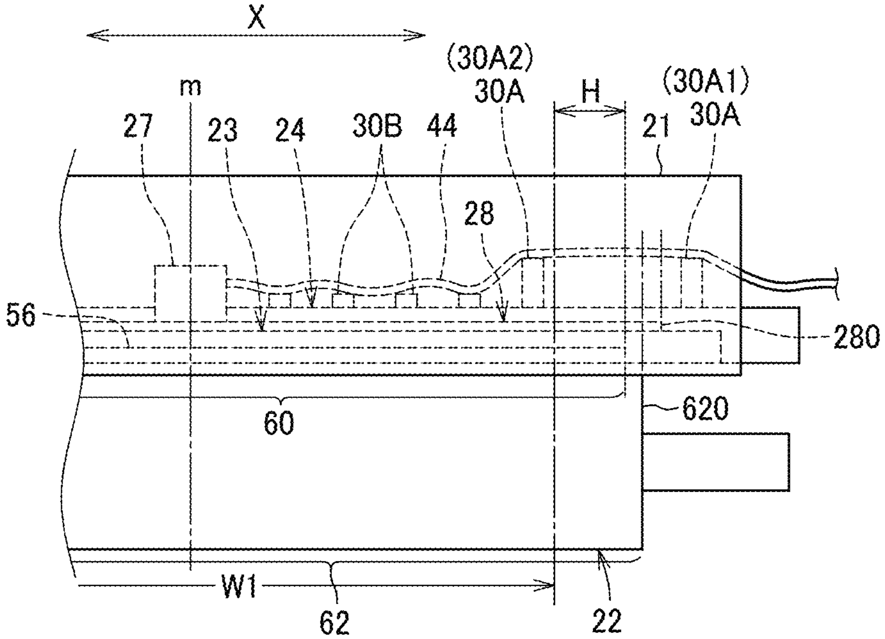
FIG. 10 is a schematic view of a support structure according to still another variation of the embodiment.

Next, an embodiment illustrated in FIG. 10 is described below. In the embodiment illustrated in FIG. 10, the projection 30A1 disposed on the end of the heater holder 24 outside the excessive temperature rise region H in the longitudinal direction of the heater holder 24 is closer to an edge of the heater holder 24 (that is the right side of the heater holder 24 in FIG. 10) in the longitudinal direction than to an edge 620 of a roller portion 62 (that is a portion including the elastic layer) of the pressure roller 22. The above-described configuration including the projection 30A1 disposed outside the excessive temperature rise region H and outside the roller portion 62 of the pressure roller 22 in the longitudinal direction can prevent heat transfer from the pressure roller 22 to the projection 30A1 disposed outside the excessive temperature rise region H via the heater holder 24, which reduces the temperature rise in the projection 30A1. Reducing the temperature rise of the projection 30A1 can reduce the amount of heat transmitted from the projection 30A1 to the lead wire 44. As a result, the above-described configuration can effectively reduce the temperature rise of the lead wire 44 from rising.

In addition, when the fixing device 20 includes a thermal equalization plate 28 as a thermal conduction aid between the heater 23 and the heater holder 24 as illustrated in FIG. 10, it is preferable to suppress influence of heat transferred from the thermal equalization plate 28 to the projection 30A1. The thermal equalization plate 28 is made of a material having a higher thermal conductivity than the thermal conductivity of the heater holder 24, such as copper, aluminum, or silver. The thermal equalization plate 28 moves heat from the heater 23 in the longitudinal direction of the fixing belt 21 to uniformly heat the fixing belt 21. As illustrated in FIG. 10, the projection 30A1 disposed on the end of the heater holder 24 outside the excessive temperature rise region H in the longitudinal direction of the heater holder 24 is closer to the edge of the heater holder 24 (that is the right side of the heater holder 24 in FIG. 10) in the longitudinal direction than to a longitudinal edge 280 of the thermal equalization plate 28, which can prevent heat transfer from the thermal equalization plate 28 to the projection 30A1 outside the excessive temperature rise region H in the longitudinal direction and effectively reduce the temperature rise in the projection 30A1.

In each of the above-described embodiments, one or some projections 30 higher than other projections increase the distance from the lead wire 44 to the heater 23 in the excessive temperature rise region H in which the excessive temperature rise occurs when the sheets each having the maximum width pass through the fixing device. However, the temperature rise in the non-sheet passing region when the sheets continuously pass through the fixing device is not limited to the case in which the sheets P1 each having the maximum width pass through the fixing device. Passing the sheets having any sizes smaller than the heat generation area 60 of the heater 23 through the fixing device may cause the temperature rise in the non-sheet passing region.

Figure 11:
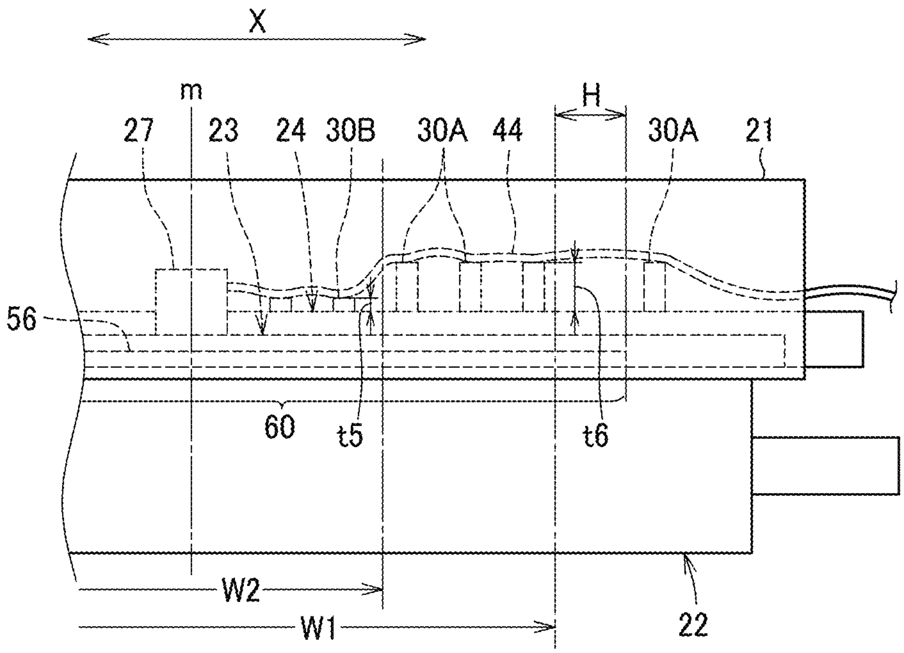
FIG. 11 is a schematic view of a support structure according to still another variation of the embodiment.

For this reason, as illustrated in FIG. 11, not only the projection 30A facing the outside of the maximum sheet passing region W1 in the width direction but also the projection 30A facing the maximum sheet passing region W1 may be higher than the projections 30B facing the other region. Specifically, the fixing device 20 includes the projection 30A facing the outside of the minimum sheet passing region W2 in the width direction higher than the projection 30B facing the minimum sheet passing region W2, that is, t6>t5 in FIG. 11. Since the distance from the heater 23 to the lead wire 44 facing the outside of the minimum sheet passing region W2 in the width direction is larger than the distance from the heater 23 to the lead wire 44 facing the minimum sheet passing region W2, the above-described configuration can reduce the temperature rise of the lead wire 44 facing the non-sheet passing region of the sheet having any size.

Figure 12:
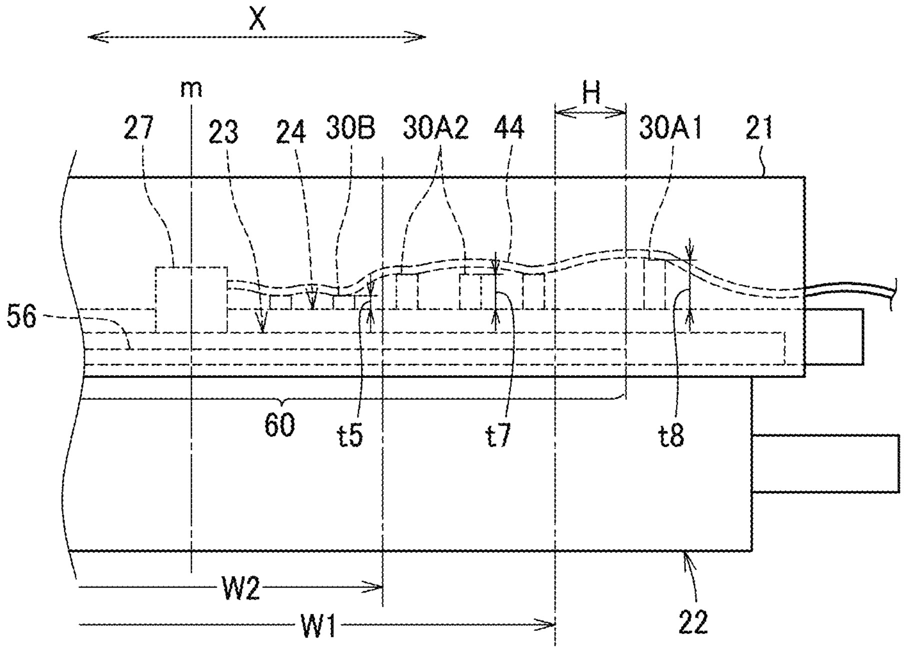
FIG. 12 is a schematic view of a support structure according to still another variation of the embodiment.

Alternatively, the fixing device 20 according to an embodiment illustrated in FIG. 12 includes the projections 30A2 that face the maximum sheet passing region W1 and each have a height different from the height of the projection 30A1 facing the outside of the maximum sheet passing region W1 in the width direction. Specifically, the height t7 of the projection 30A2 facing the maximum sheet passing region W1 and the outside of the minimum sheet passing region W2 in the width direction is set to be lower than the height t8 of the projection 30A1 facing the outside of the maximum sheet passing region W1 in the width direction as illustrated in FIG. 12. Accordingly, the fixing device 20 according to the embodiment illustrated in FIG. 12 includes the highest projection 30A1 facing the outside of the maximum sheet passing region W1 in the width direction, the second highest projection 30A2 facing the maximum sheet passing region W1 and the outside of the minimum sheet passing region W2 in the width direction, and the lowest projection 30B facing the minimum sheet passing region W2, that is, t8>t7>t5 in FIG. 12.

Setting the height t7 of the projection 30A2 facing the outside of the minimum sheet passing region W2 in the width direction and the inside of the maximum sheet passing region W1 in the width direction to be lower than the height t8 of the projection 30A1 facing the outside of the maximum sheet passing region W1 in the width direction can enhance the flexibility of the layout. Setting the height t7 of the projection 30A2 facing the outside of the minimum sheet passing region W2 in the width direction and the inside of the maximum sheet passing region W1 in the width direction to be low reduces the effect of preventing the heat transfer to the lead wire 44 to some extent. However, reducing the productivity when the small sheets each having a smaller width than the maximum sheet width pass through the fixing device to reduce the temperature rise in the non-sheet passing region as needed enables controlling the temperature rise of the lead wire 44 in the non-sheet passing region to be within an allowable range.

Figure 13:
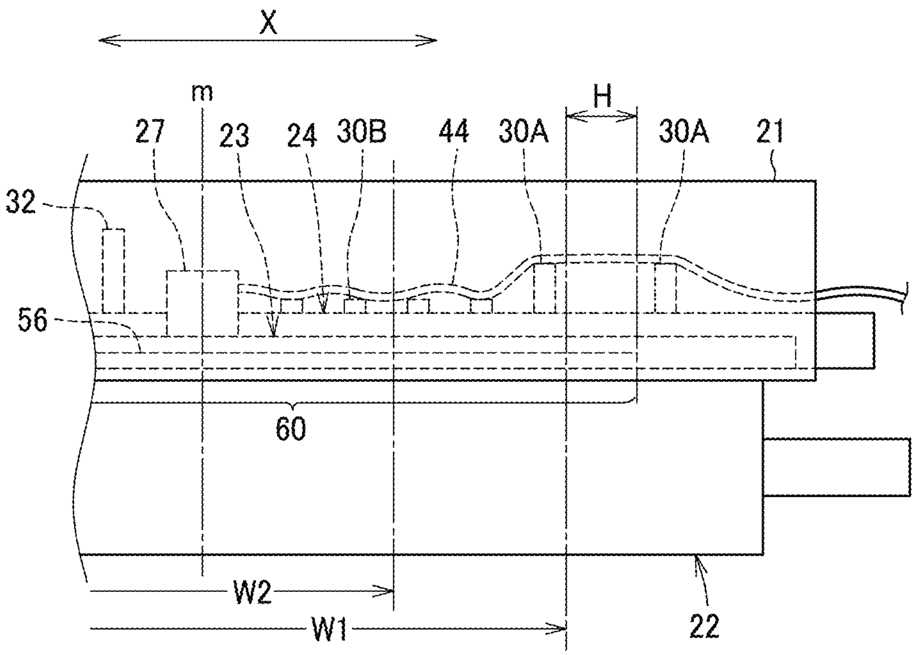
FIG. 13 is a schematic view of an example of a projection having a height not to be compared.

In the above-described embodiments, the projections 30A including the projections 30A1 and 30A2 may be higher than at least the projection 30B facing the minimum sheet passing region W2. However, the projection 30B facing the minimum sheet passing region W2 to be compared with the projection 30A is within the region in which the lead wire 44 is routed. A projection 32 illustrated in FIG. 13 is not compared with the projection 30A in terms of the height because the projection 32 faces the minimum sheet passing region W2 but is not within the region in which the lead wire 44 is routed. This is because the projection 32 is not a conductor support (that is, each of the projections 30) that supports the lead wire 44.

Figure 14:
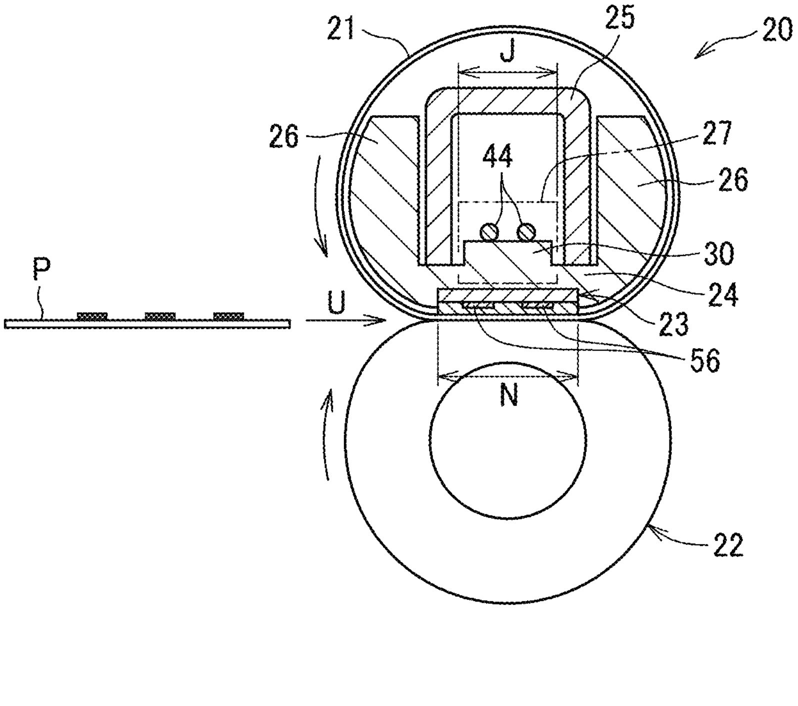
FIG. 14 is a schematic view of another example of the projection having a height not to be compared.

In addition, a projection such as the guide 26 projecting from the heater holder 24 as illustrated in FIG. 14 is not compared with the projection 30A in terms of the height because the projection such as the guide 26 is not the conductor support (that is, each of the projections 30) supporting the lead wire 44. The projection whose height is to be compared is a projection disposed in a region in which the lead wire 44 can exist, that is, a region J in which the temperature sensor 27 exists, the region extending in a sheet passing direction Y (that is, the sheet conveyance direction) illustrated in FIG. 14.

In addition, the projections 30 supporting the lead wire 44 do not necessarily face the minimum sheet passing region W2. The projections 30 supporting the lead wire 44 may not face the minimum sheet passing region W2. For example, the projection that does not face the minimum sheet passing region W2 may be compared with the projections 30 (that is, the projection 30B) facing the maximum sheet passing region W1 and the outside of the minimum sheet passing region W2 in the width direction as illustrated in FIG. 6. In the present disclosure, the projections having heights to be compared are not limited to the projections facing the minimum sheet passing region W2 and the projections facing the outside of the minimum sheet passing region W2 in the width direction. The projections having heights to be compared may be projections facing a predetermined region other than the minimum sheet passing region W2 and projections facing the outside of the predetermined region in the width direction. That is, the projections having heights to be compared may be the projection 30 facing a predetermined region arbitrarily defined, such as the minimum sheet passing region W2 or the maximum sheet passing region W1 and the projection 30 facing the outside of the predetermined region in the width direction. At least one projection 30 facing the outside of the predetermined region in the width direction may be higher than the other projections 30 facing the outside of the predetermined region. The projection 30 higher than other projections 30 can reduce the temperature rise of the lead wire 44 facing the outside of the predetermined region in the width direction because the higher projection 30 supports the lead wire 44 such that the distance from the lead wire 44 to the heater 23 in the outside of the predetermined region in the width direction is larger than the distance from the lead wire 44 to the predetermined region of the heater 23.

In the above-described embodiments, the height of at least one of projections 30 is set to be higher than other projections to reduce the temperature rise of the lead wire 44. In addition to the above-described configuration including the projection 30 higher than other projections, the present disclosure includes an embodiment described below.

Figure 15:
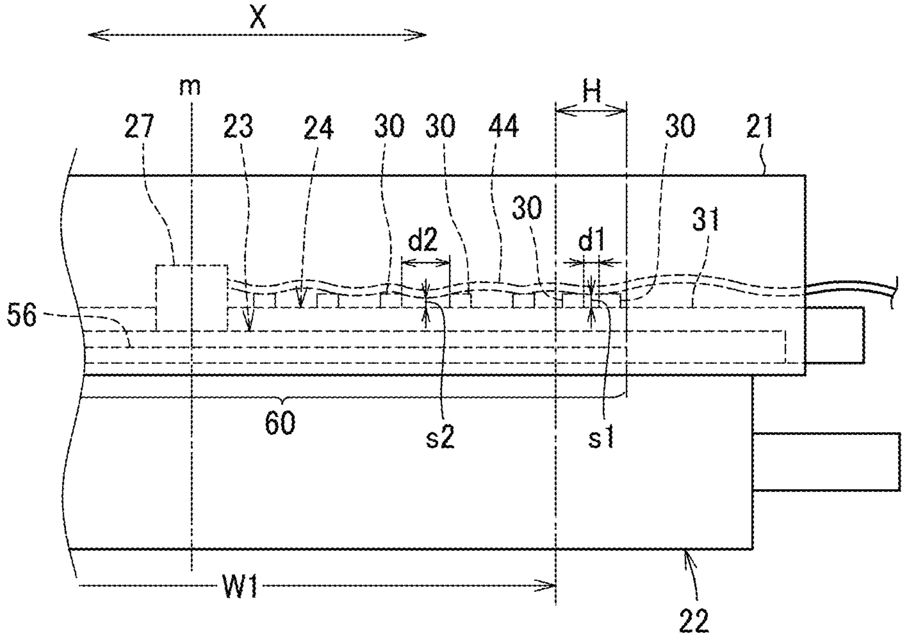
FIG. 15 is a schematic view of a support structure according to still another variation of the embodiment.

Unlike the above embodiments, the fixing device 20 according to the embodiment illustrated in FIG. 15 includes projections 30 separated by an interval d1 that is smaller than an interval d2 between the other projections 30, that is d1<d2 in FIG. 15. Specifically, the interval d1 as a first interval between the projections 30 as first projections facing the outside of the maximum sheet passing region W1 in the width direction and the heat generation area 60 of the heater 23 is smaller than the interval d2 as a second interval between the projections 30 as second projections facing the maximum sheet passing region W1. In this case, the lead wire 44 between the projections 30 separated by the largest interval (that is the interval d2) sags below, which reduces a height s2 from the heater holder 24 to the lead wire 44. In contrast, the lead wire 44 between the projections 30 separated by the small interval (that is the interval d1) is less likely to sag below, which maintains a height s1 from the heater holder 24 to the lead wire 44 to be higher than the height s2. The heights s1, s2, and s3 that is described below from the heater holder 24 to the lead wire 44 each mean the shortest distance from the lead wire 44 to the surface of the heater holder 24 that is the surface facing the lead wire 44 (in other words, the surface opposite a surface of the heater holder 24 that is the surface holding the heater 23). Reducing the interval between the projections 30 as described above enables keeping the height s1 from the heater holder 24 to the lead wire 44 to be higher than the height s2 in a region on which the projections 30 separated by the small interval (that is, the first interval d1) are disposed, and the lead wire 44 is less likely to approach the base 31 of the heater holder 24. As a result, the lead wire 44 facing the excessive temperature rise region H in which the temperature rise easily occurs in the heater 23 when the sheets P1 each having the maximum width continuously pass through the fixing device is less likely to approach the heater 23 than the lead wire 44 facing the region other than the excessive temperature rise region H, which enables easily keeping the distance between the heater 23 and the lead wire 44. Accordingly, the above-described configuration can reduce the temperature rise of the lead wire 44 facing the excessive temperature rise region H.

The projections 30 separated by the small interval are not limited to the projections 30 facing the outside of the maximum sheet passing region W1 in the width direction. For example, as illustrated in FIG. 16, the interval d1 between the projections 30 facing the outside of the maximum sheet passing region W1 in the width direction and the interval d3 between the projections 30 facing the maximum sheet passing region W1 and the outside of the minimum sheet passing region W2 in the width direction may be set to be narrower than the interval d2 between the projections 30 facing the other regions (d1, d3<d2).

Setting the intervals d1 and d3 between the projections 30 facing the outside of the minimum sheet passing region W2 in the width direction to be smaller than the interval d2 between the projections 30 facing the minimum sheet passing region W2 (that is, d1, d3<d2) can keep the height s1 and s3 from the lead wire 44 to the heater holder 24 facing the outside of the minimum sheet passing region W2 in the width direction (in other words, facing a region on which the projections separated by the interval d1 or d3 are disposed) to be higher than the height s2 from the lead wire 44 to the heater holder 24 facing the minimum sheet passing region W2 (in other words, facing a region on which the projections separated by the interval d2 are disposed). The above-described configuration can cope with the temperature rise in the non-sheet passing region not only when the sheets P1 each having the maximum width pass through the fixing device but also when sheets of all sizes pass through the fixing device. That is, the above-described configuration can effectively reduce the temperature rise of the lead wire 44 because the above-described configuration can prevent the lead wire 44 from approaching to the heater 23 and the base 31 of the heater holder 24 in the non-sheet passing region (the region outside the minimum sheet passing region W2) in which the temperature rise may occur when the sheets each having any size pass through the fixing device.

Figure 16:
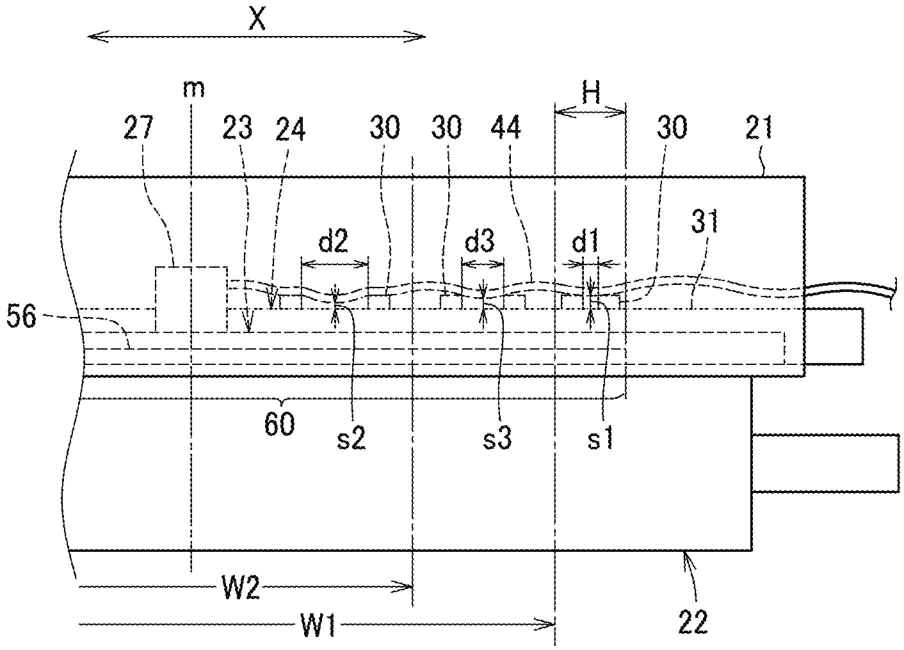
FIG. 16 is a schematic view of a support structure according to still another variation of the embodiment.

In addition, in the case in which the temperature rise outside the maximum sheet passing region W1 is likely to be significant, setting the interval d1 between the projections 30 facing the outside of the maximum sheet passing region W1 in the width direction to be smaller than the interval d3 between the projections 30 facing the maximum sheet passing region W1 and the outside of the minimum sheet passing region W2 in the width direction, that is, d1<d3 as illustrated in FIG. 16 can more reliably reduce the temperature rise of the lead wire 44 disposed at the region in which the temperature rise is particularly likely to occur (that is, the region in which the projections 30 separated by the interval d1 exist). That is, in the present embodiment, the closer the projections 30 to the longitudinal end of the heater 23 in which the temperature rise is likely to be significant, the smaller the interval between the projections 30, that is, d1<d3<d2. As a result, the lead wire 44 is less likely to sag below, and the height from the lead wire 44 to the heater holder 24 can be kept high (s1>s3>s2), which reduces the temperature rise of the lead wire 44.

Note that the projections to be compared for the magnitude relationship of the interval between the projections 30 is determined based on the same reference as the projections 30 in which the heights are compared. In other words, it is sufficient that any one of the intervals between the projections 30 facing the outside of the minimum sheet passing region W2 in the width direction is smaller than the interval between the projections 30 facing the minimum sheet passing region W2. However, the projections 30 facing the minimum sheet passing region W2 is within the region in which the lead wire 44 is routed. In addition, the projections 30 facing the minimum sheet passing region W2 is in the region in which the lead wire 44 can exist, that is, the region J (see FIG. 14) in which the temperature sensor 27 exists, the region extending in the sheet passing direction Y (that is, the sheet conveyance direction). The intervals between the projections 30 to be compared are not limited to the interval between projections facing the minimum sheet passing region W2 and the interval between projections facing the outside of the minimum sheet passing region W2 in the width direction. The intervals between the projections to be compared may be the interval between the projections facing a predetermined region other than the minimum sheet passing region W2 and the interval between the projections facing the outside of the predetermined region in the width direction. The interval between the projections 30 that are at least two projections facing the outside of the predetermined region in the width direction may be smaller than the other intervals between the projections 30 facing the outside of the predetermined region in the width direction. The above-described predetermined region may be defined as desired in addition to the minimum sheet passing region and the maximum sheet passing region.

In the above-described embodiments, at least one of projections 30 is higher than other projections 30, or at least one interval of the projections 30 is narrower than the intervals of the projections 30. However, the fixing device may include projections 30 being higher than other projections 30 and separated by the interval narrower than other intervals of the other projections 30. In addition, the number of the projections 30 supporting the lead wire 44 is not limited to two or more but may be only one.

Figure 17:
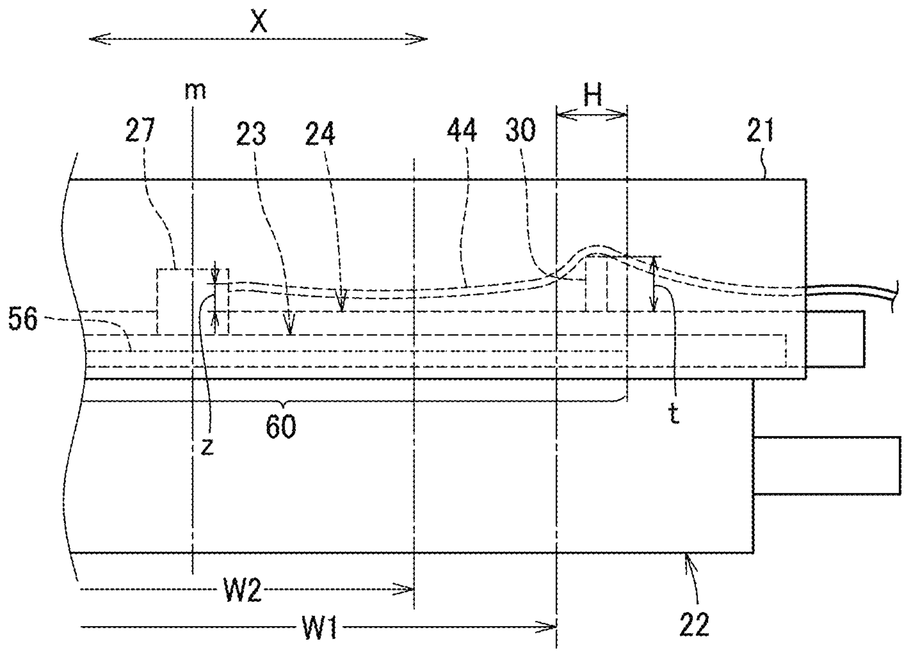
FIG. 17 is a schematic view of a support structure according to still another variation of the embodiment.

For example, as illustrated in FIG. 17, only one projection 30 may face the outside of the maximum sheet passing region W1 in the width direction and the heat generation area 60 of the heater 23. The height t of the projection 30 is preferably higher than a height z of a position at which the lead wire 44 is connected to the temperature sensor 27 (that is, t>z in FIG. 17). In this case, since the projection 30 supports the lead wire 44 facing the outside of the maximum sheet passing region W1 in the width direction in which the temperature rise is likely to occur, the projection 30 can locate the lead wire 44 away from the heater 23 and the base 31 of the heater holder 24 as compared with the lead wire 44 facing the maximum sheet passing region W1. The above-described configuration can prevent the heat transfer, to the lead wire 44, from the region of the heater 23 in which the temperature easily rises. The position at which the one projection 30 is disposed is not limited to the position of the heater holder facing the outside of the maximum sheet passing region W1 in the width direction and may be appropriately selected as long as the position faces the outside of the minimum sheet passing region W2 in the width direction, which is a region in which the temperature easily rises, in accordance with the size of the frequently used sheet.

Next, the arrangement of the projections 30 and the shape of the projection 30 are described. The arrangement of the projections 30 and the shape of the projection 30 that are described below may be applied to any of the projections 30 in the above embodiments.

Figure 18:
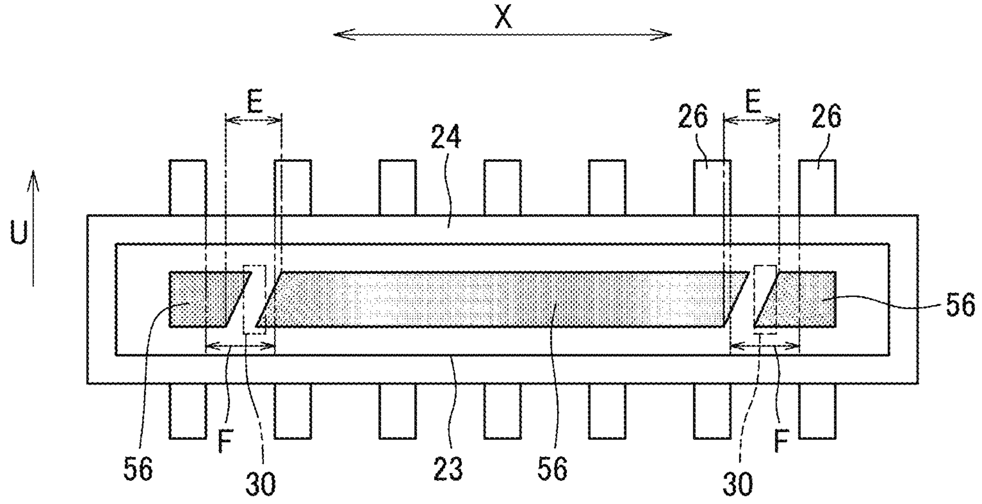
FIG. 18 is a schematic view to illustrate an arrangement of projections.

FIG. 18 is a plan view of the heater holder 24 viewed from the heater 23. As illustrated in FIG. 18, the heater 23 includes a plurality of resistive heat generators 56 arranged at intervals in the longitudinal direction X (that is the sheet width direction). In this case, it is preferable that at least one projection 30 on a right portion of the heater 23 in FIG. 18 is disposed so as to overlap the region E between the resistive heat generators 56 in the longitudinal direction X of the heater 23 (that is the sheet width direction), or disposed at a position shifted from the resistive heat generator 56. In the above, "the projection 30 overlaps the region E" means a state in which at least a part of the projection 30 overlaps the region E between the resistive heat generators 56 when the heater 23 is viewed from a direction orthogonal to the surface on which the resistive heat generators 56 are disposed (in other words, viewed from a direction orthogonal to the paper surface of FIG. 18).

Positioning the projection 30 so as to overlap the region E between the resistive heat generators 56 as described above enables reducing the temperature rise of the projection 30. Since the temperature in the region E between the resistive heat generators 56 is less likely to rise than the temperature in a region on which the resistive heat generator 56 is located, positioning the projection 30 so as to overlap the region E can reduce the temperature rise of the projection 30. Thus, the amount of heat transferred from the projection 30 to the lead wire 44 can be reduced, and the temperature rise of the lead wire 44 can be reduced. In the fixing device including a plurality of temperature sensors, a lead wire 44 is routed in a left portion of the heater 23 in FIG. 18 in addition to the right portion of the heater 23. In this case, a projection 30 may be positioned so as to overlap a region E between the resistive heat generators in the left portion of the heater 23 (see an alternate long and two short dashes line in FIG. 18).

In addition, as illustrated in FIG. 18, the fixing device 20 includes a plurality of guides 26 arranged at intervals in the longitudinal direction X of the heater 23 (that is the sheet width direction). In this case, it is preferable that at least one projection 30 is disposed at a position shifted from the guides 26 in the longitudinal direction X of the heater 23 (that is the sheet width direction), (the position within a range indicated by "F" in FIG. 18). Since the above-described configuration can prevent heat stored in the guide 26 from affecting the projection 30, the above-described configuration can reduce the temperature rise of the projection 30 and, as a result, reduce the temperature rise of the lead wire 44. Similarly, at least one projection 30 on the left portion of the heater 23 in FIG. 18, which is indicated by the alternate long and two short dashes line in FIG. 18, may be disposed at a position shifted from the guides 26 in the longitudinal direction X of the heater 23 (the sheet width direction).

Figure 19:
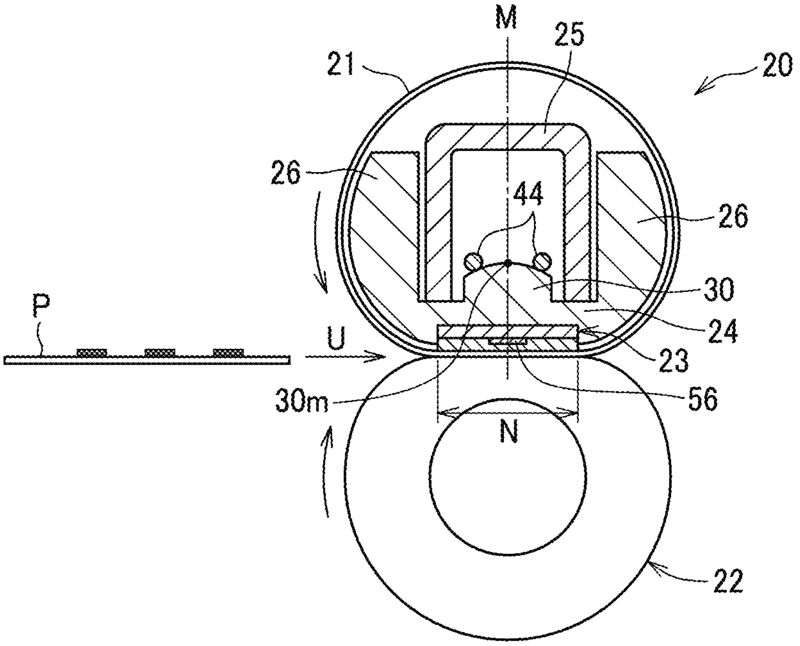
FIG. 19 is a schematic view of the fixing device to illustrate a shape of a projection.

Additionally, as illustrated in FIG. 19, the heater 23 includes the resistive heat generator 56 at the center M of the heater 23 or the nip N in the sheet conveyance direction U. In this case, the projection preferably has a cross-sectional shape illustrated in FIG. 19, having a center 30*m* in the sheet conveyance direction higher than both sides of the projection. In the cross-sectional shape, if the lead wire 44 is disposed at the center 30*m* of the projection 30 in the sheet conveyance direction, a large distance can be secured between the lead wire 44 and the heater 23, which easily reduces the temperature rise of the lead wire 44. In a case in which the gravity moves the lead wire 44 from the center 30*m* of the projection 30 in the sheet conveyance direction to one of both sides of the projection 30, the cross-sectional shape of the projection 30 having the center 30*m* higher than both sides of the projection 30 in the sheet conveyance direction moves the lead wire 44 to be away from the resistive heat generators 56. As a result, the above-described configuration can reduce the temperature rise of the lead wire 44 also in this case.

Figure 20:
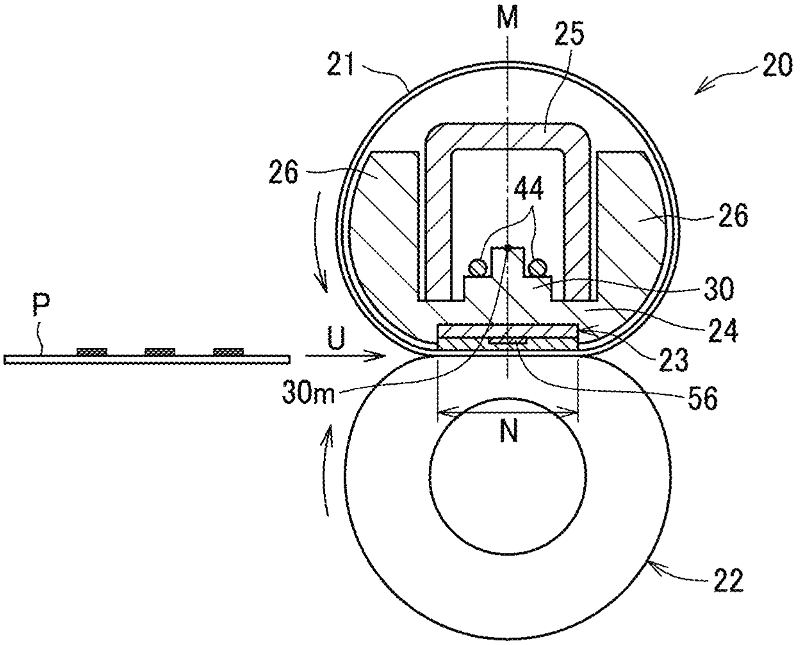
FIG. 20 is a schematic view of the fixing device including the projection that has a shape different from the shape of the projection of FIG. 19.

The shape of the projection 30 is not limited to the shape illustrated in FIG. 19 having a tip end surface of the projection 30 that is a convex curved surface shape gradually rising toward the center 30*m* in the sheet conveyance direction. As illustrated in FIG. 20, the shape of the projection 30 may have a convex step shape in which the tip end surface rapidly rises at the center 30*m* and its vicinity in the sheet conveyance direction.

Figure 21:
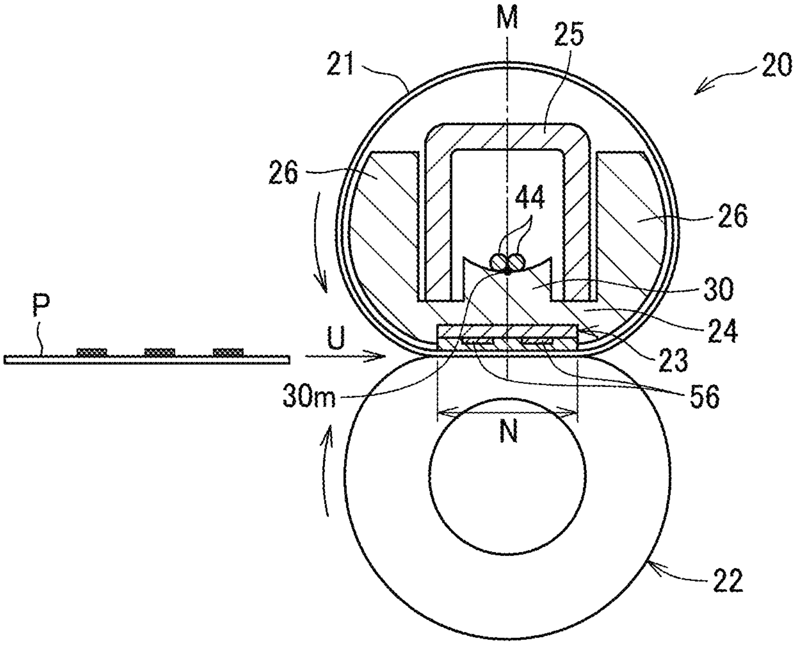
FIG. 21 is a schematic view of the fixing device including the projection that has a shape different from the shapes of the projections of FIGS. 19 and 20.

As illustrated in FIG. 21, in the case in which the resistive heat generators 56 are disposed on both end portions with respect to the center M of the nip N or the heater 23 in the sheet conveyance direction, it is preferable that the center 30*m* of the projection 30 in the sheet conveyance direction is formed lower than tips of both sides of the projection 30. In this case, since the gravity moves the lead wire 44 toward the center 30*m* of the projection 30 in the sheet conveyance direction, the lead wire 44 can be set away from the resistive heat generator 56, which can reduce the temperature rise of the lead wire 44.

Figure 22:
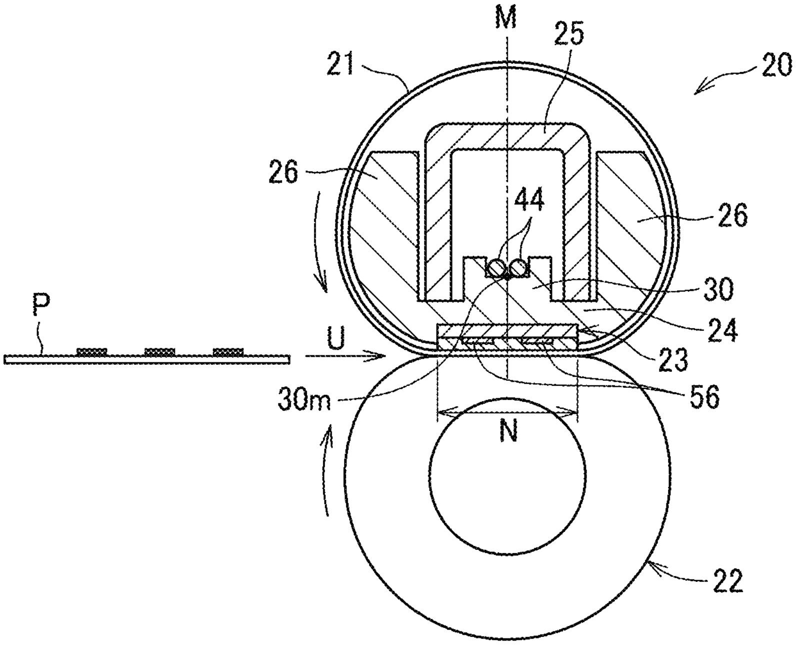
FIG. 22 is a schematic view of the fixing device including the projection that has a shape different from the shapes of the projections of FIGS. 19 to 21.

The shape of the projection 30 is not limited to the shape illustrated in FIG. 21 having a tip end surface of the projection 30 that is a concave curved surface shape gradually lowering toward the center 30*m* in the sheet conveyance direction. As illustrated in FIG. 22, the shape of the projection 30 may have a concave step shape in which the tip end surface rapidly lowers at the center 30*m* and its vicinity in the sheet conveyance direction.

The fixing device according to the above-described embodiments may have the following configurations as additional variations.

Figure 23:
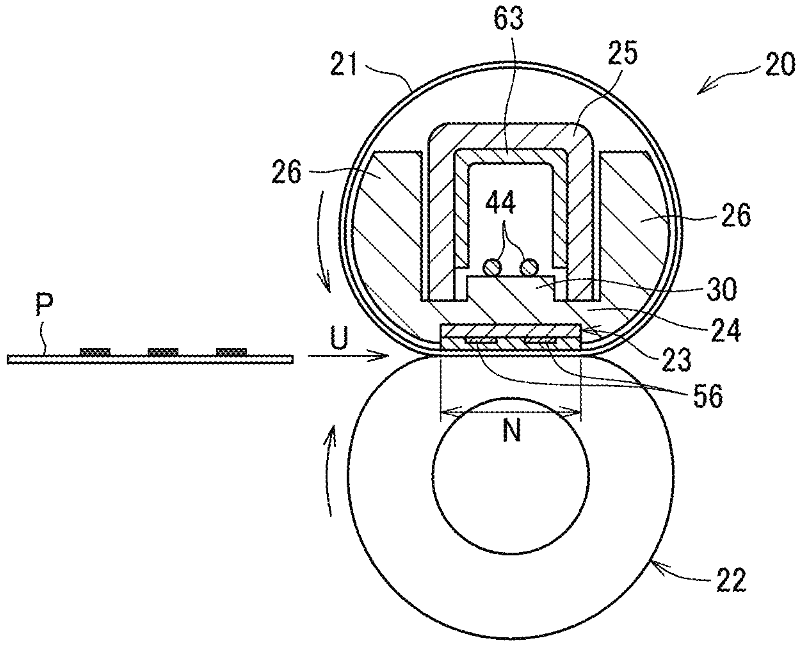
FIG. 23 is a schematic view of the fixing device according to still another variation of the embodiment.

In the example illustrated in FIG. 23, the fixing device 20 includes a low thermal conductor 63 disposed on the inner side of the stay 25 that is a side facing the lead wire 44. The stay 25 supports the heater holder 24 to prevent the heater holder 24 from being deformed, which enables forming a desired shape of the nip N. The stay 25 having a U-shaped cross section as illustrated in FIG. 23 can surely have a large area moment of inertia (that is a resistance for a bending force) and ensure the rigidity while the stay 25 is miniaturized. In addition, the U-shaped cross section can prevent the interference of the stay 25 with the projections of the heater holder 24 and the fixing belt 21.

However, heat transfers from the heater 23 to the heater holder 24 and the stay 25 in contact with the heater holder 24, increasing the temperature of the stay 25. In particular, since the stay 25 made of metal has a good thermal conductivity, the temperature of the stay 25 is likely to increase. Accordingly, the lead wire 44 does not preferably come into contact with the stay 25 to reduce the temperature rise of the lead wire 44.

For this reason, a low thermal conductor 63 having a lower thermal conductivity than the stay 25 is disposed between the inner surface of the stay 25 and the lead wire 44 as illustrated in FIG. 23. The above-described configuration can prevent the lead wire 44 from coming into direct contact with the stay 25. Even if the lead wire 44 comes into contact with the low thermal conductor 63, an amount of heat transferred from the low thermal conductor 63 to the lead wire 44 is smaller than an amount of heat transferred by direct contact of the lead wire 44 with the stay 25. Therefore, the temperature rise of the lead wire 44 can be reduced. The low thermal conductor 63 may be fixed to the inner surface of the stay 25 via a screw or a snap-fit mechanism. Alternatively, the low thermal conductor 63 may be disposed on a temperature sensor holder or a belt holder described below. In the configurations illustrated in FIGS. 19 to 23, the heater holder 24 and the projection 30 are integrally formed as one component. In addition to the configurations illustrated in FIGS. 19 to 23, the heater holder 24 and the projection 30 may be integrally formed as the single component in the configurations of the other embodiments.

Figure 24:
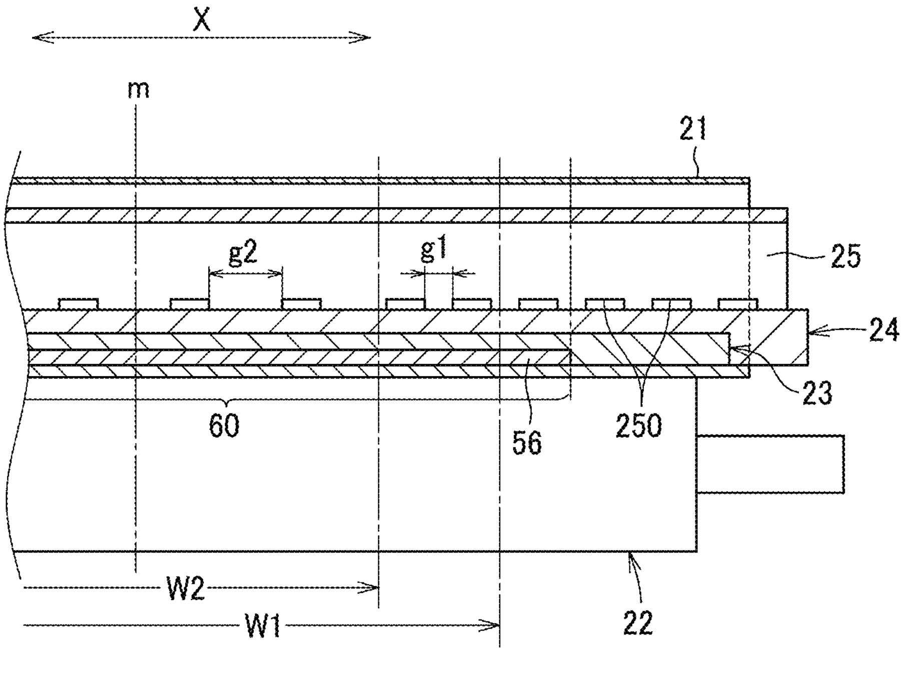
FIG. 24 is a partial schematic view of the fixing device according to still another variation of the embodiment.

To reduce a temperature rise of the stay 25 itself, the stay 25 may have a plurality of recesses 250 in a side facing the heater holder 24 as illustrated in FIG. 24. Since the plurality of recesses 250 reduces the contact area of the stay 25 with respect to the heater holder 24, heat transfer from the heater holder 24 to the stay 25 decreases, reducing the temperature rise of the lead wire 44 caused by the heat transferred from the stay 25. Intervals between the recesses 250 of the stay 25 are not limited to same intervals. For example, as illustrated in FIG. 24, an interval g1 between the recesses 250 of the stay 25 facing the heat generation area 60 and the region outside the minimum sheet passing region W2 in the width direction that is a region in which the temperature of the heater 23 is likely to rise may be smaller than an interval g2 between the recesses 250 of the stay 25 facing the minimum sheet passing region W2, that is g1<g2.

The above-described embodiments are illustrative and do not limit this disclosure. It is therefore to be understood that within the scope of the appended claims, numerous additional modifications and variations are possible to this disclosure otherwise than as specifically described herein.

Figure 25:
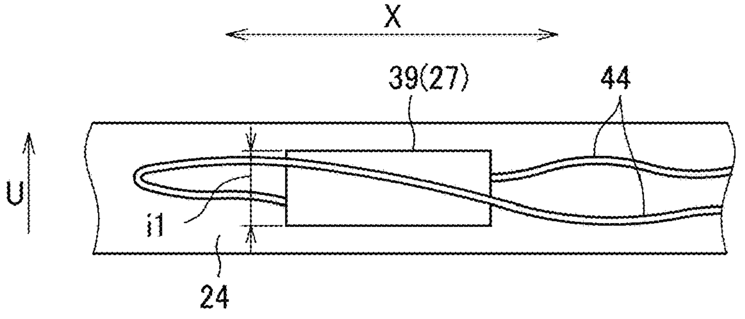
FIG. 25 is a top view of a thermistor with lead wires attached to both sides of the thermistor.
Figure 26:
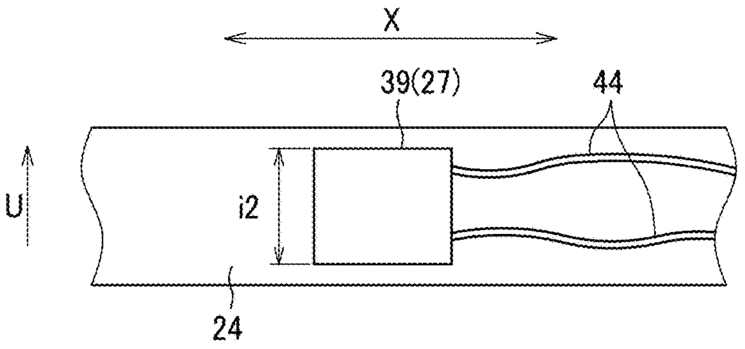
FIG. 26 is a top view of a thermistor with lead wires attached to one side of the thermistor.

The thermistor is an example of the temperature sensor 27 used in the fixing device. In general, two types of thermistors exist. One type of thermistor 39 as illustrated in FIG. 25 includes the lead wires 44 attached to both sides of the thermistor 39. the other type of thermistor 39 as illustrated in FIG. 26 includes the lead wires 44 attached to one side of the thermistor 39. The fixing device according to the above-described embodiments can employ any type of the thermistor. However, the one type of thermistor 39 including the lead wires 44 attached to both sides of the thermistor 39 as illustrated in FIG. 25 is smaller than the other type of thermistor 39 including the lead wires 44 attached to the one side of the thermistor 39 as illustrated in FIG. 26 in the sheet conveyance direction U, that is, i1<i2. Therefore, employing the one type of thermistor 39 enables downsizing the fixing device in the sheet conveyance direction U. One of lead wires 44 attached to both sides of the thermistor 39 is bent and routed as illustrated in FIG. 25 so that the lead wires 44 can be collectively arranged on one side of the thermistor 39. Since the above-described configurations according to the embodiments can reduce the temperature rise of the lead wire 44, a lead wire having a low heat-resistant temperature and excellent flexibility can be adopted as the lead wire 44, which facilitate the layout in which the lead wire 44 is bent and routed.

Figure 27:
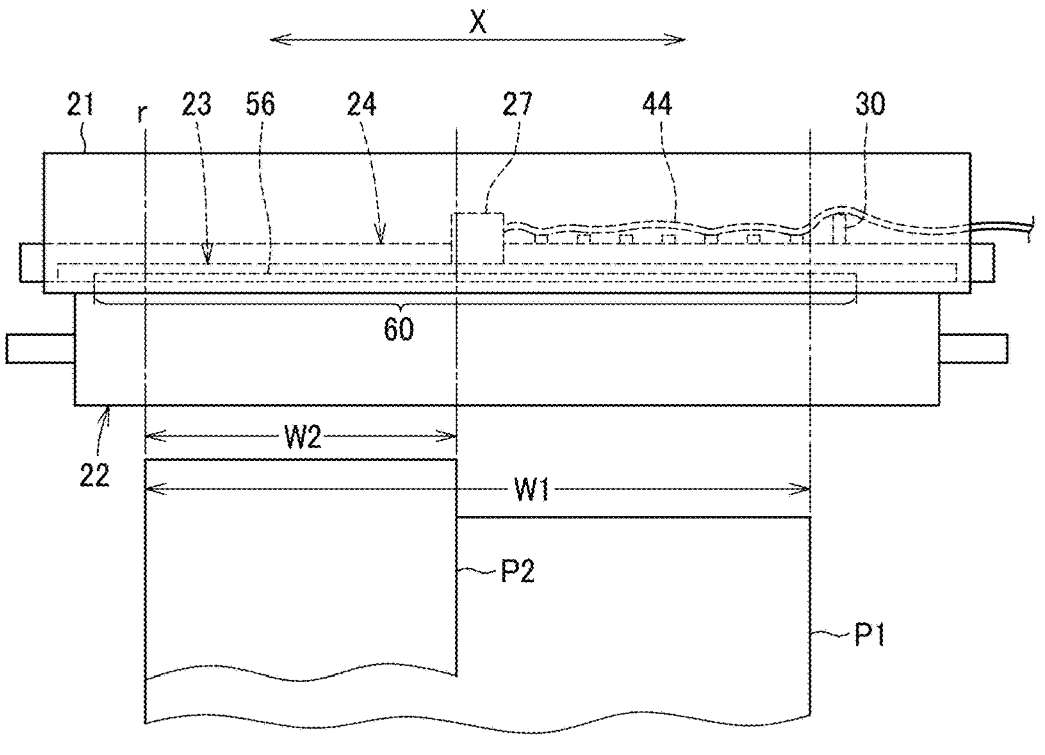
FIG. 27 is a schematic view of the fixing device according to the embodiment incorporated in the image forming apparatus using an end conveyance reference system.

The image forming apparatus in which the embodiments of the present disclosure are applied is not limited to the image forming apparatus using a center conveyance reference system in which the sheets having various sizes are conveyed so that the center positions of the various sizes of sheets in the width direction pass through a same position in the image forming apparatus. The embodiments of the present disclosure may also be applied to an image forming apparatus using an end conveyance reference system in which the sheets having various sizes are conveyed so that one ends of the sheets in the width direction thereof pass through a same position in the image forming apparatus. The maximum sheet passing region W1 of the heater in the end conveyance reference system is, as illustrated in FIG. 27, a region having a length of the maximum sheet width W1 or W1+5 mm from a conveyance reference position r to convey the sheets P1 and P2, and the minimum sheet passing region W2 is a region having a length of the minimum sheet width W2 or W2+5 mm from the conveyance reference position r. In the image forming apparatus using the end conveyance reference system, the projection 30 also secures a large distance from the heater 23 to the lead wire 44 in a region facing the outside of the minimum sheet passing region W2 in the width direction and the heat generation area 60 of the heater 23 and, therefore, can reduce the temperature rise of the lead wire 44 similarly to the above-described embodiments.

Figure 28:
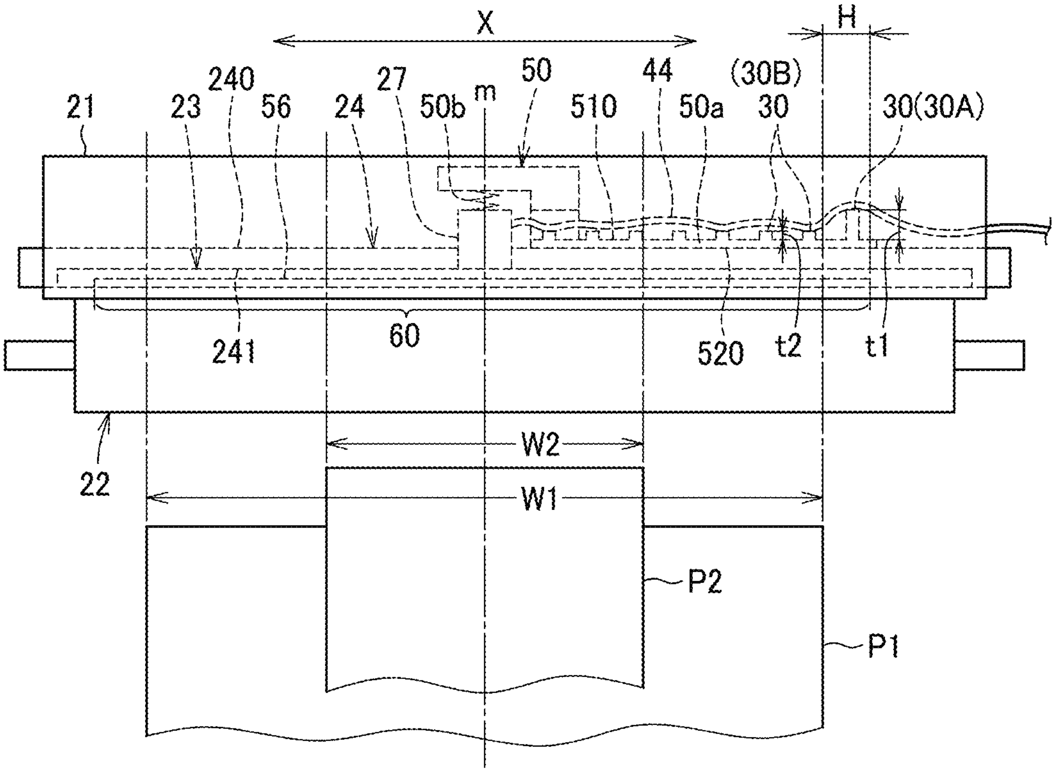
FIG. 28 is a schematic view of a support structure supporting the lead wire coupled to the temperature sensor in the fixing device according to an embodiment different from the embodiment illustrated in FIG. 6.

FIG. 28 is a schematic view of a support structure supporting the lead wire 44 coupled to the temperature sensor 27 in the fixing device according to the present embodiment that is different from the embodiment illustrated in FIG. 6.

As illustrated in FIG. 28, the temperature sensor 27 is coupled to one end of the lead wire 44 as the conductor having flexibility. The other end of the lead wire 44 is coupled to the controller disposed in the body of the image forming apparatus. The lead wire 44 includes a conductive wire and an insulator covering the conductive wire to ensure insulation and heat resistance. A sensor holder 50 as a temperature sensor holder holding the temperature sensor 27 is disposed on the first surface 240 (that is the upper surface of the heater holder 24 in FIG. 28) of the heater holder 24 opposite to the second surface 241 holding the heater 23. The sensor holder 50 includes a main body 50*a* disposed on the heater holder 24 and a spring 50*b* as a biasing member assembled on the main body 50*a*. The spring 50*b* presses the temperature sensor 27 against the heater 23 to hold the temperature sensor 27 and maintain the temperature sensor 27 in contact with the heater 23.

The lead wire 44 is disposed on the sensor holder 50 that is on the stay side face of the sensor holder 50 to avoid direct influence of heat of the heater 23 facing the nip side face of the heater holder 24 that is opposite the stay side face. In other words, the lead wire 44 is routed on a first surface 510 of the sensor holder 50 (that is, on an upper surface of the main body 50*a* of the sensor holder 50 in FIG. 28). The first surface 510 is opposite to a second surface 520 of the sensor holder 50, the second surface 520 facing the heater 23. A plurality of projections 30 as conductor supports supporting the lead wire 44 is disposed on the first surface 510 of the sensor holder 50, the first surface 510 facing the lead wire 44.

The plurality of projections 30 projects from the main body 50*a* of the sensor holder 50 in a direction away from the heater 23. The plurality of projections 30 are arranged at intervals in the longitudinal direction X of the heater 23.

A tip of each projection 30 supports the lead wire 44 so as to set a gap between the lead wire 44 and the main body 50*a* of the sensor holder 50 on which the projections 30 are disposed, and, as a result, the lead wire 44 is not in contact with the main body 50*a*. In other words, the sensor holder 50 includes the main body 50*a* having the first surface 510 and the second surface 520 opposite to the first surface 510. The second surface 520 faces the heater 23 via the heater holder 24. On the first surface 510, the plurality of projections 30 is disposed. As described above, the plurality of projections 30 supporting the lead wire 44 avoids contact between the lead wire 44 and the main body 50*a* and reduces the contact area of the lead wire 44 with respect to the sensor holder 50. The lead wire 44 having lower rigidity than a sheet metal, a jumper wire, or the like needs a member supporting the lead wire 44 to hold the lead wire 44 at a position away from the sensor holder 50. For this reason, the sensor holder 50 in the present embodiment includes the plurality of projections 30 supporting the lead wire 44 to reduce the contact area of the lead wire 44 with respect to the sensor holder 50, preventing heat transfer from the heater 23, the heater holder 24, and the sensor holder 50 to the lead wire 44.

In addition, since the projection 30 is disposed not on the heater holder 24 that is in direct contact with the heater 23 and the fixing belt 21 but on the sensor holder 50 that is not in direct contact with the heater 23 and the fixing belt 21, the above-described configuration can reduce the temperature rise of the projection 30. Since the temperature of the sensor holder 50 is less likely to rise than the temperature of the heater holder 24, placing the projection 30 on the sensor holder 50 can efficiently reduce the temperature rise of the projection 30. Since the sensor holder 50 is a component separate from the heater holder 24, a temperature difference is generated between the heater holder 24 and the sensor holder 50 due to contact thermal resistance, which further prevents the temperature of the projection 30 from rising. Since the above-described projection 30 in the present embodiment is not on the heater holder 24 but on the sensor holder 50 as a component that is interposed between the heater holder 24 and the lead wire 44 and separate from the heater holder 24, the temperature rise of the projection 30 is effectively reduced, and the temperature rise of the lead wire 44 supported by the projections 30 is also effectively reduced.

The lead wire 44 may not be in contact with the tip of the projection 30. That is, the projections 30 supporting the lead wire 44 not to come into contact with the main body 50*a* of the sensor holder 50 includes the projection that is not always in contact with the lead wire 44 in addition to the projection 30 in contact with the lead wire 44. For example, a projection 30A2 illustrated in FIG. 30, which is described below, dose not actually come into contact with the lead wire 44. However, when the lead wire 44 approaches the main body 50*a*, the projection 30A2 supports the lead wire 44 not to come into contact with the main body 50*a*. In the present disclosure, the projections 30 supporting the lead wire 44 includes the projection 30A2.

In FIG. 28, the projection 30A that is the very end of the plurality of projections 30 in the longitudinal direction of the sensor holder 50 that is also the longitudinal direction of the heater 23 (that is the right end in FIG. 28) is designed to be higher than the other projections 30B in a projecting direction from the sensor holder 50 (that is, the main body 50*a*), which means t1>t2 in FIG. 28. The projection 30A higher than other projections 30B is disposed corresponding to a portion of the heater 23 in which the temperature of the heater 23 is higher than temperatures of other portions of the heater 23 to prevent the heat of the heater 23 from affecting the lead wire 44.

To cope with the above-described disadvantage, the fixing device 20 according to the embodiment of the present disclosure includes a projection 30A and projections 30B as illustrated in FIG. 28. The projection 30A faces the excessive temperature rise region H inside the heat generation area 60 of the heater 23 in the width direction and outside the maximum sheet passing region W1 in the width direction. The projection 30A is higher than the projections 30B facing a region other than the region H, that is t1>t2 in FIG. 28. As a result, a distance from the lead wire 44 to the excessive temperature rise region H of the heater 23 is larger than a distance from the lead wire 44 to the region other than the excessive temperature rise region H of the heater 23.

In the above-described configuration, heat is hardly transferred from the heater 23 to the lead wire 44. Even if the sheets P1 each having the maximum width continuously pass through the fixing device and cause the excessive temperature rise in the excessive temperature rise region H of the heater 23, the above-described configuration can reduce temperature rise of the lead wire 44, which can prevent the deterioration and damage of the lead wire 44. The above-described configuration that can prevent the deterioration and damage of the lead wire 44 enables continuously printing the sheets P1 each having the maximum width, without reducing the productivity.

The position of the above-described projection 30A higher than the projections 30B is not limited to a position facing the excessive temperature rise region H illustrated in FIG. 28 and may be a position of the sensor holder 50 facing the outside of the excessive temperature rise region H of the heater 23 in the longitudinal direction X.

Figure 29:
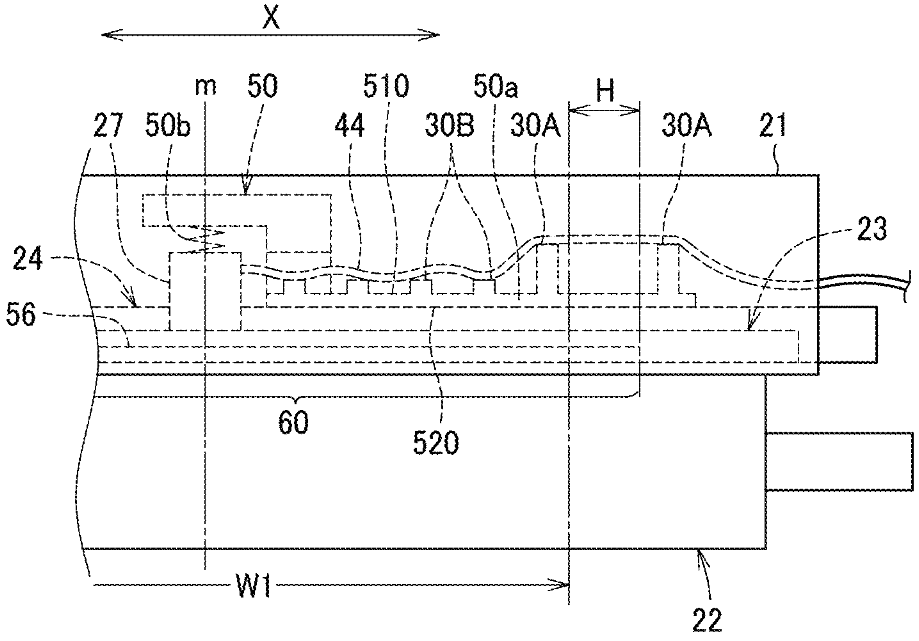
FIG. 29 is a schematic view of a support structure according to a variation of the embodiment of FIG. 28.

For example, as illustrated in FIG. 29, the projections 30A higher than the projections 30B may be disposed on positions of the sensor holder 50, the positions corresponding to outside of both ends of the excessive temperature rise region H in the width direction. The configuration illustrated in FIG. 29 can ensure the larger distance from the lead wire 44 to the excessive temperature rise region H of the heater 23 than the distance from the lead wire 44 to the other region of the heater 23, which can reduce the temperature rise of the lead wire 44. In addition, since the projections 30A illustrated in FIG. 29 do not face the excessive temperature rise region H, the above-described configuration can reduce the temperature rise of the projection 30A itself. Reducing the temperature rise of the projection 30A itself can reduce the amount of heat transmitted from the projection 30A to the lead wire 44. As a result, the above-described configuration can effectively reduce the temperature rise of the lead wire 44. Effectively reducing the temperature rise of the lead wire 44 enables selecting an inexpensive material (a material having heat resistance that is not so high) as the material of the lead wire 44 or the insulator covering the lead wire 44 to achieve cost reduction. On the other hand, since the fixing device 20 illustrated in FIG. 28 includes the projection 30A facing the excessive temperature rise region H and does not include the projection 30A disposed at the end of the sensor holder 50 corresponding to the outside of the excessive temperature rise region H in the longitudinal direction of the sensor holder 50, the configuration illustrated in FIG. 28 can omit a space to position the projection 30A at the end of the sensor holder 50, which gives an advantage that the longitudinal size of the sensor holder 50 can be reduced.

Figure 30:
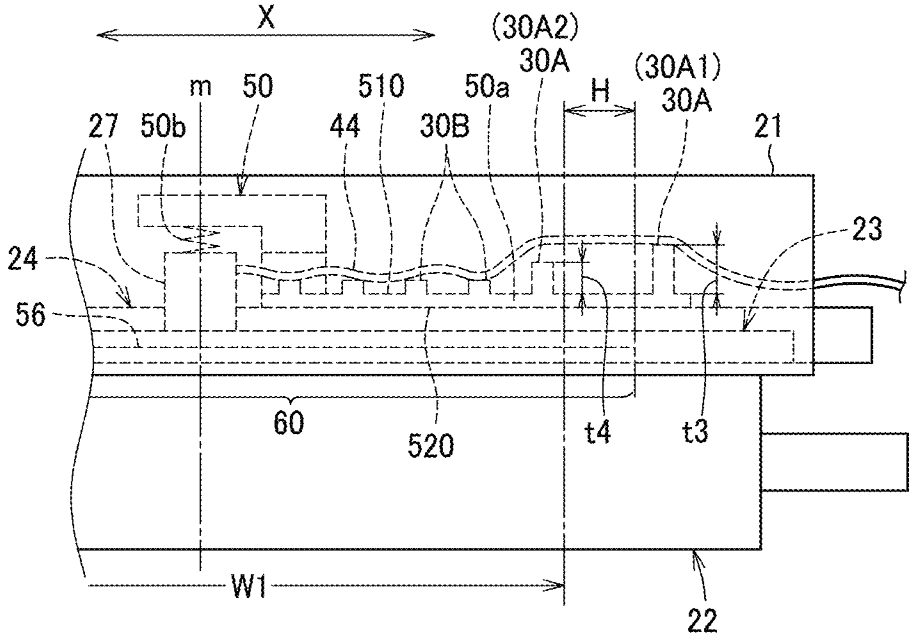
FIG. 30 is a schematic view of a support structure according to another variation of the embodiment of FIG. 28.

In addition, as illustrated in FIG. 30, among the projections 30A higher than the projections 30B, the projection 30A1 facing the outside from the right side of the excessive temperature rise region H may be higher than the projection 30A2 facing the inside from the left side of the excessive temperature rise region H, that is, t3>t4 in FIG. 30. In this example, the lead wire 44 is mainly supported by the higher projection 30A1. The higher projection 30A1 facing the outside from the heat generation area 60 in the width direction is less affected by heat of the heater 23 than the projection 30A2 facing the heat generation area 60. Since the amount of heat transmitted from the higher projection 30A1 to the lead wire 44 is less than the amount of heat transmitted from the projection 30A2 to the lead wire 44, the above-described configuration can effectively reduce the temperature rise of the lead wire 44.

Figure 31:
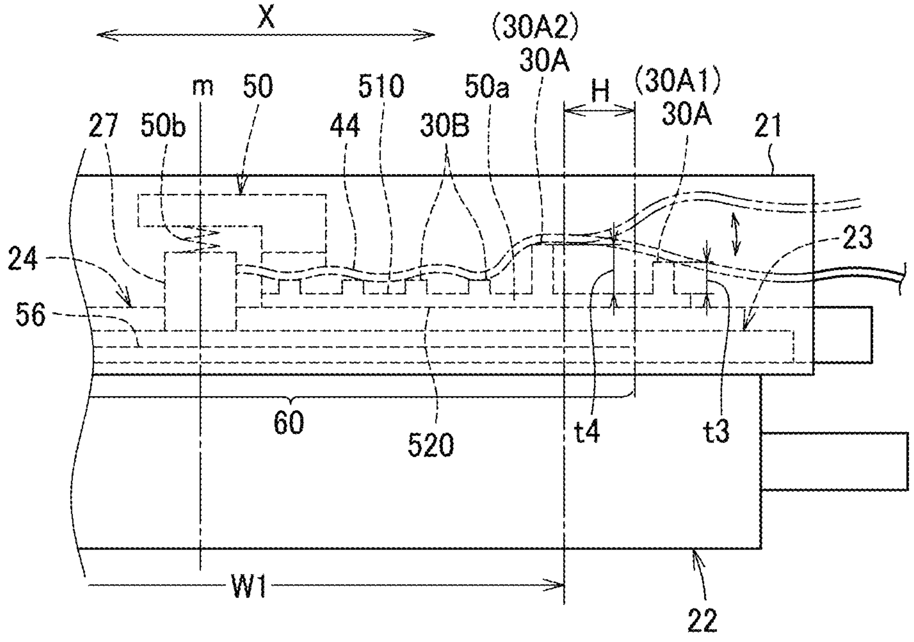
FIG. 31 is a schematic view of a support structure according to still another variation of the embodiment of FIG. 28.

Conversely, as illustrated in FIG. 31, among the projections 30A higher than the projections 30B, the projection 30A2 facing the inside from the left side of the excessive temperature rise region H may be higher than the projection 30A1 facing the outside from the right side of the excessive temperature region H, that is, t3<t4 in FIG. 31. The configuration illustrated in FIG. 31 reduces the height of the projection 30A1 disposed on an end of the sensor holder 50 in the longitudinal direction of the sensor holder 50, which improves the degree of design freedom in routing the lead wire 44.

Figure 32:
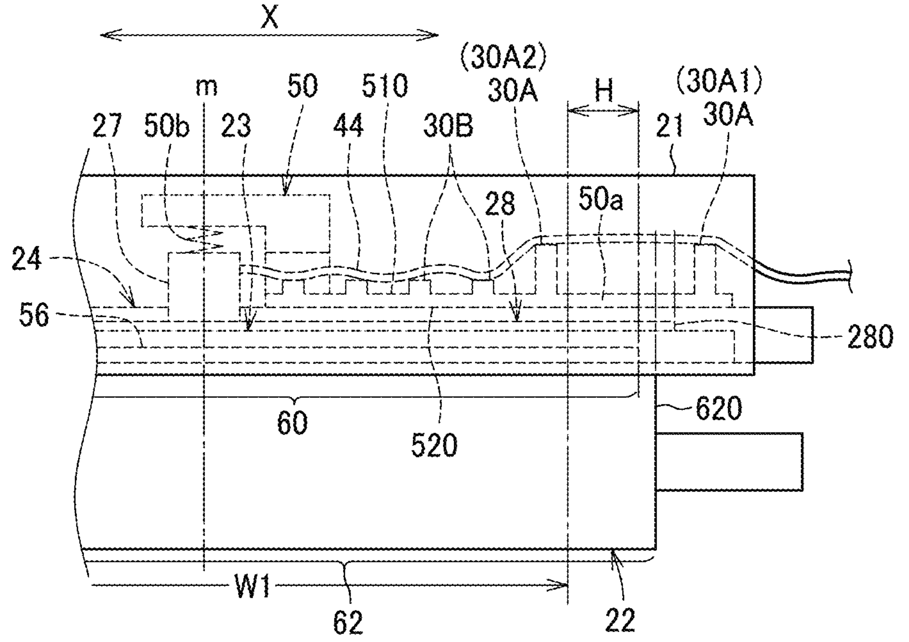
FIG. 32 is a schematic view of a support structure according to still another variation of the embodiment of FIG. 28.

Next, an embodiment illustrated in FIG. 32 is described below. In the embodiment illustrated in FIG. 32, the projection 30A1 disposed on the end of the sensor holder 50 facing the outside of the excessive temperature rise region H in the longitudinal direction of the sensor holder 50 is closer to an edge of the sensor holder 50 (that is the right side of the sensor holder 50 in FIG. 10) in the longitudinal direction than to the edge 620 of the roller portion 62 (that is the portion including the elastic layer) of the pressure roller 22. The above-described configuration including the projection 30A1 that faces the outside of the excessive temperature rise region H and the outside of the roller portion 62 of the pressure roller 22 in the longitudinal direction can prevent heat transfer from the pressure roller 22 to the projection 30A1 facing the outside of the excessive temperature rise region H via the heater holder 24 and the sensor holder 50, which reduces the temperature rise of the projection 30A1. Reducing the temperature rise of the projection 30A1 can reduce the amount of heat transmitted from the projection 30A1 to the lead wire 44. As a result, the above-described configuration can effectively reduce the temperature rise of the lead wire 44 from rising.

In addition, when the fixing device 20 includes the thermal equalization plate 28 as the thermal conduction aid between the heater 23 and the heater holder 24 as illustrated in FIG. 32, it is preferable to suppress influence of heat transferred from the thermal equalization plate 28 to the projection 30A1. The thermal equalization plate 28 is made of the material having the higher thermal conductivity than the thermal conductivity of the heater holder 24, such as copper, aluminum, or silver. The thermal equalization plate 28 moves heat from the heater 23 in the longitudinal direction of the fixing belt 21 to uniformly heat the fixing belt 21. As illustrated in FIG. 32, the projection 30A1 disposed on the end of the sensor holder 50 facing the outside of the excessive temperature rise region H in the longitudinal direction of the sensor holder 50 is closer to the edge of the sensor holder 50 (that is the right side of the sensor holder 50 in FIG. 32) in the longitudinal direction than to the longitudinal edge 280 of the thermal equalization plate 28, which can prevent heat transfer from the thermal equalization plate 28 to the projection 30A1 facing the outside of the excessive temperature rise region H in the longitudinal direction and effectively reduce the temperature rise of the projection 30A1.

In each of the above-described embodiments, one or some projections 30 higher than other projections increase the distance from the lead wire 44 to the heater 23 in the excessive temperature rise region H in which the excessive temperature rise occurs when the sheets each having the maximum width pass through the fixing device. However, the temperature rise in the non-sheet passing region when the sheets continuously pass through the fixing device is not limited to the case in which the sheets P1 each having the maximum width pass through the fixing device. Passing the sheets having any sizes smaller than the heat generation area 60 of the heater 23 through the fixing device may cause the temperature rise in the non-sheet passing region of the heater 23.

Figure 33:
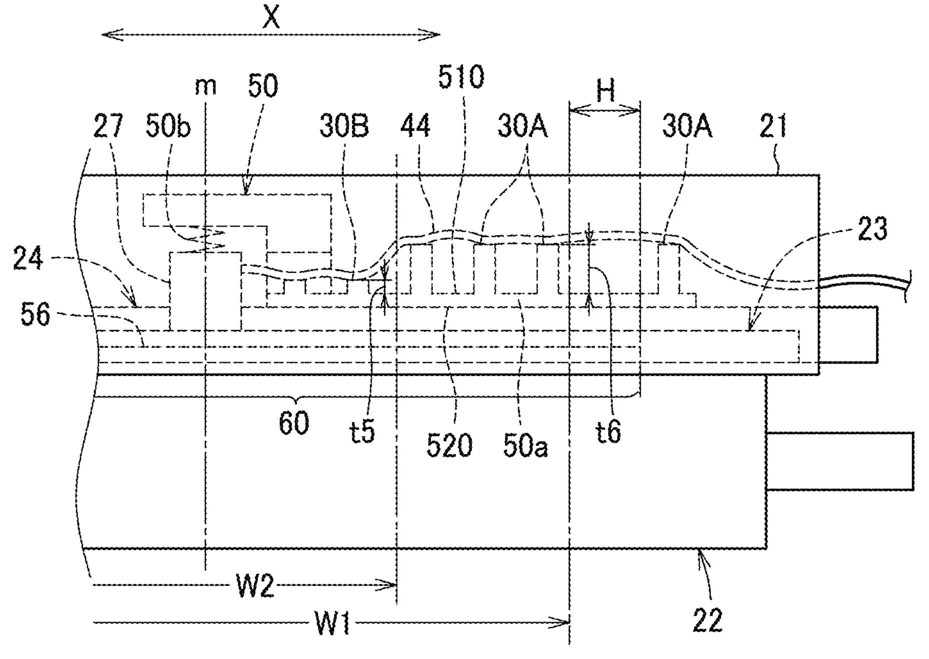
FIG. 33 is a schematic view of a support structure according to still another variation of the embodiment of FIG. 28.

For this reason, as illustrated in FIG. 33, not only the projection 30A facing the outside of the maximum sheet passing region W1 in the width direction but also the projection 30A facing the inside of the maximum sheet passing region W1 in the width direction may be higher than the projections 30B facing the other region. Specifically, the fixing device 20 includes the projection 30A facing the outside of the minimum sheet passing region W2 in the width direction higher than the projection 30B facing the minimum sheet passing region W2, that is, t6>t5 in FIG. 33. Since the distance from the heater 23 to the lead wire 44 facing the outside of the minimum sheet passing region W2 in the width direction is larger than the distance from the heater 23 to the lead wire 44 facing the minimum sheet passing region W2, the above-described configuration can reduce the temperature rise of the lead wire 44 facing the non-sheet passing region of the sheet having any size.

Figure 34:
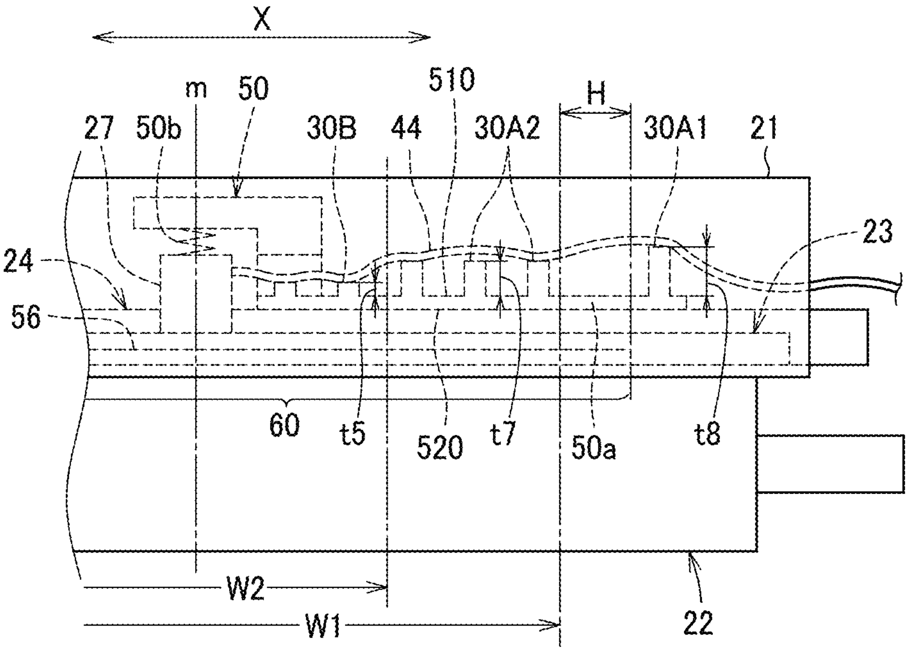
FIG. 34 is a schematic view of a support structure according to still another variation of the embodiment of FIG. 28.

Alternatively, the fixing device 20 according to an embodiment illustrated in FIG. 34 includes the projections 30A2 that face the maximum sheet passing region W1 and each have a height different from the height of the projection 30A1 facing the outside of the maximum sheet passing region W1 in the width direction. Specifically, the height t7 of the projection 30A2 facing the maximum sheet passing region W1 and the outside of the minimum sheet passing region W2 in the width direction is set to be lower than the height t8 of the projection 30A1 facing the outside of the maximum sheet passing region W1 in the width direction as illustrated in FIG. 34. Accordingly, the fixing device 20 according to the embodiment illustrated in FIG. 34 includes the highest projection 30A1 facing the outside of the maximum sheet passing region W1 in the width direction, the second highest projection 30A2 facing the maximum sheet passing region W1 and the outside of the minimum sheet passing region W2 in the width direction, and the lowest projection 30B facing the minimum sheet passing region W2, that is, t8>t7>t5 in FIG. 12.

Setting the height t7 of the projection 30A2 facing the outside of the minimum sheet passing region W2 in the width direction and the inside of the maximum sheet passing region W1 in the width direction to be lower than the height t8 of the projection 30A1 facing the outside of the maximum sheet passing region W1 in the width direction can enhance the flexibility of the layout. Setting the height t7 of the projection 30A2 facing the outside of the minimum sheet passing region W2 in the width direction and the inside of the maximum sheet passing region W1 in the width direction to be low reduces the effect of preventing the heat transfer to the lead wire 44 to some extent. However, reducing the productivity when the small sheets each having a smaller width than the maximum sheet width pass through the fixing device to reduce the temperature rise in the non-sheet passing region as needed enables controlling the temperature rise of the lead wire 44 in the non-sheet passing region to be within an allowable range.

In the above-described embodiments, the projections 30A including the projections 30A1 and 30A2 may be higher than at least the projection 30B facing the minimum sheet passing region W2. However, the projection 30B facing the minimum sheet passing region W2 to be compared with the projection 30A is within the region in which the lead wire 44 is routed.

Figure 35:
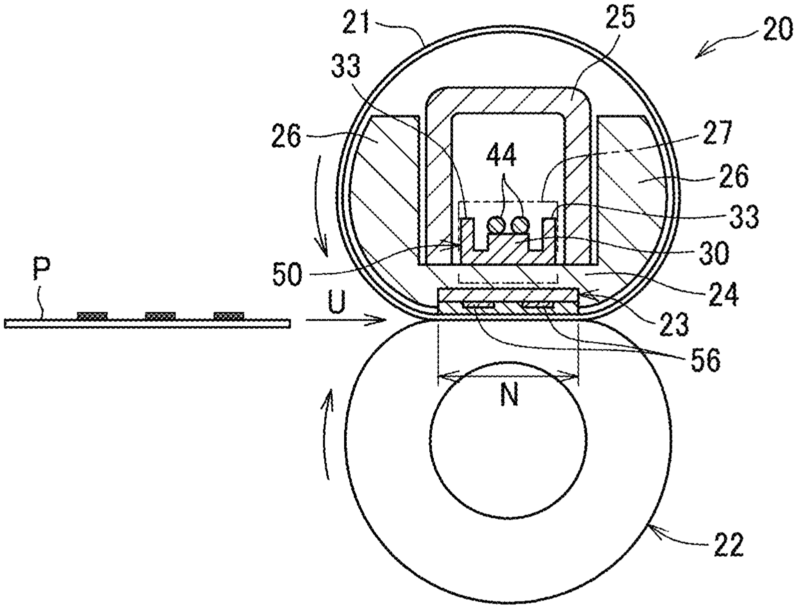
FIG. 35 is a schematic view of an example different from the examples of FIGS. 13 and 14 to illustrate the projection having a height not to be compared.

FIG. 35 is a cross-sectional view of the fixing device viewed in a direction orthogonal to a sheet passing direction U that is a sheet conveyance direction. A projection 33 illustrated in FIG. 35 is not compared with the projection 30A in terms of the height because the projection 33 is outside the region in which the lead wire 44 is routed and not the conductor support (that is, each of the projections 30) that supports the lead wire 44. The projection whose height is to be compared is a projection disposed in a region in which the lead wire 44 can exist in the sheet passing direction U (that is, the sheet conveyance direction) illustrated in FIG. 35.

In addition, the projections 30 supporting the lead wire 44 do not necessarily face the minimum sheet passing region W2. The projections 30 supporting the lead wire 44 may not face the minimum sheet passing region W2. For example, the projection that does not face the minimum sheet passing region W2 may be compared with the projections 30 (that is, the projection 30B) facing the maximum sheet passing region W1 and the outside of the minimum sheet passing region W2 in the width direction as illustrated in FIG. 28. In the present disclosure, the projections having heights to be compared are not limited to the projections facing the minimum sheet passing region W2 and the projections facing the outside of the minimum sheet passing region W2 in the width direction. The projections having heights to be compared may be projections facing a predetermined region other than the minimum sheet passing region W2 and projections facing the outside of the predetermined region in the width direction. That is, the projections having heights to be compared may be the projection 30 facing a predetermined region arbitrarily defined, such as the minimum sheet passing region W2 or the maximum sheet passing region W1 and the projection 30 facing the outside of the predetermined region in the width direction. At least one projection facing the outside of the predetermined region in the width direction may be higher than another projection 30 facing the predetermined region. The projection 30 higher than the other projections 30 can reduce the temperature rise of the lead wire 44 facing the outside of the predetermined region in the width direction because the higher projection 30 supports the lead wire 44 such that the distance from the heater 23 to the lead wire 44 facing the outside of the predetermined region in the width direction is larger than the distance from the heater 23 to the lead wire 44 facing the predetermined region.

In the above-described embodiments, the height of at least one of projections 30 is set to be higher than other projections to reduce the temperature rise of the lead wire 44. In addition to the above-described configuration including the projection 30 higher than other projections, the present disclosure includes an embodiment described below.

Figure 36:
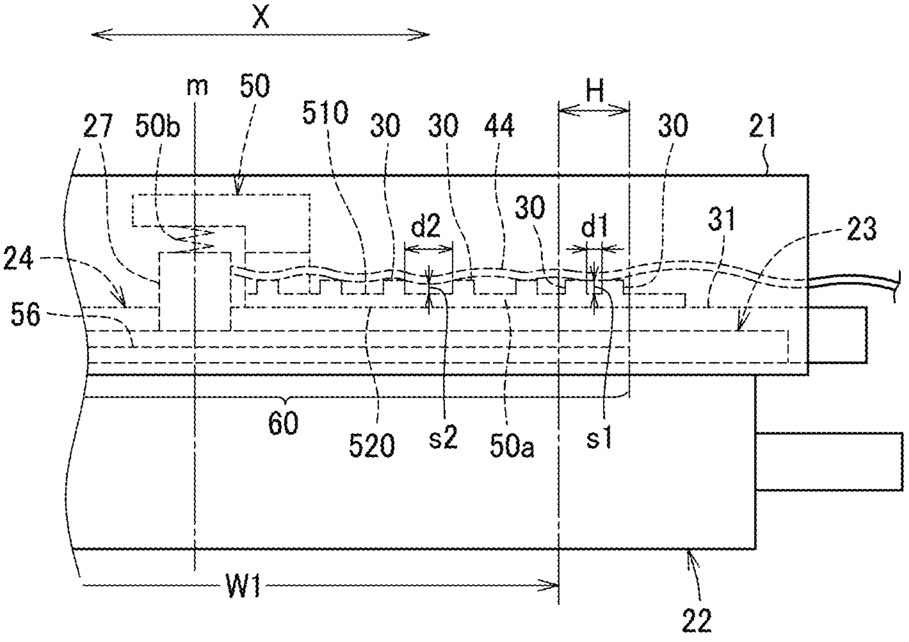
FIG. 36 is a schematic view of a support structure according to still another variation of the embodiment of FIG. 28.

Unlike the above embodiments, the fixing device 20 according to the embodiment illustrated in FIG. 36 includes projections 30 separated by the interval d1 that is smaller than the interval d2 between the other projections 30, that is d1<d2 in FIG. 36. Specifically, the interval d1 as a first interval between the projections 30 as first projections facing the outside of the maximum sheet passing region W1 in the width direction and the heat generation area 60 of the heater 23 is smaller than the interval d2 as a second interval between the projections 30 as second projections facing the maximum sheet passing region W1. In this case, the lead wire 44 between the projections 30 separated by the larger interval (that is the interval d2) sags below, which reduces a height s2 from the sensor holder 50 to the lead wire 44. In contrast, the lead wire 44 between the projections 30 separated by the smaller interval (that is the interval d1) is less likely to sag below, which maintains a height s1 from the sensor holder 50 to the lead wire 44 to be higher than the height s2. The heights s1, s2, and s3 that is described below from the sensor holder 50 to the lead wire 44 each mean the shortest distance from the lead wire 44 to the surface of the main body 50*a* of the sensor holder 50 that is the surface facing the lead wire 44. Reducing the interval between the projections 30 as described above enables keeping the height s1 from the sensor holder 50 to the lead wire 44 in a region on which the projections 30 separated by the small interval (that is, the first interval d1) are disposed to be higher than the height s2, and the lead wire 44 is less likely to approach the main body 50*a* of the sensor holder 50. As a result, the lead wire 44 facing the excessive temperature rise region H in which the temperature rise easily occurs in the heater 23 when the sheets P1 each having the maximum width continuously pass through the fixing device is less likely to approach the heater 23 than the lead wire 44 facing the region other than the excessive temperature rise region H, which enables easily keeping the distance between the heater 23 and the lead wire 44. Accordingly, the above-described configuration can reduce the temperature rise of the lead wire 44 facing the excessive temperature rise region H.

The projections 30 separated by the small interval are not limited to the projections facing the outside of the maximum sheet passing region W1 in the width direction. For example, as illustrated in FIG. 37, the interval d1 between the projections 30 facing the outside of the maximum sheet passing region W1 in the width direction and the interval d3 between the projections 30 facing the maximum sheet passing region W1 and the outside of the minimum sheet passing region W2 in the width direction may be set to be narrower than the interval d2 between the projections 30 facing the other regions (d1, d3<d2).

Setting the intervals d1 and d3 between the projections 30 outside the minimum sheet passing region W2 in the width direction to be smaller than the interval d2 between the projections 30 inside the minimum sheet passing region W2 (that is, d1, d3<d2) in the width direction can keep the heights s1 and s3 from the lead wire 44 to the sensor holder 50 facing the outside of the minimum sheet passing region W2 in the width direction (in other words, a region of the sensor holder 50 on which the projections separated by the interval d1 or d3 are disposed) to be higher than the height s2 from the lead wire 44 to the sensor holder 50 facing the minimum sheet passing region W2 (in other words, a region of the sensor holder 50 on which the projections separated by the interval d2 are disposed). The above-described configuration can cope with the temperature rise in the non-sheet passing region not only when the sheets P1 each having the maximum width pass through the fixing device but also when sheets of all sizes pass through the fixing device. That is, the above-described configuration can effectively reduce the temperature rise of the lead wire 44 because the above-described configuration can prevent the lead wire 44 from approaching the heater 23 and the main body 50*a* of the sensor holder 50 facing the non-sheet passing region (the region outside the minimum sheet passing region W2 in the width direction) in which the temperature rise may occur when the sheets each having any size pass through the fixing device.

Figure 37:
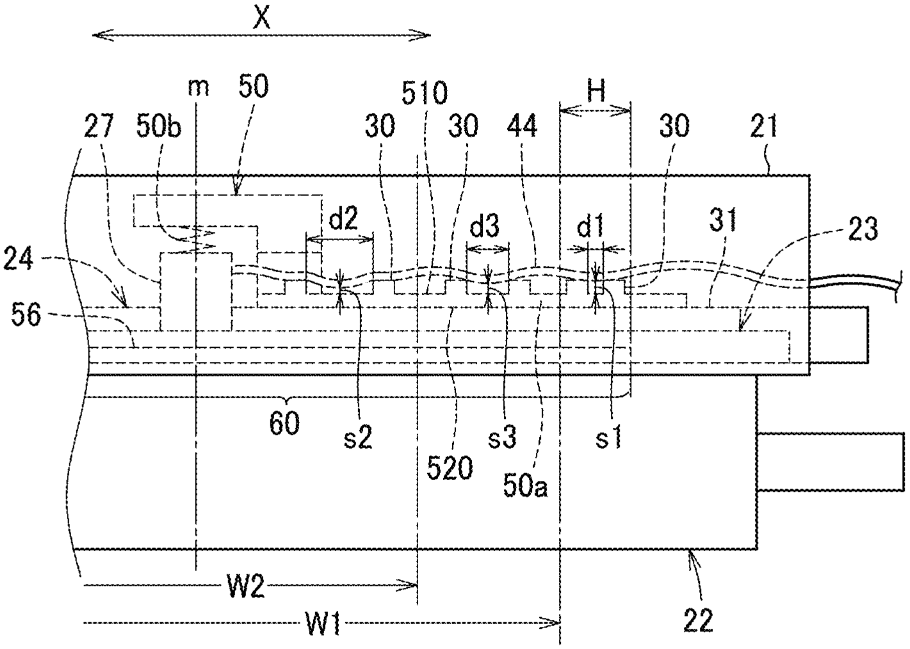
FIG. 37 is a schematic view of a support structure according to still another variation of the embodiment of FIG. 28.

In addition, in the case in which the temperature rise outside the maximum sheet passing region W1 in the width direction is likely to be significant, setting the interval d1 between the projections 30 facing the outside of the maximum sheet passing region W1 in the width direction to be smaller than the interval d3 between the projections 30 facing the maximum sheet passing region W1 and the outside of the minimum sheet passing region W2 in the width direction, that is, d1<d3 as illustrated in FIG. 37 can more reliably prevent the temperature rise of the lead wire 44 disposed at the region in which the temperature rise is particularly likely to occur (that is, the region in which the projections 30 separated by the interval d1 exist). That is, in the present embodiment, the closer the projections 30 to the longitudinal end of the heater 23 in which the temperature rise is likely to be significant, the smaller the interval between the projections 30, that is, d1<d3<d2. As a result, the lead wire 44 is less likely to sag below, and the height from the lead wire 44 to the sensor holder 50 can be kept high (s1>s3>s2), which prevents the temperature of the lead wire 44 from rising.

Note that the projections to be compared for the magnitude relationship of the interval between the projections 30 is determined based on the same reference as the projections 30 in which the heights are compared. In other words, it is sufficient that any one of the intervals between the projections 30 facing the outside of the minimum sheet passing region W2 in the width direction is smaller than the interval between the projections facing the minimum sheet passing region W2. However, the projections 30 facing the minimum sheet passing region W2 is within the region in which the lead wire 44 is routed. In addition, the projections 30 facing the minimum sheet passing region W2 is in the region in which the lead wire 44 can exist (see FIG. 14) in the sheet passing direction U (that is, the sheet conveyance direction). The intervals between the projections 30 to be compared are not limited to the interval between projections facing the minimum sheet passing region W2 and the interval between projections facing the outside of the minimum sheet passing region W2 in the width direction. The intervals between the projections to be compared may be the interval between the projections facing a predetermined region other than the minimum sheet passing region W2 and the interval between the projections facing the outside of the predetermined region in the width direction. The interval between the projections 30 that are at least two projections facing the outside of the predetermined region may be smaller than the other intervals between the projections 30 facing the predetermined region. The above-described predetermined region may be defined as desired in addition to the minimum sheet passing region and the maximum sheet passing region.

In the above-described embodiments, at least one of projections 30 is higher than other projections 30, or at least one interval of the projections 30 is narrower than the intervals of the projections 30. However, the fixing device may include projections 30 being higher than other projections 30 and separated by the interval narrower than other intervals of the other projections 30. In addition, the number of the projections 30 supporting the lead wire 44 is not limited to two or more but may be only one.

Figure 38:
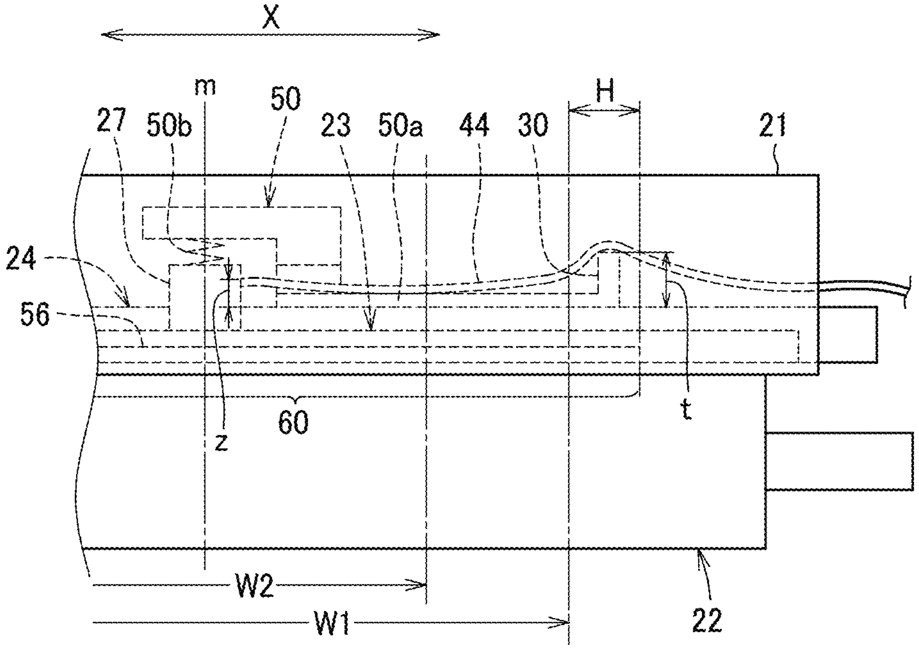
FIG. 38 is a schematic view of a support structure according to still another variation of the embodiment of FIG. 28.

For example, as illustrated in FIG. 38, only one projection 30 may face the outside of the maximum sheet passing region W1 in the width direction and the heat generation area 60 of the heater 23. The height t of the projection 30 is preferably higher than a height z of a position at which the lead wire 44 is connected to the temperature sensor 27 (that is, t>z in FIG. 17). In this case, since the projection 30 supports the lead wire 44 facing the outside of the maximum sheet passing region W1 in the width direction in which the temperature rise is likely to occur, the projection 30 can locate the lead wire 44 away from the heater 23 and the main body 50*a* of the sensor holder 50 as compared with the lead wire 44 facing the maximum sheet passing region W1. The above-described configuration can prevent the heat transfer, to the lead wire 44, from the region of the heater 23 in which the temperature easily rises. The position at which the one projection 30 is disposed is not limited to the position of the heater holder facing the outside of the maximum sheet passing region W1 in the width direction and may be appropriately selected as long as the position faces the outside of the minimum sheet passing region W2 in the width direction, which is a region in which the temperature easily rises, in accordance with the size of the frequently used sheet.

Next, the arrangement of the projections 30 and the shape of the projection 30 are described. The arrangement of the projections 30 and the shape of the projection 30 that are described below may be applied to any of the projections 30 in the above embodiments.

Figure 39:
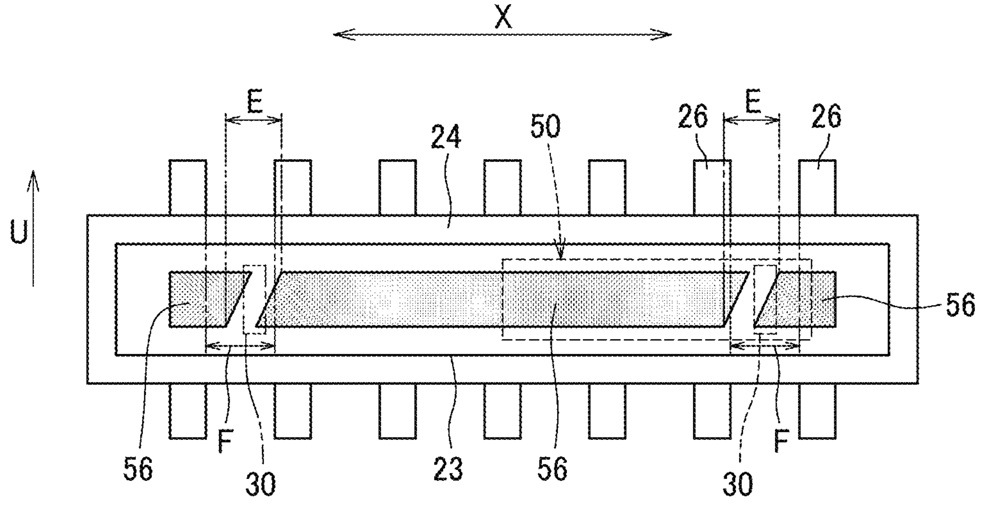
FIG. 39 is a schematic view to illustrate an arrangement of projections according to the embodiment of FIG. 28.

FIG. 39 is a plan view of the sensor holder 50 viewed from the heater 23. As illustrated in FIG. 39, the heater 23 includes a plurality of resistive heat generators 56 arranged at intervals in the longitudinal direction X (that is the sheet width direction). In this case, it is preferable that at least one projection 30 facing a right portion of the heater 23 in FIG. 18 is disposed so as to overlap the region E between the resistive heat generators 56 in the longitudinal direction X of the heater 23 (that is the sheet width direction), or at a position shifted from the resistive heat generator 56. In the above, "the projection 30 overlaps the region E" means a state in which at least a part of the projection 30 overlaps the region E between the resistive heat generators 56 when the heater 23 is viewed from a direction orthogonal to the surface on which the resistive heat generators 56 are disposed (in other words, viewed from a direction orthogonal to the paper surface of FIG. 39).

Positioning the projection 30 so as to overlap the region E between the resistive heat generators 56 as described above enables reducing the temperature rise of the projection 30. Since the temperature in the region E between the resistive heat generators 56 is less likely to rise than the temperature in a region on which the resistive heat generator 56 is located, positioning the projection 30 so as to overlap the region E can reduce the temperature rise of the projection 30. Thus, the amount of heat transferred from the projection 30 to the lead wire 44 can be reduced, and the temperature rise of the lead wire 44 can be reduced. In the fixing device including a plurality of temperature sensors, a lead wire 44 facing a left portion of the heater 23 in FIG. 39 is routed in addition to the lead wire 44 facing the right portion of the heater 23. In this case, a projection 30 may be positioned so as to overlap a region E between the resistive heat generators in the left portion of the heater 23 (see an alternate long and two short dashes line in FIG. 39).

In addition, as illustrated in FIG. 39, the fixing device 20 includes a plurality of guides 26 arranged at intervals in the longitudinal direction X of the heater 23 (that is the sheet width direction). In this case, it is preferable that at least one projection 30 is disposed at a position shifted from the guides 26 in the longitudinal direction X of the heater 23 (that is the sheet width direction), (the position within a range indicated by "F" in FIG. 39). Since the above-described configuration can prevent heat stored in the guide 26 from affecting the projection 30, the above-described configuration can reduce the temperature rise of the projection 30 and, as a result, reduce the temperature rise of the lead wire 44. Similarly, at least one projection 30 facing the left portion of the heater 23 in FIG. 39, which is indicated by the alternate long and two short dashes line in FIG. 39, may be disposed at a position shifted from the guides 26 in the longitudinal direction X of the heater 23 (the sheet width direction).

Figure 40:
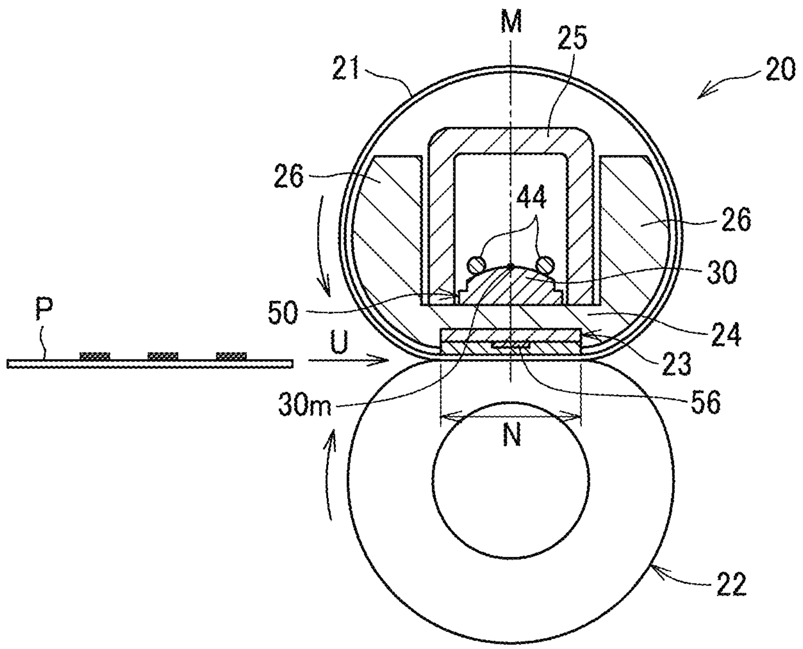
FIG. 40 is a schematic view of the fixing device to illustrate a shape of a projection in the embodiment of FIG. 28.

Additionally, as illustrated in FIG. 40, the heater 23 including the resistive heat generator 56 at the center M of the heater 23 or facing the center M of the nip N in the sheet conveyance direction U preferably includes the projection having a cross-sectional shape illustrated in FIG. 40, that is, the projection 30 having a center 30*m* in the sheet conveyance direction higher than tips of both sides. In the cross-sectional shape, if the lead wire 44 is disposed at the center 30*m* of the projection 30 in the sheet conveyance direction, a large distance can be secured between the lead wire 44 and the heater 23, which easily reduces the temperature rise of the lead wire 44. In a case in which the gravity moves the lead wire 44 from the center 30*m* of the projection 30 in the sheet conveyance direction to one of both sides of the projection 30, the cross-sectional shape of the projection 30 having the center 30*m* higher than both sides of the projection 30 in the sheet conveyance direction moves the lead wire 44 to be away from the resistive heat generators 56. As a result, the above-described configuration can reduce the temperature rise of the lead wire 44 also in this case.

Figure 41:
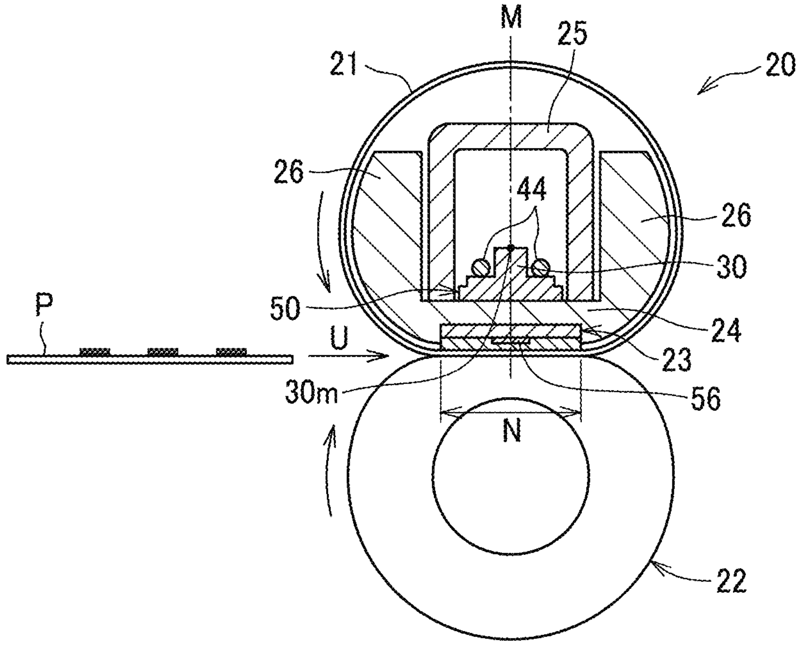
FIG. 41 is a schematic view of the fixing device including the projection that has a shape different from the shape of the projection of FIG. 40.

The shape of the projection 30 is not limited to the shape illustrated in FIG. 40 having the tip end surface of the projection 30 that is the convex curved surface shape gradually rising toward the center 30*m* in the sheet conveyance direction. As illustrated in FIG. 41, the shape of the projection 30 may have the convex step shape in which the tip end surface rapidly rises at the center 30*m* and its vicinity in the sheet conveyance direction.

Figure 42:
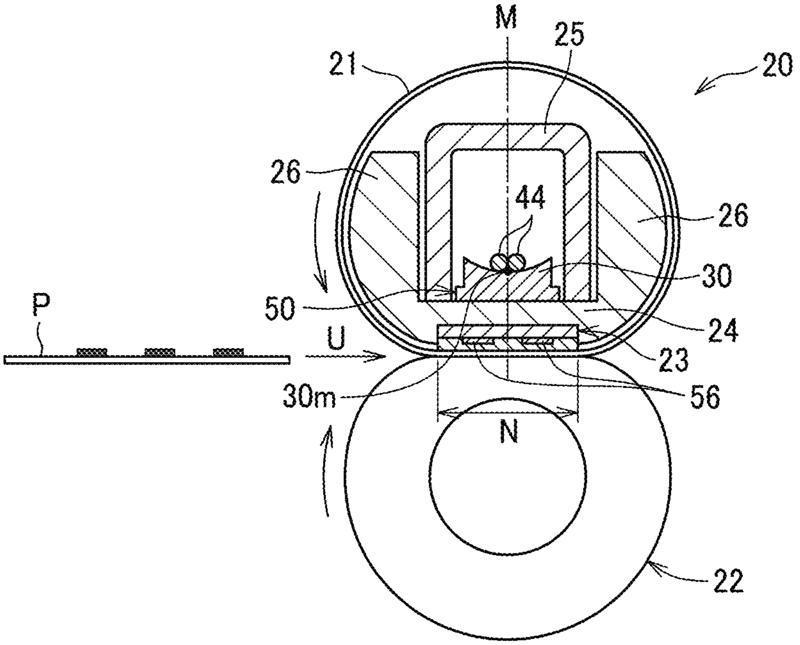
FIG. 42 is a schematic view of the fixing device including the projection that has a shape different from the shapes of the projections of FIGS. 40 and 41.

As illustrated in FIG. 42, in the case in which the resistive heat generators 56 are disposed on both end portions of the heater 23 with respect to the center M of the heater 23 or the center M of the nip N in the sheet conveyance direction, it is preferable that the center 30*m* of the projection 30 in the sheet conveyance direction is formed lower than tips of both sides of the projection 30. In this case, since the gravity moves the lead wire 44 toward the center 30*m* of the projection 30 in the sheet conveyance direction, the lead wire 44 can be set away from the resistive heat generator 56, which can reduce the temperature rise of the lead wire 44.

Figure 43:
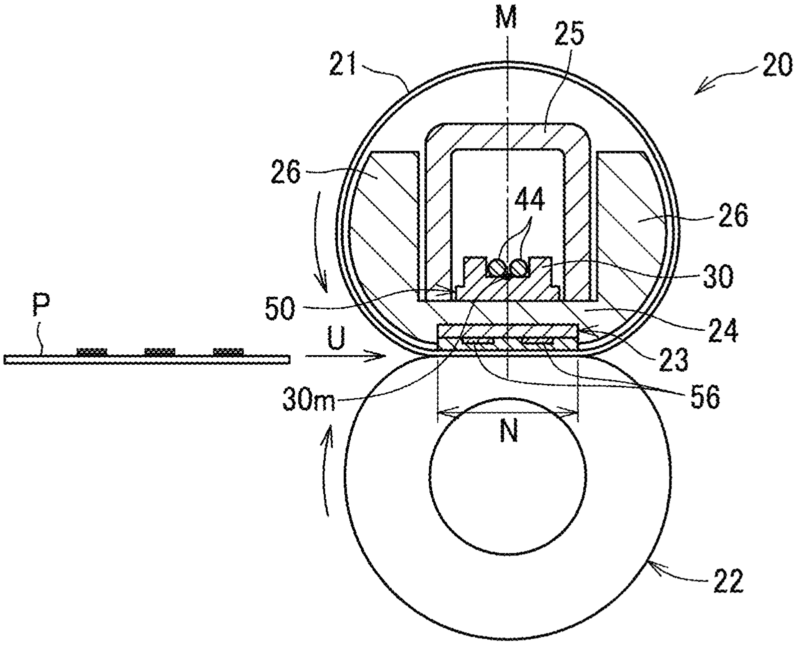
FIG. 43 is a schematic view of the fixing device including the projection that has a shape different from the shapes of the projections of FIGS. 40 to 42.

The shape of the projection 30 is not limited to the shape illustrated in FIG. 42 having a tip end surface of the projection 30 that is the concave curved surface shape gradually lowering toward the center 30*m* in the sheet conveyance direction. As illustrated in FIG. 43, the shape of the projection 30 may have the concave step shape in which the tip end surface rapidly lowers at the center 30*m* and its vicinity in the sheet conveyance direction.

The fixing device according to the above-described embodiments may have the following configurations as additional variations.

Figure 44:
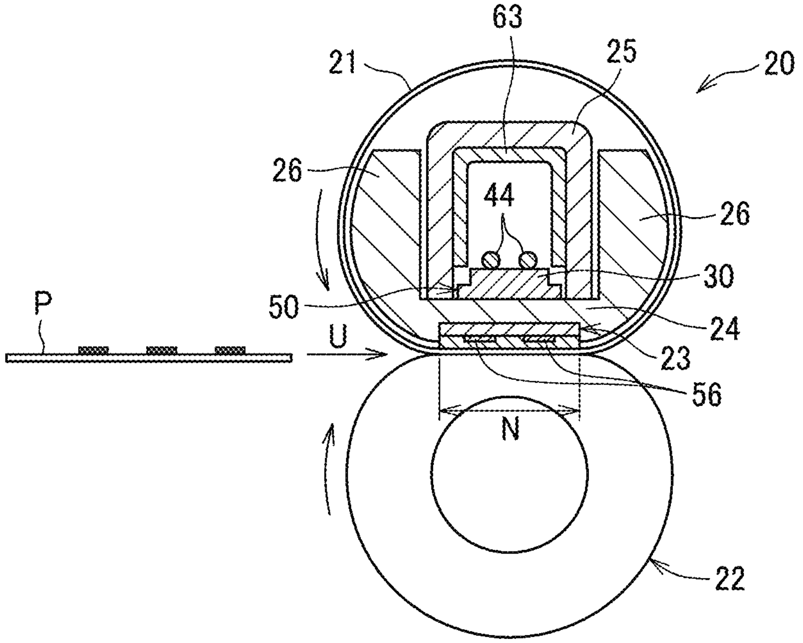
FIG. 44 is a schematic view of a support structure according to still another variation of the embodiment of FIG. 28.

In the example illustrated in FIG. 44, the fixing device 20 includes a low thermal conductor 63 disposed on the inner side of the stay 25 that is the side facing the lead wire 44. The stay 25 supports the heater holder 24 to prevent the heater holder 24 from being deformed, which enables forming a desired shape of the nip N. The stay 25 having a U-shaped cross section as illustrated in FIG. 44 can surely have a large area moment of inertia (that is a resistance for a bending force) and ensure the rigidity while the stay 25 is miniaturized. In addition, the U-shaped cross section can prevent the interference of the stay with the projections of the heater holder 24 and the fixing belt 21.

However, heat transfers from the heater 23 to the heater holder 24 and the stay 25 in contact with the heater holder 24, increasing the temperature of the stay 25. In particular, since the stay 25 made of metal has a good thermal conductivity, the temperature of the stay is likely to increase. Accordingly, the lead wire 44 does not preferably come into contact with the stay 25 to reduce the temperature rise of the lead wire 44.

For this reason, a low thermal conductor 63 having a lower thermal conductivity than the stay 25 is disposed between the inner surface of the stay 25 and the lead wire 44 as illustrated in FIG. 44. The above-described configuration can prevent the lead wire 44 from coming into direct contact with the stay 25. Even if the lead wire 44 comes into contact with the low thermal conductor 63, an amount of heat transferred from the low thermal conductor 63 to the lead wire 44 is smaller than an amount of heat transferred by direct contact of the lead wire 44 with the stay 25. Therefore, the temperature rise of the lead wire 44 can be reduced. The low thermal conductor 63 may be fixed to the inner surface of the stay 25 via a screw or a snap-fit mechanism. Alternatively, the low thermal conductor 63 may be disposed on the sensor holder 50 or a belt holder described below.

Figure 45:
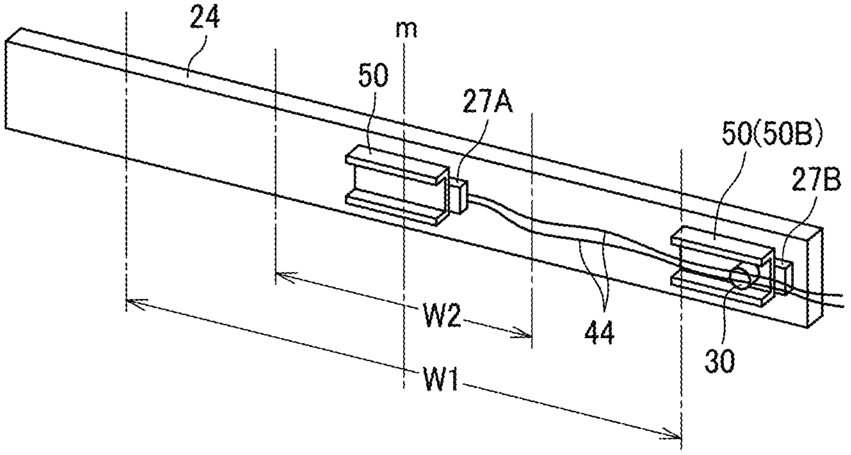
FIG. 45 is a schematic view of a support structure according to still another variation of the embodiment of FIG. 28.

In the above-described embodiments, the projection 30 supporting the lead wire 44 is disposed on the sensor holder 50 holding the temperature sensor 27 facing the minimum sheet passing region W2, but the sensor holder 50 on which the projection 30 is disposed is not limited to this. For example, as illustrated in FIG. 45, the projection 30 may be disposed on a sensor holder 50B holding a temperature sensor 27B facing the outside of the maximum sheet passing region W1 in the width direction to support the lead wire 44 extending from a temperature sensor 27A facing the minimum sheet passing region W2.

Figure 46:
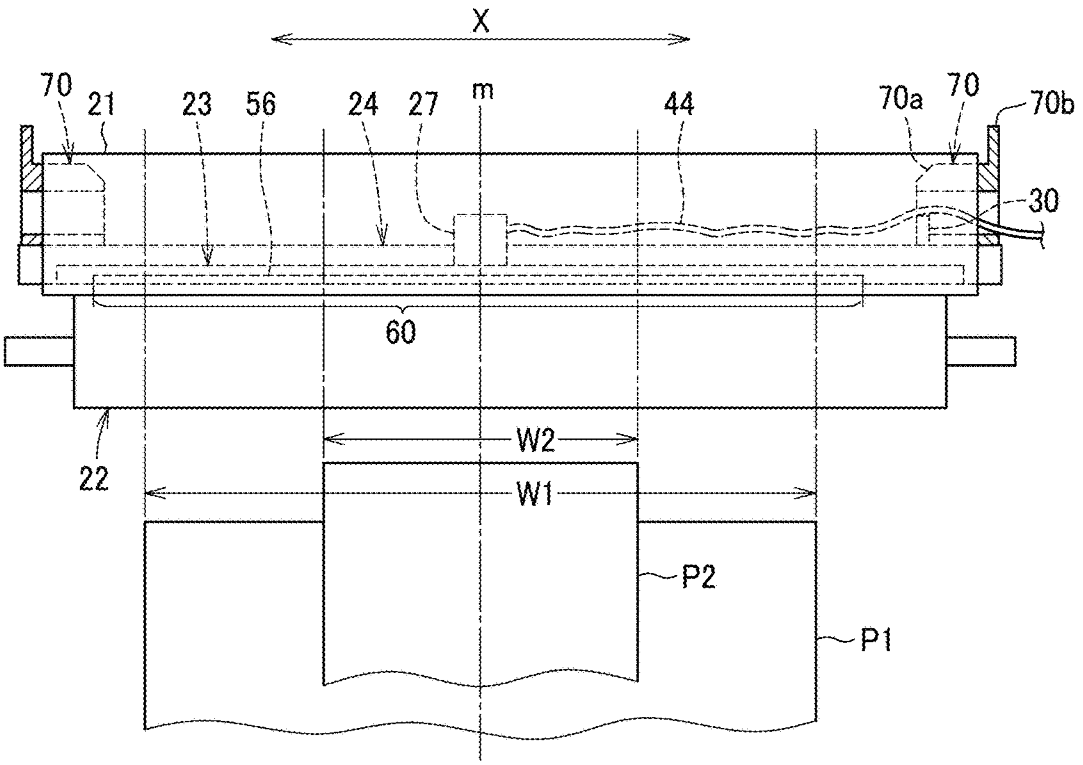
FIG. 46 is a schematic view of the fixing device including the projection disposed on a flange.

Next, an embodiment illustrated in FIG. 46 is described. In FIG. 46, the projection supporting the lead wire 44 is disposed on a flange 70 (that is, a belt holder) that holds one of both longitudinal ends of the fixing belt 21. The flange 70 includes a holding portion 70*a* and a regulator 70*b*. The holding portion 70*a* is a C-shaped portion or cylindrical portion that is inserted into the loop of the fixing belt 21. The regulator 70*b* regulates the movement of the fixing belt 21 in the longitudinal direction indicated by the arrow X in FIG. 46. The holding portion 70*a* has an outer circumferential surface having a diameter smaller than an inside diameter of the loop of the fixing belt 21 and is inserted into the loop of fixing belt 21 so that the fixing belt 21 is held by a so-called free belt method in which a tensile force in the circumferential direction is basically not applied to the fixing belt 21 when the fixing belt 21 is stopped (in other words, does not rotate). The regulator 70*b* has an outside diameter larger than the inside diameter of the loop of the fixing belt 21 to regulate the movement (in other words, a skew) of the fixing belt 21 in the longitudinal direction X. The projection 30 projects from an inner circumferential surface of the holding portion 70*a* in the direction away from the heater 23.

The projection 30 disposed on the heater holder 24 or the flange 70 as described above to support the lead wire 44 can secure the large distance between the heater 23 and the lead wire 44 in the region in which the temperature of the heater 23 easily rise, that is, the region facing the heat generation area 60 and the outside of the minimum sheet passing region W2 in the width direction. As a result, the projections 30 according to the above-described embodiments can also reduce the temperature rise of the lead wire 44.

Since the temperature of the flange 70 is less likely to increase than the temperature of the heater holder 24, the flange 70 can more effectively reduce the temperature rise of the projection 30. In other words, placing the projection 30 on the flange 70 as the component that is interposed between the heater holder 24 and the lead wire 44 and separate from the heater holder 24 can more effectively reduce the temperature rise of the projection 30 than placing the projection 30 on the heater holder 24. Therefore, in the embodiment in which the projection 30 is disposed on the flange 70, the temperature rise of the lead wire 44 can be more effectively reduced. Note that the number of projections 30 illustrated in FIG. 46 is not limited to one but may be plural as the above-described embodiments. In addition, the same configurations as the above-described embodiments may be applied to the arrangement of the projections 30 and the shape of the projection 30.

The above-described embodiments are illustrative and do not limit this disclosure. It is therefore to be understood that within the scope of the appended claims, numerous additional modifications and variations are possible to this disclosure otherwise than as specifically described herein. In the above-described embodiment, the component that is interposed between the heater holder 24 and the lead wire 44 and separate from the heater holder 24 is the sensor holder 50 or the flange 70. However, the component may be a member other than the sensor holder 50 and the flange 70 as long as the member is separated from the heater holder 24. For example, the component may be a projection separate from the heater holder 24. The sensor holder 50 and the projection 30 may be integrally formed as one component. The flange 70 and the projection 30 may be integrally formed as one component.

Figure 47:
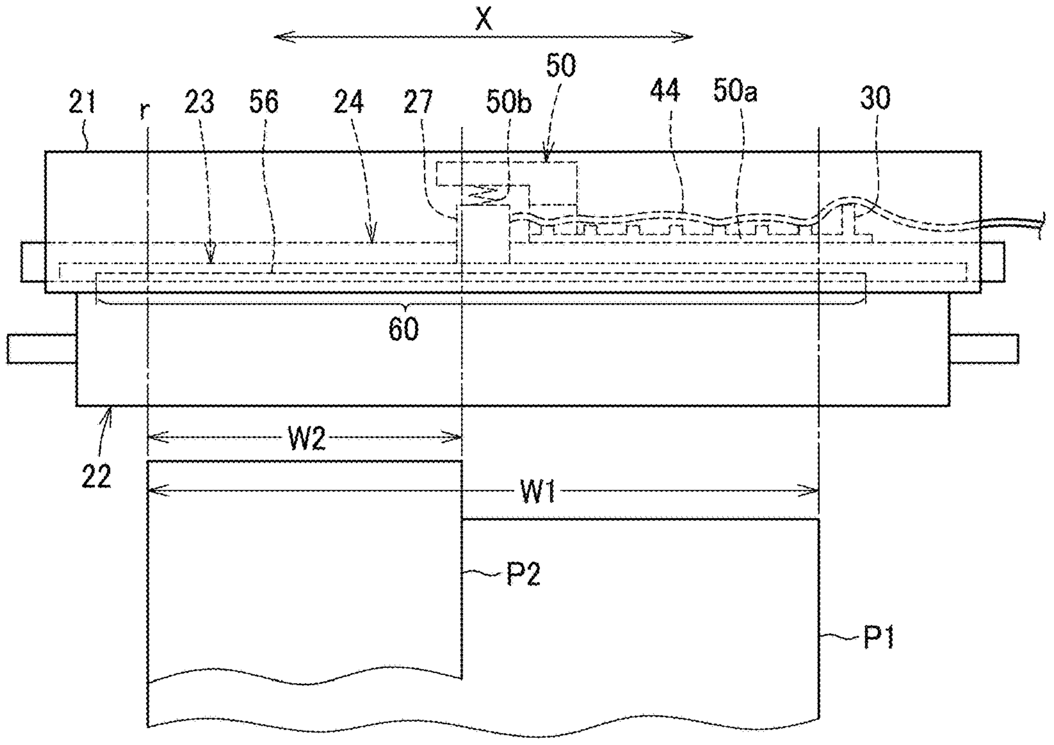
FIG. 47 is a schematic view of the fixing device according to the embodiment of FIG. 28 incorporated in the image forming apparatus using the end conveyance reference system.

The image forming apparatus in which the embodiments of the present disclosure are applied is not limited to the image forming apparatus using the center conveyance reference system in which the sheets having various sizes are conveyed so that the center positions of the various sizes of sheets in the width direction pass through the same position in the image forming apparatus. The embodiments of the present disclosure may also be applied to the image forming apparatus using the end conveyance reference system in which the sheets having various sizes are conveyed so that one ends of the sheets in the width direction thereof pass through the same position in the image forming apparatus. The maximum sheet passing region W1 of the heater in the end conveyance reference system is, as illustrated in FIG. 47, a region having a length of the maximum sheet width W1 or W1+5 mm from the conveyance reference position r to convey the sheets P1 and P2, and the minimum sheet passing region W2 is a region having a length of the minimum sheet width W2 or W2+5 mm from the conveyance reference position r. In the image forming apparatus using the end conveyance reference system, the projection 30 also secures a large distance from the heater 23 to the lead wire 44 in a region facing the outside of the minimum sheet passing region W2 in the width direction and the heat generation area 60 of the heater 23 and, therefore, can reduce the temperature rise of the lead wire 44 similarly to the above-described embodiments.

The heater in the fixing device according to the present embodiments may have a Positive Temperature Coefficient (PTC) characteristic. The PTC characteristic is a characteristic in which the resistance value increases as the temperature increases (a heater output decreases under a constant voltage). The heater that includes the resistive heat generator having the PTC characteristic quickly starts heat generation with an increased output at low temperatures and prevents overheating because high temperatures decrease output. Since using the heater having the PTC characteristic can effectively prevent heat generation of the resistive heat generator in the non-sheet passing region, using the heater having the PTC characteristic can further prevent the temperature of the lead wire from rising. For example, if a temperature coefficient of resistance (TCR) of the PTC characteristic is in a range of from about 300 ppm/° C. to about 4,000 ppm/° C., the heater is manufactured at reduced costs while retaining a resistance value needed for the heater. The TCR is preferably in a range of from 500 ppm/° C. to 2,000 ppm/° C.

The TCR is calculated by measuring the resistance values at 25° C. and 125° C. For example, if the temperature increases by 100° C. and the resistance value increases by 10%, the TCR is 1,000 ppm/° C.

The embodiments of the present disclosure are applicable to fixing devices illustrated in FIGS. 48 to 52. The configurations of fixing devices illustrated in FIGS. 48 to 51 are described below.

Figure 48:
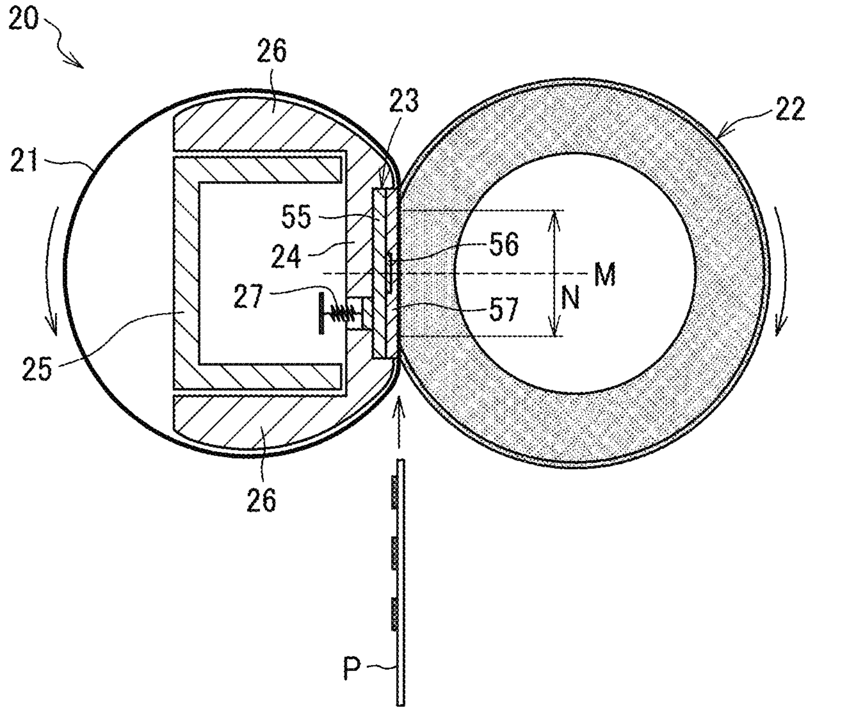
FIG. 48 is a schematic view of a fixing device having a configuration different from the fixing device of FIG. 2.

A different point between the fixing device 20 illustrated in FIG. 48 and the fixing device 20 illustrated in FIG. 2 is the position of the temperature sensor 27 to detect the temperature of the heater 23. Other than that, the configuration illustrated in FIG. 48 is the same as that in FIG. 2. In the fixing device 20 illustrated in FIG. 48, the temperature sensor 27 is disposed upstream from the center M of the fixing nip N in the sheet passing direction (that is, near a nip entrance). In the fixing device 20 illustrated in FIG. 2, the temperature sensor 27 is disposed so as to face the center M of the fixing nip N. The temperature sensor 27 disposed upstream from the center M of the fixing nip N in the sheet passing direction as illustrated in FIG. 48 can accurately detect the temperature near the nip entrance. Since the sheet P entering the fixing nip N particularly easily take away heat of the fixing belt 21 in a portion near the nip entrance, the temperature sensor 27 that accurately detects the temperature at the portion near the nip entrance enables ensuring the fixing property of the image and effectively preventing the occurrence of fixing offset (that is, a state in which the toner image cannot be sufficiently heated).

Figure 49:
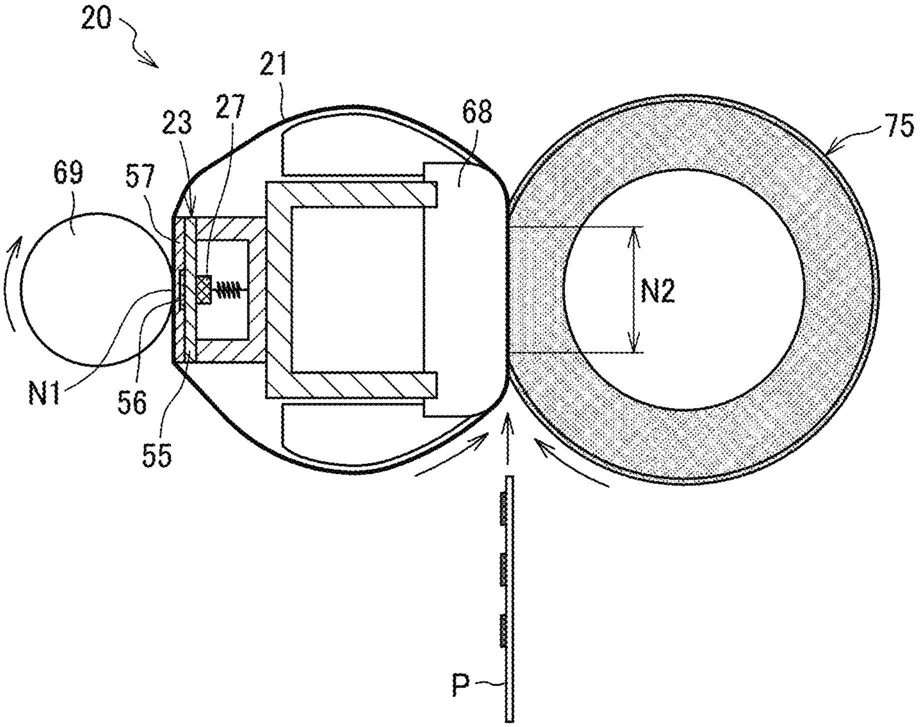
FIG. 49 is a schematic view of a fixing device having a configuration different from the fixing devices of FIGS. 2 and 49.

Next, the fixing device 20 in the embodiment illustrated in FIG. 49 has a heating nip N1 in which the heater 23 heats the fixing belt 21 and a fixing nip N2 through which the sheet P passes, and the heating nip N1 and the fixing nip N2 are formed at different positions. Specifically, the fixing device 20 in the present embodiment includes a nip formation pad 68 inside the loop of the fixing belt 21 in addition to the heater 23. A pressure roller 69 presses the heater 23 via the fixing belt 21 to form the heating nip N1, and a pressure roller 75 presses the nip formation pad 68 to form the fixing nip N2. In the above-described fixing device 20, the heater 23 heats the fixing belt 21 in the heating nip N1, and the fixing belt 21 applies the heat to the sheet P in the fixing nip N2 to fix the unfixed image onto the sheet P.

Figure 50:
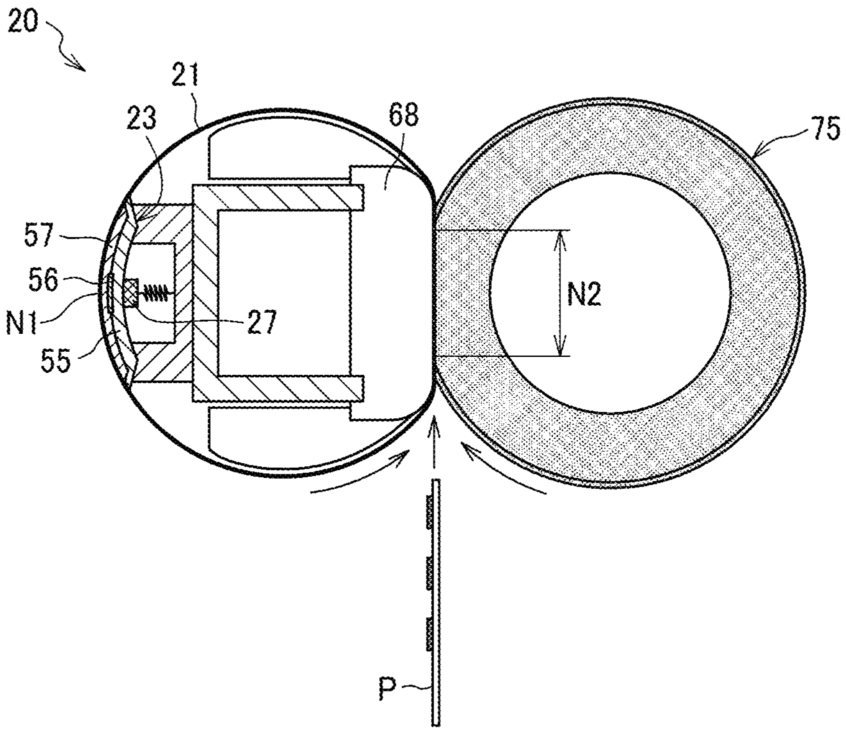
FIG. 50 is a schematic view of a fixing device having a configuration different from the fixing devices of FIGS. 2, 49, and 50.

Next, the fixing device 20 illustrated in FIG. 50 omits the above-described pressure roller 69 adjacent to the heater 23 from the fixing device 20 illustrated in FIG. 49 and includes the heater 23 formed to be arc having a curvature of the fixing belt 21. The other configuration is the same as the configuration illustrated in FIG. 49. In this case, the arc shaped heater 23 surely maintains a length of the contact between the fixing belt 21 and the heater 23 in a belt rotation direction to efficiently heat the fixing belt 21.

Figure 51:
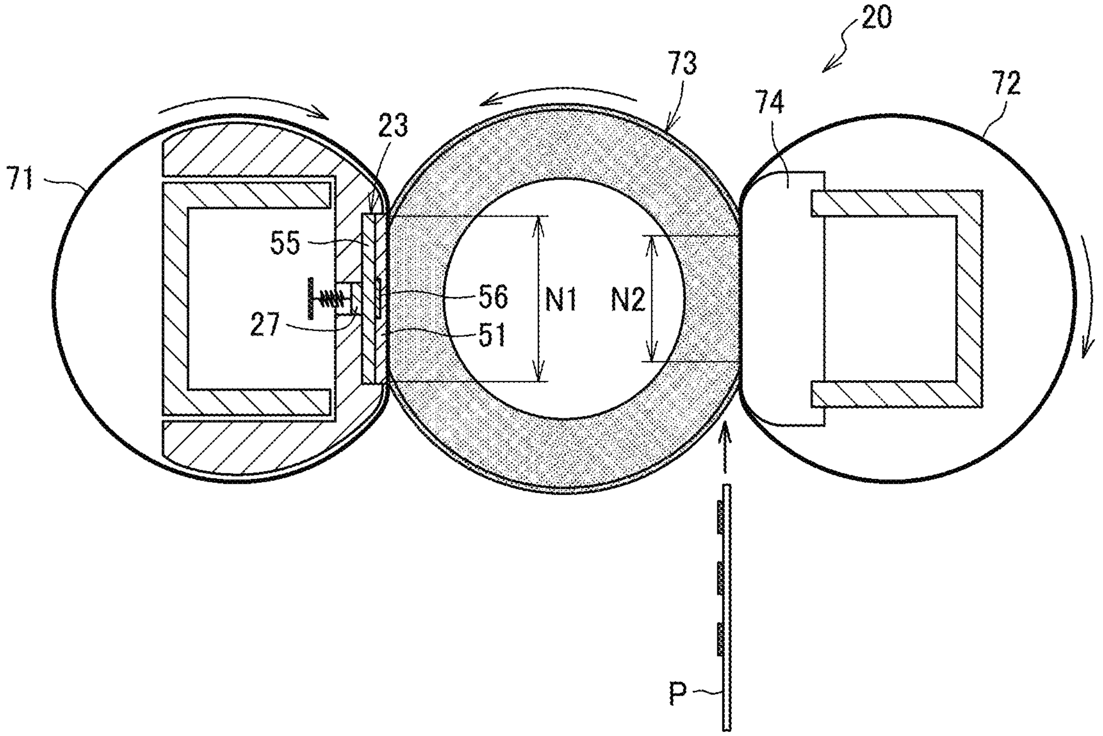
FIG. 51 is a schematic view of a fixing device having a configuration different from the fixing devices of FIGS. 2, and 49 to 50.

Next, the fixing device 20 illustrated in FIG. 51 includes a pair of belts 71 and 72 as a pair of rotators and a roller 73 as another rotator disposed between the pair of belts 71 and 72. In this example, the fixing device 20 includes the heater 23 disposed inside the loop of the belt 71 on the left side in FIG. 51 and a nip formation pad 74 disposed inside the loop of the belt 72 on the right side in FIG. 51. The heater 23 is in contact with the roller 73 via the left belt 71, and the nip formation pad 74 is in contact with the roller 73 via the right belt 72, thereby forming the heating nip N1 and the fixing nip N2. In this case, the heater 23 heats the roller 73 via the left belt 71.

Figure 52:
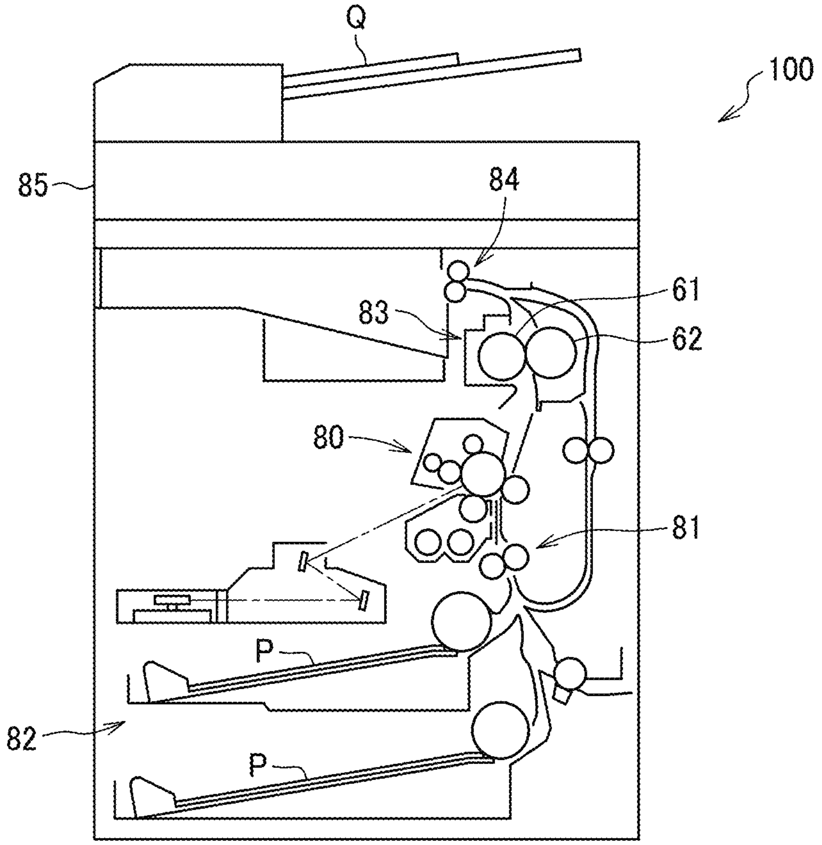
FIG. 52 is a schematic view of an image forming apparatus having a configuration different from the image forming apparatus of FIG. 1.

The image forming apparatus according to the present embodiments is not limited to the color image forming apparatus illustrated in FIG. 1 and may be applied to an image forming apparatus having a configuration illustrated in FIG. 52. The following describes another embodiment of the image forming apparatus to which the present embodiments may be applied.

The image forming apparatus 100 illustrated in FIG. 52 includes an image forming device 80 including a photoconductor drum and the like, a sheet conveyer including a timing roller pair 81 and the like, a sheet feeder 82, a fixing device 83, a sheet ejection device 84, and a reading device 85. The sheet feeder 82 includes a plurality of sheet feeding trays, and the sheet feeding trays stores sheets of different sizes, respectively.

The reading device 85 reads an image of a document Q. The reading device 85 generates image data from the read image. The sheet feeder 82 stores the plurality of sheets P and feeds the sheet P to the conveyance path. The timing roller pair 81 conveys the sheet P on the conveyance path to the image forming device 80.

The image forming device 80 forms a toner image on the sheet P. Specifically, the image forming device 80 includes the photoconductor drum, a charging roller, the exposure device, the developing device, a supply device, a transfer roller, the cleaning device, and a discharger. The fixing device 83 heats and presses the toner image to fix the toner image on the sheet P. Conveyance rollers convey the sheet P on which the toner image has been fixed to the sheet ejection device 84. The sheet ejection device 84 ejects the sheet P to the outside of the image forming apparatus 100.

Next, a fixing device 83 according to the present embodiment is described with reference to FIG. 53. In the configuration illustrated in FIG. 53, components common to those of the fixing device 20 of the above-described embodiment illustrated in FIG. 2 are denoted by the same reference numerals, and a description thereof will be omitted.

Figure 53:
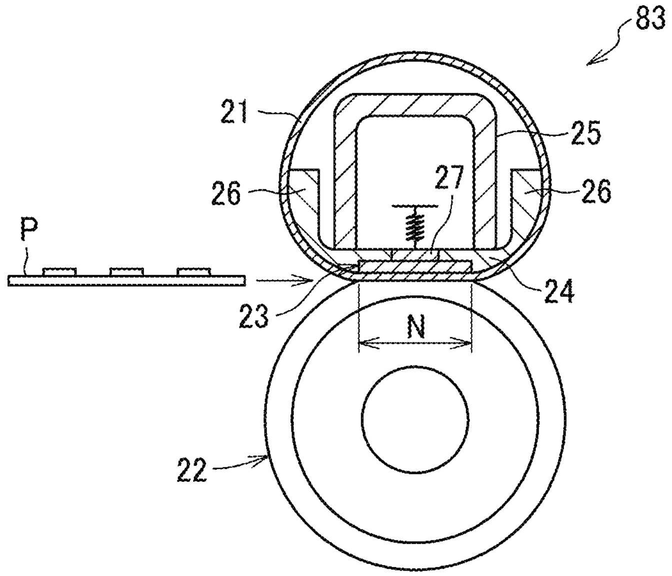
FIG. 53 is a schematic view of a fixing device illustrated in FIG. 52.

As illustrated in FIG. 53, the fixing device 83 includes the fixing belt 21, the pressure roller 22, the heater 23, the heater holder 24, the stay 25, and the temperature sensors 27.

The fixing nip N is formed between the fixing belt 21 and the pressure roller 22. The nip width of the fixing nip N is 10 mm, and the linear velocity of the fixing device 83 is 240 mm/s.

The fixing belt 21 includes a polyimide base layer and the release layer and does not include the elastic layer. The release layer is made of a heat-resistant film material made of, for example, fluororesin. The outer loop diameter of the fixing belt 21 is about 24 mm.

The pressure roller 22 includes the core, the elastic layer, and the release layer. The pressure roller 22 has an outer diameter of 24 mm to 30 mm, and the elastic layer 21*b* has a thickness of 3 mm to 4 mm.

The heater 23 includes the base, a thermal insulation layer, a conductor layer including the resistive heat generator and the like, and the insulation layer, and is formed to have a thickness of 1 mm as a whole. The width of the heater 23 in the sheet conveyance direction is, for example, 13 mm.

Figure 54:
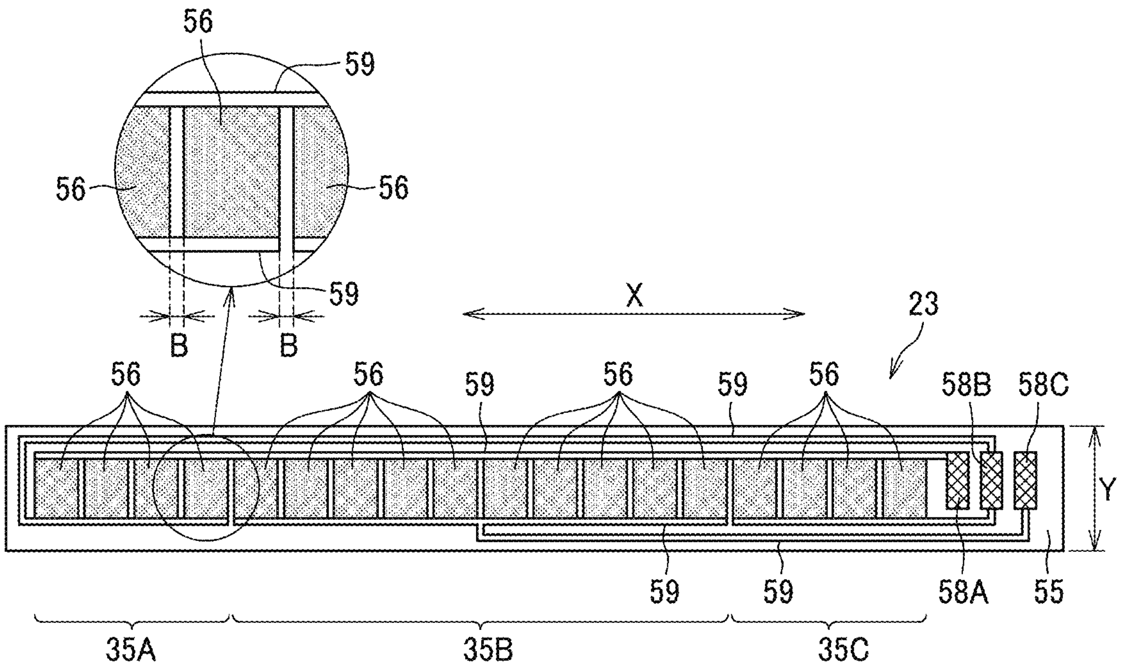
FIG. 54 is a plan view of a heater illustrated in FIG. 53.

As illustrated in FIG. 54, the conductor layer of the heater 23 includes the plurality of resistive heat generators 56, the power supply lines 59, and electrodes 58A to 58C. The plurality of resistive heat generators 56 are arranged at intervals in the longitudinal direction of the heater 23 (that is, the direction indicated by the arrow X). Hereinafter, a portion between the neighboring resistive heat generators 56 is referred to as a separation area B. As illustrated in an enlarged view of FIG. 54, the separation area B is formed between neighboring resistive heat generators of the plurality of resistive heat generators 56. The enlarged view of FIG. 54 illustrates two separation areas B, but the separation area B is formed between the neighboring resistive heat generators of all the plurality of resistive heat generators 56. In FIG. 54, a direction indicated by an arrow Y is a direction intersecting or orthogonal to the longitudinal direction X of the heater 23, which is referred to as a longitudinal intersecting direction. The longitudinal intersecting direction is different from a thickness direction of the base 55.

In addition, the direction indicated by the arrow Y is the same direction as a direction intersecting an arrangement direction of the plurality of resistive heat generators 56, a short-side direction of the heater 23 along a surface of the base 55 on which the resistive heat generators 56 are disposed, and the sheet conveyance direction of the sheet passing through fixing device.

The heater 23 includes a central heat generation portion 35B and end heat generation portions 35A and 35C at both sides of the central heat generation portion 35B. The central heat generation portion 35B and the end heat generation portions 35A and 35C are configured by the plurality of resistive heat generators 56. The end heat generation portions 35A and 35C can generate heat separately from the central heat generation portion 35B. For example, choosing a left electrode 58A and a central electrode 58B of the three electrodes 58A to 58C and applying a voltage between the left electrode 58A and the central electrode 58B in FIG. 54 causes the end heat generation portions 35A and 35C adjacent to both sides of the central heat generation portion 35B to generate heat. Applying the voltage between the left electrode 58A and a right electrode 58C causes the central heat generation portion 35B to generate heat. To fix the image onto a small sheet, the central heat generation portion 35B alone can generate heat. To fix the image onto a large sheet, all the heat generation portions 35A to 35C can generate heat. As a result, the heater in the fixing device can generate heat in accordance with the size of the sheet.

Figure 55:
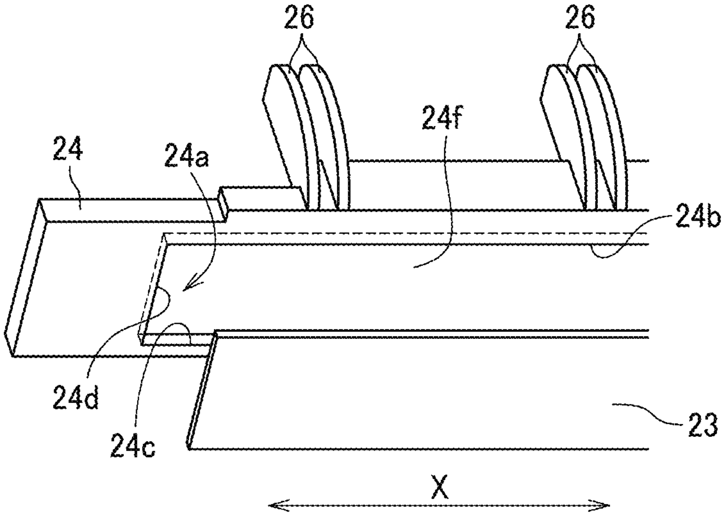
FIG. 55 is a partial perspective view of a heater holder and the heater illustrated in FIG. 53.

As illustrated in FIG. 55, the heater holder 24 according to the present embodiment includes the recessed portion 24*a* to receive and hold the heater 23. The recessed portion 24*a* is formed on the side of the heater holder 24 facing the heater 23. The recessed portion 24*a* has a bottom 24*f* formed in a rectangular shape substantially the same size as the heater 23, and four side walls 24*b*, 24*c*, 24*d*, and 24*e* disposed on four sides of the bottom 24*f*, respectively. In FIG. 55, the right side wall 24*e* is omitted. The recessed portion 24*a* may have an opening that opens toward one end in the longitudinal direction of the heater 23. The opening is configured by removing one of a pair of the left side wall 24*d* and the right side wall 24*e* that intersect the longitudinal direction X of the heater 23 (that is, the arrangement direction of the resistive heat generators 56).

Figure 56:
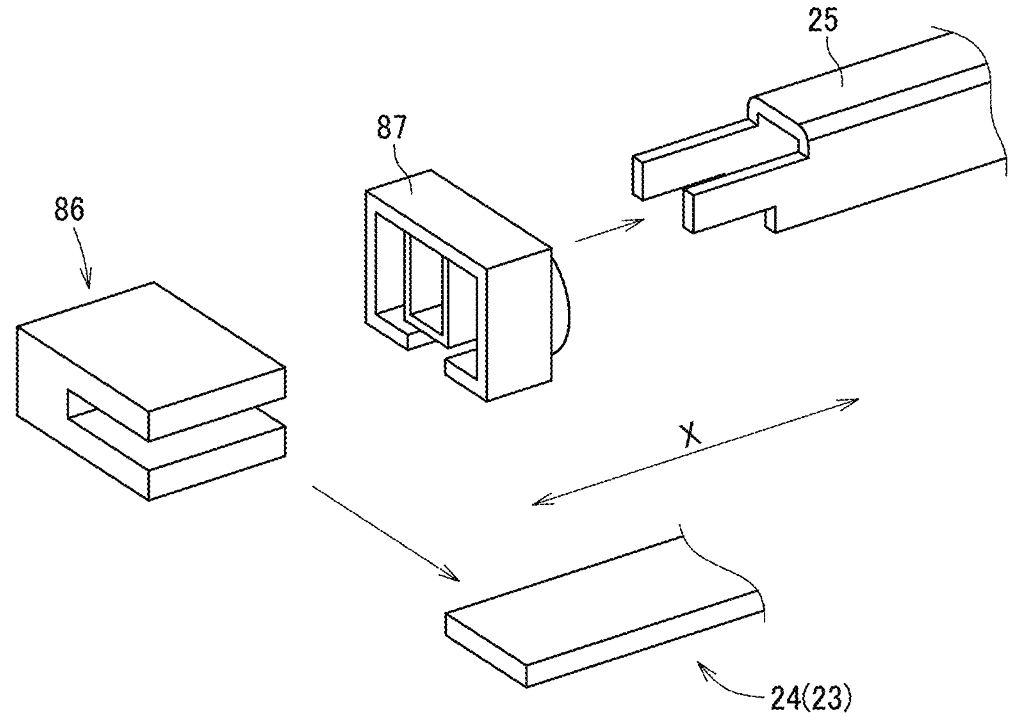
FIG. 56 is a view to illustrate a method of attaching a connector to the heater illustrated in FIG. 53.

As illustrated in FIG. 56, a connector 86 holds the heater 23 and the heater holder 24 according to the present embodiment. The connector 86 includes a housing made of resin such as LCP and a plurality of contact terminals fixed to the inner surface of the housing.

To attach to the heater 23 and the heater holder 24, the connector 86 is moved in the direction intersecting the longitudinal direction X of the heater 23 that is the arrangement direction of the resistive heat generators 56 (see a direction indicated by an arrow extending from the connector 86 in FIG. 56). The connector 86 is attached to one end of the heater 23 and one end of the heater holder 24 in the longitudinal direction X of the heater 23 that is the arrangement direction of the resistive heat generators 56. The one end of the heater 23 and the one end of the heater holder 24 are farther from a portion in which the pressure roller 22 receives a driving force from a drive motor than the other end of the heater 23 and the other end of the heater holder 24, respectively. The connector 86 and the heater holder 24 may have a convex portion and a recessed portion to attach the connector 86 to the heater holder 24. The convex portion disposed on one of the connector 86 and the heater holder 24 is engaged with the recessed portion disposed on the other and relatively move in the recessed portions to attach the connector 86 to the heater holder 24.

After the connector 86 is attached to the heater 23 and the heater holder 24, the heater 23 and the heater holder 24 are sandwiched and held by the connector 86. In this state, the contact terminals contact and press against the electrodes of the heater 23, respectively, and the resistive heat generators 56 are electrically coupled to the power supply disposed in the image forming apparatus via the connector 86. As a result, the power supply can supply electric power to the resistive heat generators 56.

A flange 87 illustrated in FIG. 56 is the belt holder in contact with the inner circumferential surface of the fixing belt 21 at each of both ends of the fixing belt 21 in the longitudinal direction of the fixing belt 21 to hold the fixing belt 21. The flange 87 is inserted into each of both ends of the stay 25 and is fixed to each of a pair of side plates that are frame members of the fixing device.

Figure 57:
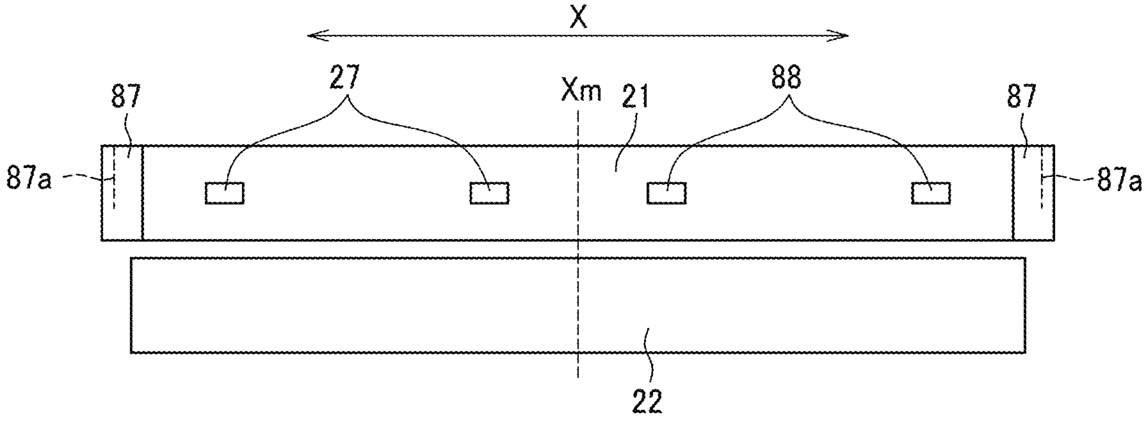
FIG. 57 is a diagram illustrating an arrangement of temperature sensors and thermostats included in the fixing device illustrated in FIG. 53.

FIG. 57 is a diagram illustrating an arrangement of temperature sensors 27 and thermostats 88 included in the fixing device according to the present embodiment. Each of the thermostats 88 cuts off a current flowing through the resistive heat generators under a certain condition.

As illustrated in FIG. 57, one of the temperature sensors 27 according to the present embodiment is disposed to face the inner circumferential surface of the fixing belt 21 near the center Xm of the fixing belt 21 in the longitudinal direction of the fixing belt 21 indicated by an arrow X, and the other one of the temperature sensor 27 is disposed to face the inner circumferential surface of the fixing belt 21 near the end of the fixing belt 21 in the longitudinal direction. One of the temperature sensors 27 is disposed at a position corresponding to the separation area B (see FIG. 56) between the resistance heat generators of the heater 23.

In addition, one of the thermostats 88 is disposed to face the inner circumferential surface of the fixing belt 21 near the center Xm of the fixing belt 21, and the other one of the thermostats 88 is disposed to face the inner circumferential surface of the fixing belt 21 near the end of the fixing belt 21. Each thermostat 88 detects the temperature of the inner circumferential surface of the fixing belt 21 or the ambient temperature in the vicinity of the inner circumferential surface of the fixing belt 21. The thermostat 88 cuts off the current flowing to the heater 23 in response to detecting the temperature that exceeds a preset threshold value.

Figure 58:
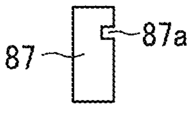
FIG. 58 is a schematic diagram illustrating a groove of a flange illustrated in FIG. 56.

As illustrated in FIGS. 57 and 58, flanges 87 to hold both ends of the fixing belt 21 each have a slide groove 87*a*. The slide groove 87*a* extends in a direction in which the fixing belt 21 moves toward and away from the pressure roller 22. An engaging portion of a housing of the fixing device 20 is engaged with the slide groove 87*a*. The relative movement of the engaging portion in the slide groove 53*a* enables the fixing belt 21 to move toward and away from the pressure roller 22.

The present disclosure is also applicable to the fixing device having the following configuration.

Figure 59:
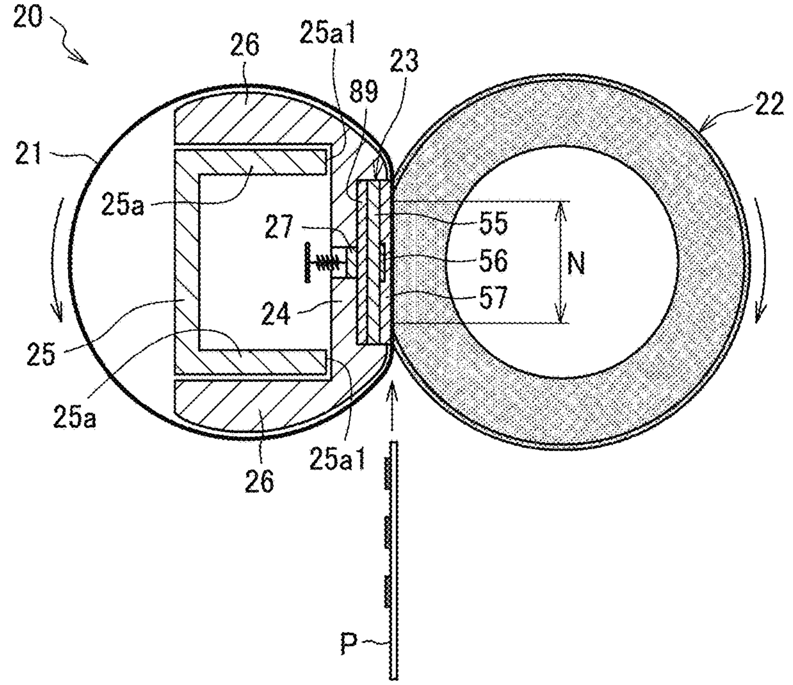
FIG. 59 is a schematic view of a fixing device having a configuration different from the fixing devices of FIGS. 2, 49 to 51, and 53.

FIG. 59 is a schematic view of a fixing device having a different configuration from the fixing devices described above. The above-described embodiments may be applied to the fixing device in FIG. 59.

As illustrated in FIG. 59, the fixing device 20 according to the present embodiment includes the fixing belt 21 as the fixing rotator, the pressure roller 22 as the opposed rotator or the pressure rotator, the heater 23 as the heat source, the heater holder 24 as the heat source holder, the stay 25 as the support, the temperature sensor 27 that is the thermistor as the temperature detector, and a first high thermal conduction member 89. The fixing belt 21 is the endless belt. The pressure roller 22 is in contact with the outer circumferential surface of the fixing belt 21 to form the fixing nip N between the pressure roller 22 and the fixing belt 21. The heater 23 heats the fixing belt 21. The heater holder 24 holds the heater 23.

The stay 25 supports the heater holder 24. The temperature sensor 27 detects the temperature of the first high thermal conduction member 89. That is, the fixing device 20 according to the present embodiment has basically the same configuration as the fixing device illustrated in FIG. 2 except that the fixing device 20 includes the first high thermal conduction member 89. The direction orthogonal to the surface of the paper on which FIG. 59 is drawn is the longitudinal direction of the fixing belt 21, the pressure roller 22, the heater 23, the heater holder 24, the stay 25, and the first high thermal conduction member 89, and this direction is hereinafter simply referred to as the longitudinal direction. The longitudinal direction is also the width direction of the conveyed sheet, the belt width direction of the fixing belt 21, and the axial direction of the pressure roller 22.

The heater 23 in the present embodiment includes a plurality of resistive heat generators 56 arranged at intervals in the longitudinal direction of the heater 23, which is the same as the heater illustrated in FIG. 56. In the heater 23 including the plurality of resistive heat generators 56 arranged at intervals, the temperature of the heater 23 in the separation area B corresponding to the interval between the resistive heat generators 56 tends to be lower than the temperature of the heater 23 in a portion entirely occupied by the resistive heat generator 56. For this reason, the temperature of the fixing belt 21 corresponding to the separation area B also becomes low, which may cause an uneven temperature distribution of the fixing belt 21 in the longitudinal direction.

To prevent the above-described temperature drop in the separation area B and reduce the temperature unevenness in the longitudinal direction of the fixing belt 21, the fixing device in the present embodiment includes the first high thermal conduction member 89. Next, a detailed description is given of the first high thermal conduction member 89.

As illustrated in FIG. 59, the first high thermal conduction member 89 is disposed between the heater 23 and the stay 25 in the lateral direction of FIG. 59 and is particularly sandwiched between the heater 23 and the heater holder 24.

One side of the first high thermal conduction member 89 is brought into contact with the back surface of the base 55 of the heater 23, and the other side (that is, the side opposite to the one side) of the first high thermal conduction member 89 is brought into contact with the heater holder 24.

The stay 25 has two rectangular portions 25*a* extending in a thickness direction of the heater 23 and each having a contact surface 25*a*1 in contact with the back side of the heater holder 24 to support the heater holder 24, the first high thermal conduction member 89, and the heater 23. In the direction intersecting the longitudinal direction that is the vertical direction in FIG. 59, the contact surfaces 25*a*1 are outside the resistive heat generators 56. The above-described structure prevents heat transfer from the heater 23 to the stay 25 and enables the heater 23 to effectively heat the fixing belt 21.

Figure 60:
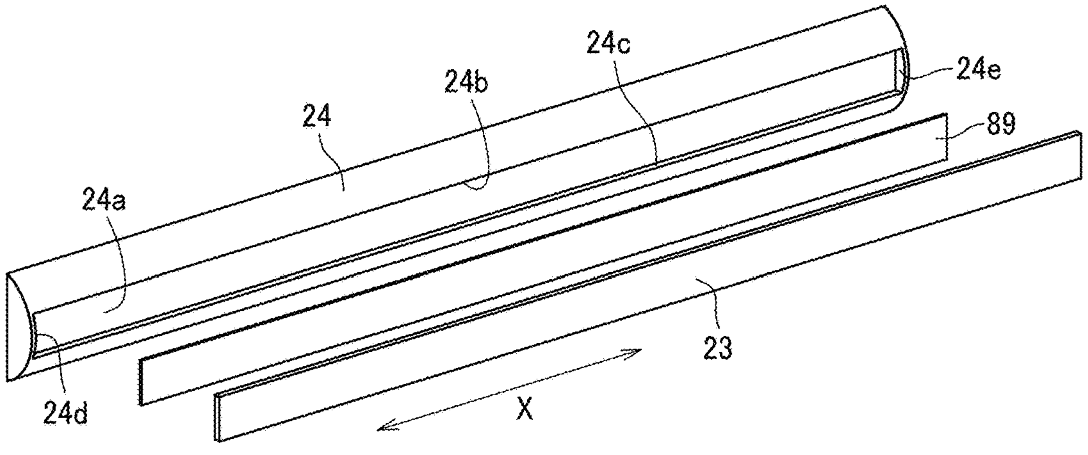
FIG. 60 is a perspective view of a heater, a first high thermal conduction member, and a heater holder that are illustrated in FIG. 59.

As illustrated in FIG. 60, the first high thermal conduction member 89 is a plate having a certain thickness such as 0.3 mm and having, for example, a length of 222 mm in the longitudinal direction, and a width of 10 mm in the direction intersecting the longitudinal direction. In the present embodiment, the first high thermal conduction member 89 is made of a single plate but may be made of a plurality of members. In FIG. 60, the guide 26 illustrated in FIG. 59 is omitted.

The first high thermal conduction member 89 is fitted into the recessed portion 24*a* of the heater holder 24, and the heater 23 is mounted thereon. Thus, the first high thermal conduction member 89 is sandwiched and held between the heater holder 24 and the heater 23. In the present embodiment, the length of the first high thermal conduction member 89 in the longitudinal direction is substantially the same as the length of the heater 23 in the longitudinal direction. Both side walls 24*d* and 24*e* extending in a direction intersecting the longitudinal direction of the recessed portion 24*a* restrict movement of the heater 23 and movement of the first high thermal conduction member 89 in the longitudinal direction and work as longitudinal direction regulators. Reducing a positional deviation of the first high thermal conduction member 89 in the longitudinal direction in the fixing device 9 improves the thermal conductivity efficiency with respect to a target range in the longitudinal direction. Both side walls 24*b* and 24*c* extending in the longitudinal direction of the recessed portion 24*a* restrict movement of the heater 23 and movement of the first high thermal conduction member 89 in the direction intersecting the longitudinal direction and work as direction-intersecting-arrangement-direction regulators.

Figure 61:
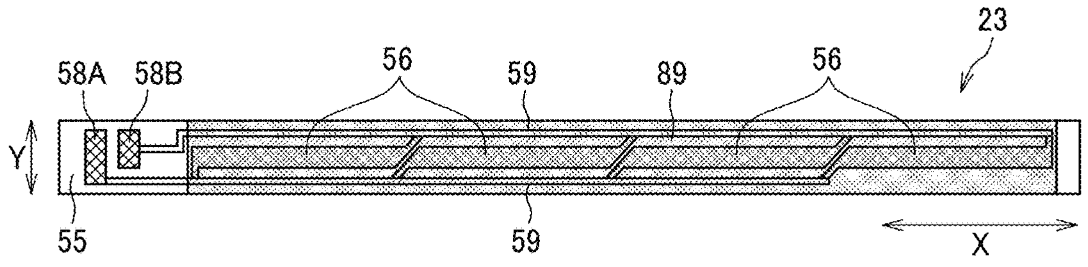
FIG. 61 is a plan view of the heater to illustrate a setting of the first high thermal conduction member.
Figure 62:
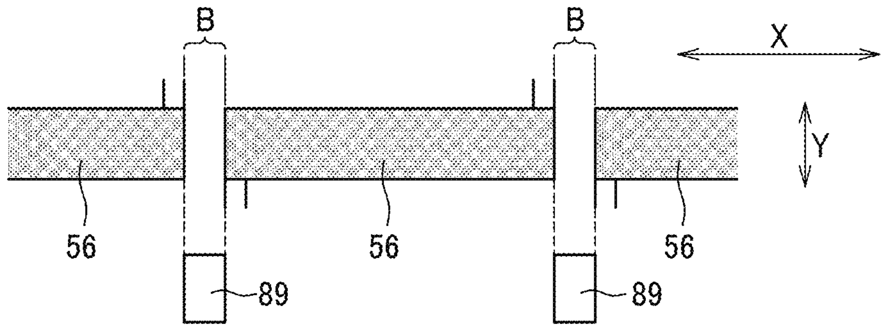
FIG. 62 is a schematic diagram illustrating another example of the setting of the first high thermal conduction members in the heater.
Figure 63:
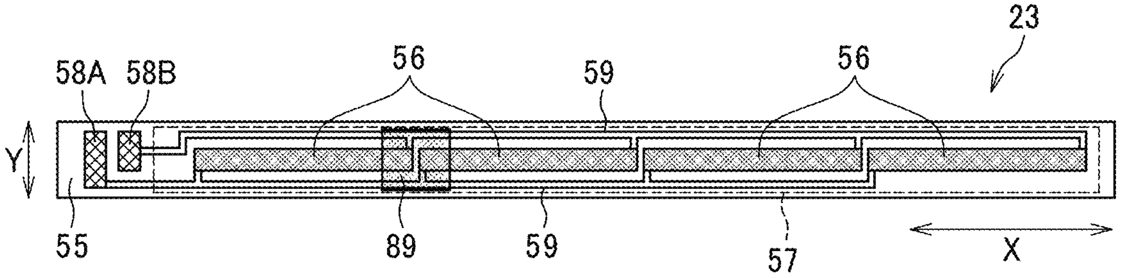
FIG. 63 is a plan view of the heater to illustrate still another example of the setting of the first high thermal conduction member.

The range in which the first high thermal conduction member 89 is disposed in the longitudinal direction indicated by the arrow X is not limited to the range illustrated in FIG. 60. For example, as illustrated in FIG. 61, the first high thermal conduction member 89 may be disposed in only a longitudinal range in which the resistive heat generators 56 are disposed (see a hatched portion in FIG. 61). As illustrated in FIG. 62, the first high thermal conduction members 89 may be disposed in only the entire separation areas at positions corresponding to the separation areas B (in other words, gap areas between the resistive heat generators) in the longitudinal direction indicated by the arrow X. In FIG. 62, for the sake of convenience, the resistive heat generators 56 and the first high thermal conduction members 89 are shifted in the vertical direction of FIG. 62 but are disposed at substantially the same position in the direction intersecting the longitudinal direction indicated by an arrow Y. In addition, the first high thermal conduction member 89 may be disposed over a part of the resistive heat generator 56 in the direction intersecting the longitudinal direction (the direction indicated by the arrow Y), or as in the example illustrated in FIG. 63, may be disposed so as to cover all the resistive heat generators 56 in the direction intersecting the longitudinal direction (the direction indicated by the arrow Y). As illustrated in FIG. 63, the first high thermal conduction member 89 may be disposed to face a part of each of the neighboring resistive heat generators 56 in addition to the gap area between the neighboring resistive heat generators 56. The first high thermal conduction member 89 may be disposed to face all separation areas B in the heater 23, one separation area B as illustrated in FIG. 63, or some of separation areas B. At least a part of the first high thermal conduction member 89 may be disposed to face the separation area B.

Due to the pressing force of the pressure roller 22, the first high thermal conduction member 89 is sandwiched between the heater 23 and the heater holder 24 and is brought into close contact with the heater 23 and the heater holder 24. Bringing the first high thermal conduction member 89 into contact with the heaters 23 improves the heat conduction efficiency in the longitudinal direction of the heaters 23. The first high thermal conduction member 89 facing the separation area B improves the heat conduction efficiency of a part of the heater 23 facing the separation area B in the longitudinal direction, transmits heat to the part of the heater 23 facing the separation area B, and raise the temperature of the part of the heater 23 facing the separation area B. Thus, the first high thermal conduction member 89 reduces temperature unevenness of the heater 23 in the longitudinal direction and the temperature unevenness of the fixing belt 21 in the longitudinal direction. As a result, the above-described structure can prevent uneven fixing and uneven gloss in the image fixed on the sheet. Since the heater 23 does not need to generate additional heat to secure sufficient fixing performance in the part of the heater 23 facing the separation area B, energy consumption of the fixing device can be saved. The first high thermal conduction member 89 disposed over the entire area in which the resistive heat generators 56 are arranged in the longitudinal direction improves the heat transfer efficiency of the heater 23 over the entire area of a main heating region of the heater 23 (that is, an area facing an image formation area of the sheet passing through the fixing device) and reduces the temperature unevenness of the heater 23 and the temperature unevenness of the fixing belt 21 in the longitudinal direction.

In addition, the combination of the first high thermal conduction member 89 and the resistive heat generator 56 having the PTC characteristic effectively prevents the overheating of the non-sheet passing region (that is the region of the fixing belt that is not in contact with the small sheet) of the fixing belt 21 when small sheets pass through the fixing device 20. The PTC characteristic is a characteristic in which the resistance value increases as the temperature increases, for example, a heater output decreases under a constant voltage. The resistive heat generator 56 having the PTC characteristic effectively reduces the amount of heat generated by the resistive heat generator 56 in the non-sheet passing region, and the first high thermal conduction member 89 effectively transfers heat from the non-sheet passing region in which the temperature rises to a sheet passing region that is a region of the fixing belt contacting the sheet. As a result, the overheating of the non-sheet passing region is effectively prevented.

Figure 64:
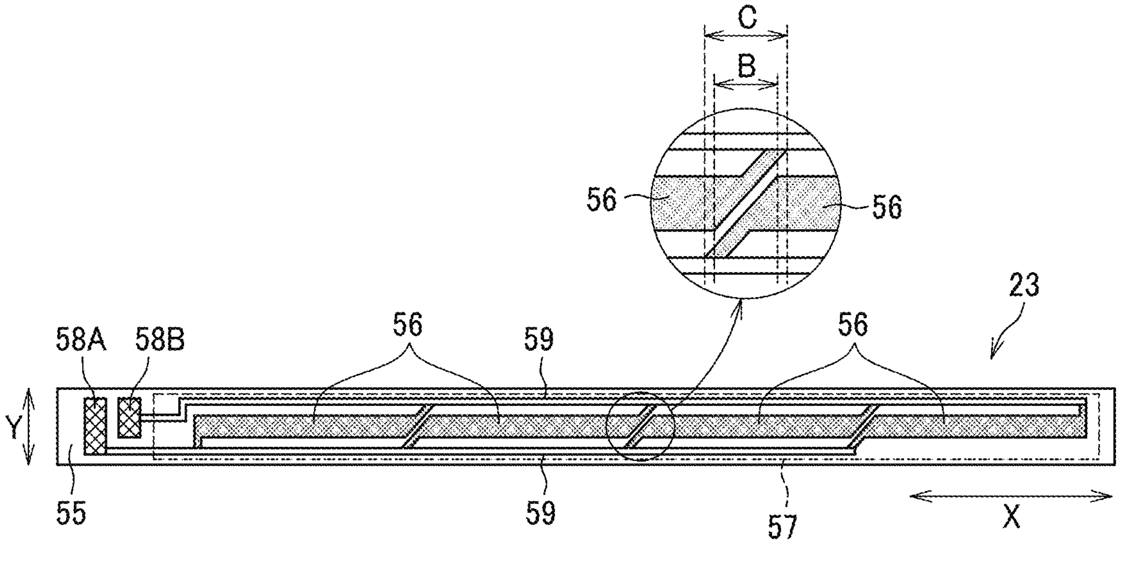
FIG. 64 is a plan view of the heater to illustrate enlarged separation areas.

The first high thermal conduction member 89 may be disposed opposite an area around the separation area B because the small heat generation amount in the separation area B decreases the temperature of the heater 23 in the area around the separation area B. For example, the first high thermal conduction member 89 facing an enlarged separation area C that includes the separation area B and an area around the separation area B as illustrated in FIG. 64 improves the heat transfer efficiency of the separation area B and the area around the separation area B in the longitudinal direction and effectively reduces the temperature unevenness in the longitudinal direction of the heaters 23. The first high thermal conduction member 89 facing the entire region in which all the resistive heat generators 56 are arranged in the longitudinal direction reduces the temperature unevenness of the heater 23 (and the fixing belt 21) in the longitudinal direction.

Next, another embodiment of the fixing device is described.

Figure 65:
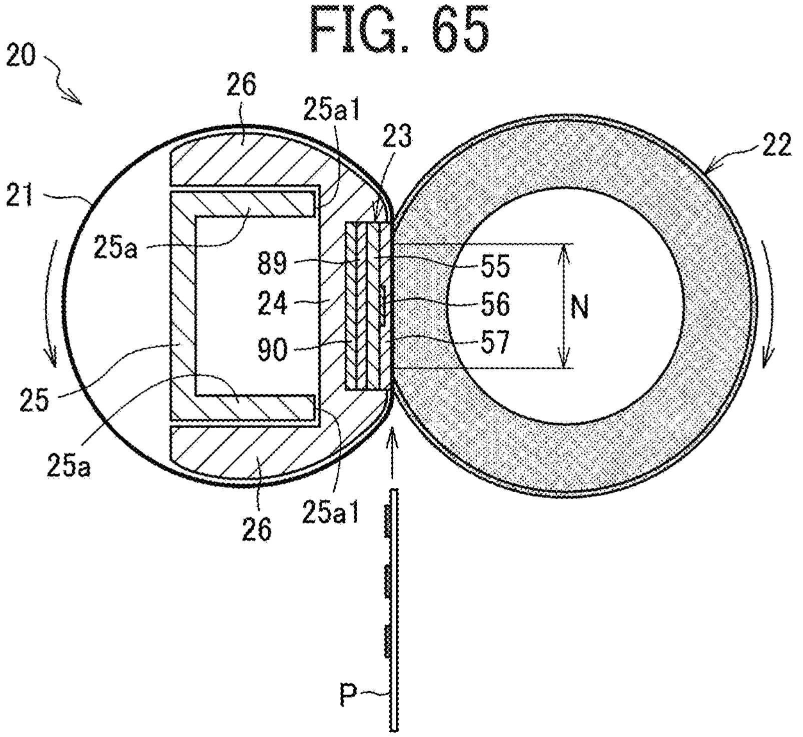
FIG. 65 is a schematic view of a fixing device having a configuration different from the fixing devices of FIGS. 2, 49 to 51, 53, and 59.

The fixing device 20 illustrated in FIG. 65 includes a second high thermal conduction member 90 between the heater holder 24 and the first high thermal conduction member 89. The second high thermal conduction member 90 is disposed at a position different from the position of the first high thermal conduction member 89 in the lateral direction in FIG. 65 that is a direction in which the heater holder 24, the stay 25, and the first high thermal conduction member 89 are layered. Specifically, the second high thermal conduction member 90 is disposed so as to overlap the first high thermal conduction member 89. The fixing device in the present embodiment includes the temperature sensor 27 (that is, the thermistor), which is the same as the fixing device illustrated in FIG. 59. FIG. 65 illustrates a cross section in which the temperature sensor 27 is not disposed.

The second high thermal conduction member 90 is made of a material having thermal conductivity higher than the thermal conductivity of the base 55, for example, graphene or graphite. In the present embodiment, the second high thermal conduction member 90 is made of a graphite sheet having a thickness of 1 mm. Alternatively, the second high thermal conduction member 90 may be a plate made of aluminum, copper, silver, or the like.

Figure 66:
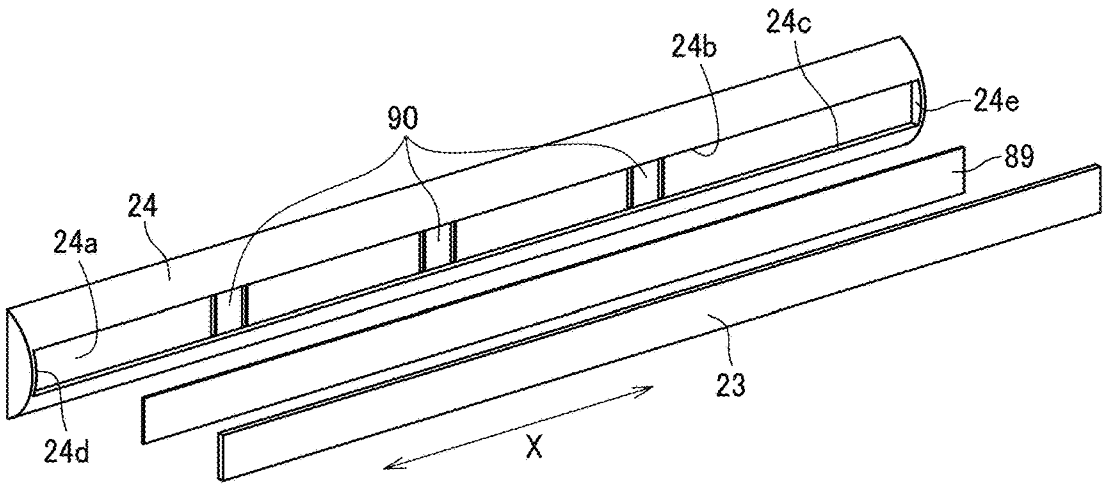
FIG. 66 is a perspective view of the heater, the first high thermal conduction member, a second high thermal conduction member, and a heater holder that are illustrated in FIG. 65.

As illustrated in FIG. 66, a plurality of second high thermal conduction members 90 is arranged on the recessed portion 24*a* of the heater holder 24 at intervals in the longitudinal direction. The recessed portion 24*a* of the heater holder 24 has a plurality of holes in which the second high thermal conduction members 90 are disposed. Clearances are formed between the heater holder 24 and both sides of the second high thermal conduction member 90 in the longitudinal direction. The clearance prevents heat transfer from the second high thermal conduction member 90 to the heater holder 24, and the heater 23 efficiently heats the fixing belt 21. In FIG. 66, the guide 26 illustrated in FIG. 65 is omitted.

Figure 67:
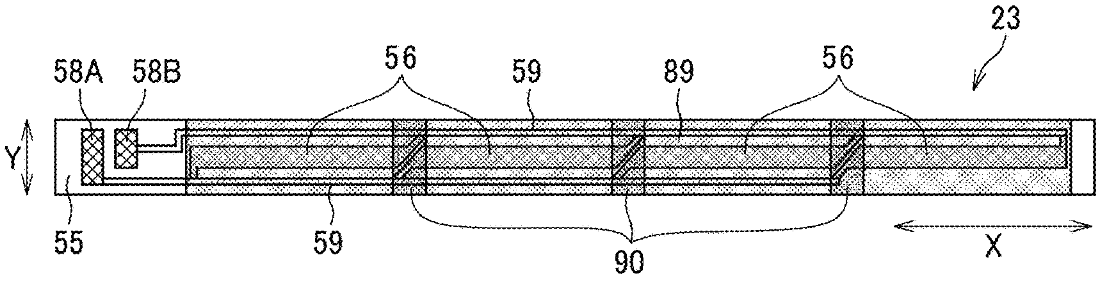
FIG. 67 is a plan view of the heater to illustrate an arrangement of the first high thermal conduction member and the second high thermal conduction member.

As illustrated in FIG. 67, each of the second high thermal conduction members 90 (see the hatched portions) is disposed at a position corresponding to the separation area B in the longitudinal direction indicated by the arrow X and faces at least a part of each of the neighboring resistive heat generators 56 in the longitudinal direction. In particular, each of the second high thermal conduction members 90 in the present embodiment faces the entire separation area B. FIG. 67 (and FIG. 69 described below) illustrates the first high thermal conduction member 89 facing the entire region in which all the resistive heat generators 56 are arranged in the longitudinal direction. The range in which the first high thermal conduction member 89 is disposed in the longitudinal direction is not limited to the above.

Figure 68:
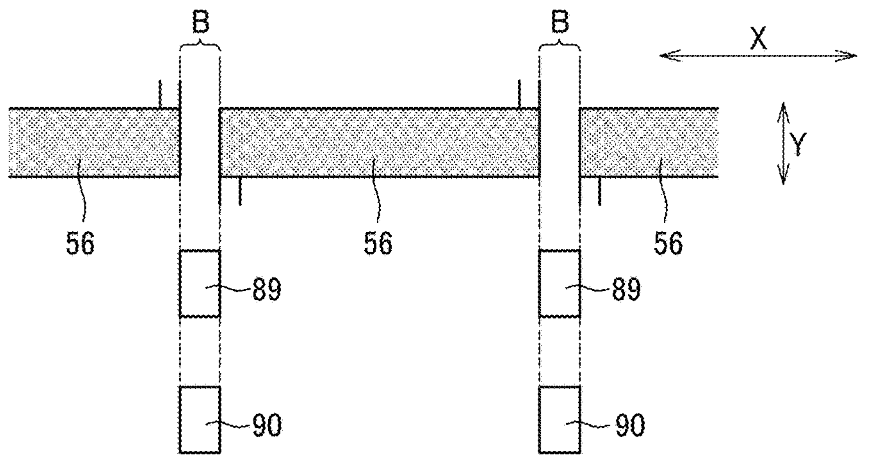
FIG. 68 is a diagram illustrating another arrangement of the first high thermal conduction member and the second high thermal conduction member.

The fixing device according to the present embodiment includes the second high thermal conduction member 90 disposed at a position corresponding to the separation area B in the longitudinal direction and the position at which at least a part of each of the neighboring resistive heat generators 56 faces the second high thermal conduction member 90 in addition to the first high thermal conduction member 89. The above-described structure further improves the heat transfer efficiency in the separation area B in the longitudinal direction and more efficiently reduces the temperature unevenness of the heater 23 in the longitudinal direction. As illustrated in FIG. 68, the first high thermal conduction members 89 and the second high thermal conduction member 90 may be disposed opposite the entire gap area between the resistive heat generators 56. The above-described structure improves the heat transfer efficiency of the part of the heater 23 corresponding to the gap area to be higher than the heat transfer efficiency of the other part of the heater 23. In FIG. 68, for the sake of convenience, the resistive heat generators 56, the first high thermal conduction members 89, and the second high thermal conduction member 90 are shifted in the vertical direction of FIG. 68 but are disposed at substantially the same position in the direction intersecting the longitudinal direction indicated by the arrow Y. However, the present disclosure is not limited to the above. The first high thermal conduction member 89 and the second high thermal conduction member 90 may be disposed opposite a part of the resistive heat generators 56 in the direction intersecting the longitudinal direction or may be disposed so as to cover the entire resistive heat generators 56 in the direction intersecting the longitudinal direction.

Both the first high thermal conduction member 89 and the second high thermal conduction member 90 may be made of a graphene sheet. The first high thermal conduction member 89 and the second high thermal conduction member 90 made of the graphene sheet have high thermal conductivity in a predetermined direction along the plane of the graphene, that is, not in the thickness direction but in the longitudinal direction. Accordingly, the above-described structure can effectively reduce the temperature unevenness of the fixing belt 21 in the longitudinal direction and the temperature unevenness of the heater 23 in the longitudinal direction.

Figure 71:
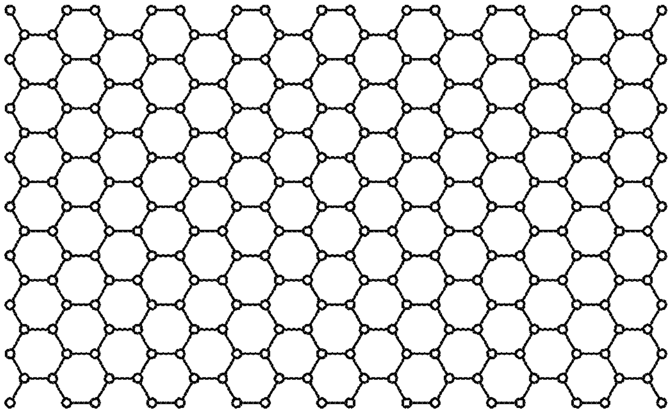
FIG. 71 is a schematic diagram illustrating a two-dimensional atomic crystal structure of graphene.

Graphene is a flaky powder. Graphene has a planar hexagonal lattice structure of carbon atoms, as illustrated in FIG. 71. The graphene sheet is usually a single layer. The graphene sheet may contain impurities in a single layer of carbon and may have a fullerene structure. The fullerene structures are generally recognized as compounds including an even number of carbon atoms, which form a cage-like fused ring polycyclic system with five and six membered rings, including, for example, C60, C70, and C80 fullerenes or other closed cage structures having three-coordinate carbon atoms.

Graphene sheets are artificially made by, for example, a chemical vapor deposition (CVD) method.

The graphene sheet is commercially available. The size and thickness of the graphene sheet or the number of layers of the graphite sheet described below are measured by, for example, a transmission electron microscope (TEM).

Figure 72:
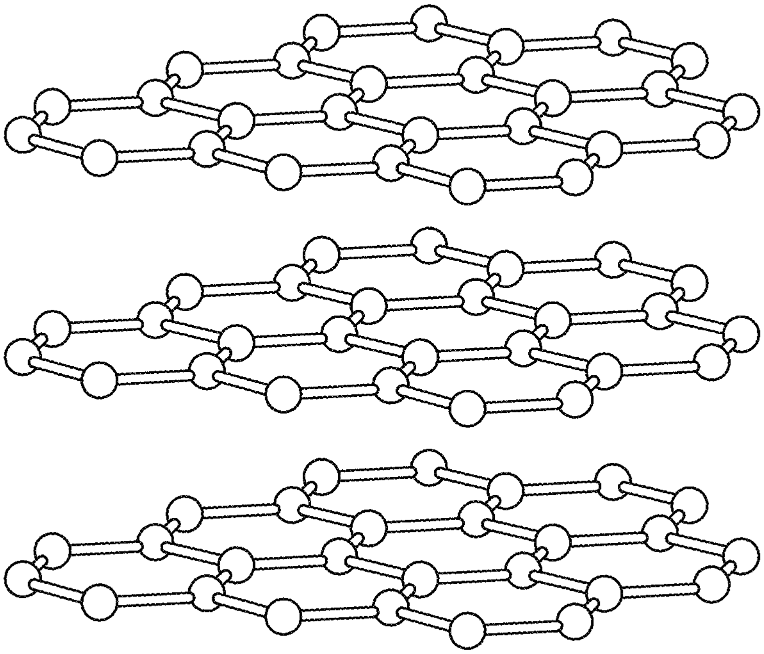
FIG. 72 is a schematic diagram illustrating a three-dimensional atomic crystal structure of graphite.

Graphite obtained by multilayering graphene has a large thermal conduction anisotropy. As illustrated in FIG. 72, the graphite has a crystal structure formed by layering a number of layers each having a condensed six membered ring layer plane of carbon atoms extending in a planar shape. Among carbon atoms in this crystal structure, adjacent carbon atoms in the layer are coupled by a covalent bond, and carbon atoms between layers are coupled by a van der Waals bond. The covalent bond has a larger bonding force than a van der Waals bond. Therefore, there is a large anisotropy between the bond between carbon atoms in a layer and the bond between carbon atoms in different layers. That is, the first high thermal conduction member 89 and the second high thermal conduction member 90 that are made of graphite each have the heat transfer efficiency in the longitudinal direction larger than the heat transfer efficiency in the thickness direction of the first high thermal conduction member 89 and the second high thermal conduction member 90 (that is, the stacking direction of these members), reducing the heat transferred to the heater holder 24. Accordingly, the above-described structure can efficiently decrease the temperature unevenness of the heater 23 in the longitudinal direction and can minimize the heat transferred to the heater holder 24. Since the first high thermal conduction member 89 and the second high thermal conduction member 90 that are made of graphite are not oxidized at about 700 degrees or lower, the first high thermal conduction member 89 and the second high thermal conduction member 90 each have an excellent heat resistance.

The physical properties and dimensions of the graphite sheet may be appropriately changed according to the function required for the first high thermal conduction member 89 or the second high thermal conduction member 90. For example, the anisotropy of the thermal conduction can be increased by using high-purity graphite or single-crystal graphite or increasing the thickness of the graphite sheet. Using a thin graphite sheet can reduce the thermal capacity of the fixing device so that the fixing device can perform high speed printing. A width of the first high thermal conduction member 89 or a width of the second high thermal conduction member 90 in the direction intersecting the longitudinal direction may be increased in response to a large width of the fixing nip N or a large width of the heater 23.

From the viewpoint of increasing mechanical strength, the number of layers of the graphite sheet is preferably 11 or more. The graphite sheet may partially include a single layer portion and a multilayer portion.

Figure 69:
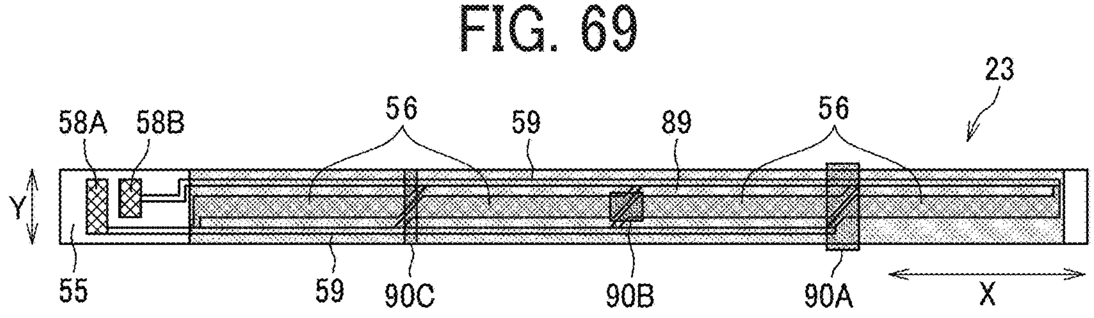
FIG. 69 is a plan view of the heater to illustrate other examples of arrangements of the second high thermal conduction member.

As long as the second high thermal conduction member 90 faces a part of each of neighboring resistive heat generators 56 and at least a part of the gap area between the neighboring resistive heat generators 56, the configuration of the second high thermal conduction member 90 is not limited to the configuration illustrated in FIG. 67. For example, as illustrated in FIG. 69, a second high thermal conduction member 90A is longer than the base 55 in the direction intersecting the longitudinal direction indicated by the arrow Y, and both ends of the second high thermal conduction member 90A in the direction intersecting the longitudinal direction are outside the base 55 in FIG. 51. A second high thermal conduction member 90B faces a range in which the resistive heat generators 56 are disposed in the direction intersecting the longitudinal direction. A second high thermal conduction member 90C faces a part of the gap area and a part of each of neighboring resistive heat generators 56.

Figure 70:
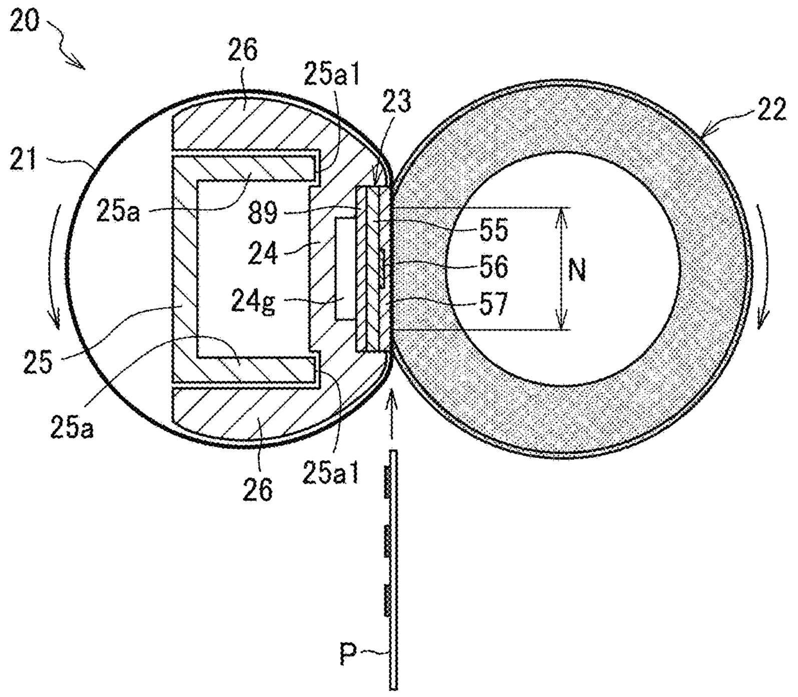
FIG. 70 is a schematic view of a fixing device having a configuration different from the fixing devices of FIGS. 2, 49 to 51, 53, 59, and 65.

The fixing device according to an embodiment illustrated in FIG. 70 has a gap between the first high thermal conduction member 89 and the heater holder 24 in the thickness direction that is the lateral direction in FIG. 70. In other words, the fixing device has a gap 24*g* serving as a thermal insulation layer in a part of a region of the recessed portion 24*a* (see FIG. 66) of the heater holder 24 in which the heater 23, the first high thermal conduction member 89, and the second high thermal conduction member 90 are disposed. The gap 24*g* is in the part of the region of the recessed portion 24*a* in the longitudinal direction, and the second high thermal conduction member 90 is not in the part. Therefore, FIG. 70 does not include the second high thermal conduction member 90. The gap 24*g* has a depth deeper than the depth of the recessed portion 24*a* of the heater holder 24. The above-described structure minimizes the contact area between the heater holder 24 and the first high thermal conduction member 89. The gap 24*g* prevents heat transfer from the first high thermal conduction member 89 to the heater holder 24, and the heater 23 efficiently heats the fixing belt 21. In the cross section of the fixing device in which the second high thermal conduction member 90 is set, the second high thermal conduction member 90 is in contact with the heater holder 24 as illustrated in FIG. 65 of the above-described embodiment.

The gap 24*g* in the present embodiment is in an entire area in which the resistive heat generators 56 are disposed in the direction intersecting the longitudinal direction that is the vertical direction in FIG. 70. The above-described configuration efficiently prevents heat transfer from the first high thermal conduction member 89 to the heater holder 24, and the heater 23 efficiently heats the fixing belt 21. The fixing device may include a thermal insulation layer made of heat insulator having a lower thermal conductivity than the thermal conductivity of the heater holder 24 instead of a space like the gap 24*g* serving as the thermal insulation layer.

In the present embodiment, the second high thermal conduction member 90 is a member different from the first high thermal conduction member 89, but the present embodiment is not limited to this. For example, the first high thermal conduction member 89 may have a thicker portion than the other portion so that the thicker portion faces the separation area B and functions as the second high thermal conduction member 90.

In the above, various configurations of the fixing device and the image forming apparatus in which the embodiments of the present disclosure can be applied are described. Applying the embodiments to the various configurations of the fixing device and the image forming apparatus give effects similar to the above-described effects in the embodiments. That is, applying the above-described embodiments to the fixing device can prevent the temperature rise of the lead wire facing the non-sheet passing region and improve the durability of the lead wire.

In the above-described embodiments, the present disclosure is applied to the fixing device that is an example of the heating device. The heating device in which the present embodiments can be applied is not limited to the fixing device. The present embodiments can be applied to, for example, a heating device such as a dryer to dry liquid such as ink applied to the sheet, a laminator that heats, under pressure, a film serving as a covering member onto the surface of the sheet such as paper, and a thermocompression device such as a heat sealer that seals a seal portion of a packaging material with heat and pressure.

The above-described embodiments of the present disclosure have at least the following aspects.

First Aspect

In a first aspect, a heating device includes a pair of rotators, a heater, a temperature sensor, a conductor, a conductor support, and a component supporting the conductor. The pair of rotators is in contact with each other to form a nip through which a sheet passes. The heater heats at least one of the pair of rotators. The temperature sensor detects a temperature of the heater. The conductor has flexibility and is coupled to the temperature sensor. The conductor support supports the conductor such that a distance from the conductor to at least one position of the heater outside a predetermined region of the heater in a width direction of the sheet is larger than a distance from the conductor to a position of the heater inside the predetermined region in the width direction. The component has a first side facing the heater and a second side opposite the first side.

Second Aspect

In a second aspect, the heating device according to the first aspect further includes a plurality of conductor supports including the conductor support. The component supports the plurality of conductor supports. The plurality of conductor supports is on the second side of the component and projects from the second side of the component in a direction away from the heater. A height from the component to a tip of at least one of the plurality of conductor supports facing a position outside the predetermined region of the heater is higher than a height from the component to a tip of another conductor support facing a position inside the predetermined region.

Third Aspect

In a third aspect, the heating device according to the first aspect or the second aspect further includes a heater holder holding the heater, and the component is between the heater holder and the conductor.

Fourth Aspect

In a fourth aspect, the component of the heating device according to the third aspect is a sensor holder holding the temperature sensor.

Fifth Aspect

In a fifth aspect, the component of the heating device according to the first aspect or the second aspect is a heater holder holding the heater.

Sixth Aspect

In a sixth aspect, the heater holder and the conductor support of the heating device according to the fifth aspect are formed as one component.

Seventh Aspect

In a seventh aspect, the predetermined region of the heater of the heating device according to any one of the first to sixth aspect faces a region through which a sheet having a minimum width in the width direction passes.

Eighth Aspect

In an eighth aspect, the heater in the heating device according to any one of the first to seventh aspects includes a plurality of heat generators arranged at intervals in the width direction, and the conductor support overlaps a region between the heat generators in the width direction.

Ninth Aspect

In a ninth aspect, the conductor support of the heating device according to any one of the first to eighth aspects projects from the second side of the component in a direction away from the heater, and a height from the second side of the component to a tip of the conductor support is higher than a height from the second side of the component to a position at which the conductor is coupled to the temperature sensor.

Tenth Aspect

In a tenth aspect, the heater of the heating device according to any one of the first to ninth aspects includes a heat generator at a center of the heater in a sheet conveyance direction, and the conductor support projects from the second side of the component in a direction away from the heater and supports the conductor at a position shifted from the center of the heater in the sheet conveyance direction.

Eleventh Aspect

In an eleventh aspect, the heating device according to the tenth aspect has a height from the second side of the component to a center position of the conductor support in the sheet conveyance direction that is higher than a height from the second side of the component to a tip of each of both sides of the conductor support in the sheet conveyance direction.

Twelfth Aspect

In a twelfth aspect, the heating device according to any one of the first to eleventh aspects further includes a stay supporting a heater holder as the component and a low thermal conductor disposed between the stay and the conductor. The low thermal conductor has a thermal conductivity lower than a thermal conductivity of the stay.

Thirteenth Aspect

In a thirteenth aspect, the temperature sensor of the heating device according to any one of the first to twelfth aspect faces a region through which a sheet having a minimum width in a sheet width direction passes.

Fourteenth Aspect

In a fourteenth aspect, a fixing device includes the heating device according to any one of the first to thirteenth aspects to fix an unfixed image onto a sheet.

Fifteenth Aspect

In a fifteenth aspect, an image forming apparatus includes one of the fixing device according to the fourteenth aspect and the heating device according to any one of the first to thirteenth aspects.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

What is claimed is:

1. A heating device comprising:

a pair of rotators in contact with each other to form a nip through which a sheet passes;

a heater configured to heat at least one of the pair of rotators;

a temperature sensor configured to detect a temperature of the heater;

a conductor having flexibility and being coupled to the temperature sensor; and a conductor support supporting the conductor such that a first distance from the conductor to at least one position of the heater outside a predetermined region of the heater in a width direction of the sheet is larger than a second distance from the conductor to a position of the heater inside the predetermined region in the width direction, the first and second directions measured from the conductor to the heater in a direction perpendicular to the width direction of the sheet; and a component supporting the conductor support and having a first side facing the heater and a second side opposite the first side, wherein the at least one position of the heater is inside of a maximum sheet passing region in the width direction.

2. The heating device according to claim 1, further comprising a plurality of conductor supports including the conductor support, wherein the component supports the plurality of conductor supports, wherein the plurality of conductor supports is on the second side of the component and projects from the second side of the component in a direction away from the heater, and wherein a height from the component to a tip of at least one of the plurality of conductor supports facing a position outside the predetermined region of the heater is higher than a height from the component to a tip of another conductor support facing a position inside the predetermined region.

3. The heating device according to claim 1, further comprising a heater holder holding the heater, wherein the component is between the heater holder and the conductor.

4. The heating device according to claim 3, wherein the component is a sensor holder holding the temperature sensor.

5. The heating device according to claim 1, wherein the component is a heater holder holding the heater.

6. The heating device according to claim 5,

Wherein the heater holder and the conductor support are formed as one component.

7. The heating device according to claim 1, wherein the predetermined region of the heater faces a region through which a sheet having a minimum width in the width direction passes.

8. The heating device according to claim 1, wherein the heater includes a plurality of heat generators arranged at intervals in the width direction, and wherein the conductor support overlaps a region between the heat generators in the width direction.

9. The heating device according to claim 1, wherein the conductor support projects from the second side of the component in a direction away from the heater, and wherein a height from the second side of the component to a tip of the conductor support is higher than a height from the second side of the component to a position at which the conductor is coupled to the temperature sensor.

10. The heating device according to claim 1, wherein the heater includes a heat generator at a center of the heater in a sheet conveyance direction, and wherein the conductor support projects from the second side of the component in a direction away from the heater and supports the conductor at a position shifted from the center of the heater in the sheet conveyance direction.

11. The heating device according to claim 10, wherein a height from the second side of the component to a center position of the conductor support in the sheet conveyance direction is higher than a height from the second side of the component to a tip of each of both sides of the conductor support in the sheet conveyance direction.

12. The heating device according to claim 1, further comprising:

a stay supporting a heater holder that is the component; and a low thermal conductor being disposed between the stay and the conductor and having a thermal conductivity lower than a thermal conductivity of the stay.

13. The heating device according to claim 1, wherein the temperature sensor faces a region through which a sheet having a minimum width in the width direction passes.

14. An image forming apparatus comprising the heating device according to claim 1.

15. An image forming apparatus comprising:

a heating device, the heating device comprising:

a pair of rotators in contact with each other to form a nip through which a sheet passes;

a heater configured to heat at least one rotator of the pair of rotators, a length of the heater extending along a direction parallel to a width direction of the sheet;

a temperature sensor configured to detect a temperature of the heater;

a conductor having flexibility and being coupled to the temperature sensor; and at least one conductor support supporting the conductor; and a component supporting the at least one conductor support, the component having a first side facing the heater and a second side opposite the first side, at a first position along the length of the heater, a first distance extends from the conductor to the heater in a direction perpendicular to the width direction of the sheet, the first position is outside a predetermined region along the length of the heater, at a second position along the length of the heater, a second distance extends from the conductor to the heater in the direction perpendicular to the width direction of the sheet, the first position is inside of a maximum sheet passing region in the width direction, the second position is inside the predetermined region, and the first distance is larger than the second distance.

16. The image forming apparatus to claim 15, wherein the predetermined region of the heater is between a minimum sheet passing region in the width direction and the maximum sheet passing region in the width direction.

17. The image forming apparatus according to claim 15, wherein the temperature sensor is configured to detect a temperature of a portion of the heater;

the portion of the heater is inside a minimum sheet passing region.

18. The image forming apparatus according to claim 15, wherein the component and the conductor support are integrally formed.

19. An image forming apparatus comprising:

a heating device, the heating device comprising a pair of rotators in contact with each other to form a nip through which a sheet passes;

a heater configured to heat at least one rotator of the pair of rotators, a length of the heater extending along a direction parallel to a width direction of the sheet;

a first temperature sensor configured to detect a temperature of the heater outside of a minimum sheet passing region in the width direction;

at least one conductor support supporting the first temperature sensor;

a second temperature sensor configured to detect a temperature of the heater within the minimum sheet passing region in the width direction;

a conductor having flexibility and being coupled to the second temperature sensor, the at least one conductor support supporting the conductor; and a component supporting the at least one conductor support, the component having a first side facing the heater and a second side opposite the first side, at a first position along the length of the heater, a first distance extends from the conductor to the heater in a direction perpendicular to the width direction of the sheet, the first position is between a side of the at least one conductor support furthest from a center of the heater and the center of the heater in the width direction of the sheet, at a second position along the length of the heater, a second distance extends from the conductor to the heater in the direction perpendicular to the width direction of the sheet, the second position is inside the minimum sheet passing region, and the first distance is larger than the second distance.

20. The image forming apparatus according to claim 19, further comprising a sensor holder supporting the second temperature sensor;

wherein the sensor support is not integrated with the at least one conductor support and the component, the at least one conductor support includes two integral walls protruding in a direction away from the heater, and the conductor is between the two walls.

* * * * *